(12) United States Patent
Nguyen

(10) Patent No.: US 12,115,659 B1
(45) Date of Patent: *Oct. 15, 2024

(54) PORTABLE VACUUM GRIPPER

(71) Applicant: Nhon Hoa Nguyen, Bankstown (AU)

(72) Inventor: Nhon Hoa Nguyen, Bankstown (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,573

(22) Filed: Nov. 19, 2023

Related U.S. Application Data

(63) Continuation of application No. 17/724,791, filed on Apr. 20, 2022.

(60) Provisional application No. 63/176,890, filed on Apr. 20, 2021.

(51) Int. Cl.
*B25J 15/06* (2006.01)
*B25J 1/00* (2006.01)

(52) U.S. Cl.
CPC .............. *B25J 15/0616* (2013.01); *B25J 1/00* (2013.01)

(58) Field of Classification Search
CPC ................................. B25J 15/0616; B25J 1/00
See application file for complete search history.

(56) References Cited

U.S. PATENT DOCUMENTS

| | | | |
|---|---|---|---|
| 2,920,916 A | 1/1960 | Sons | |
| 3,506,297 A | 4/1970 | Creskoff | |
| 4,750,768 A | 6/1988 | Kumar | |
| 6,419,291 B1 | 7/2002 | Preta | |
| 7,240,935 B2 | 7/2007 | Schmierer et al. | |
| 7,690,610 B2 | 4/2010 | Ristau | |
| 8,382,174 B2 | 2/2013 | Desai et al. | |
| 8,414,045 B2 | 4/2013 | Schaaf | |
| 9,457,478 B2 | 10/2016 | Harter | |
| 9,550,298 B2 | 1/2017 | Murota et al. | |
| 9,573,280 B2 | 2/2017 | Harter | |
| 10,456,928 B2 | 10/2019 | Cho | |
| 10,549,405 B2 | 2/2020 | Meyer et al. | |
| 11,413,727 B2 | 8/2022 | Rotem | |
| 2004/0050205 A1 | 3/2004 | Putnam | |
| 2007/0187965 A1 | 8/2007 | Schaaf et al. | |
| 2020/0338695 A1 | 10/2020 | Rotem | |

FOREIGN PATENT DOCUMENTS

GB 1036586 A 7/1966
WO 2019215722 A1 11/2019

*Primary Examiner* — Stephen A Vu
(74) *Attorney, Agent, or Firm* — Tue Nguyen

(57) ABSTRACT

A vacuum gripper for gripping an object surface using vacuum suction is configured to be portable or operated by a hoist. Battery conservation measures are included to provide a long term vacuum generation capability, together with manually rechargeable mechanism. A manually-operated vacuum pump is also integrated to the vacuum gripper as a safeguard for the battery-operated vacuum pump failure. The vacuum gripper includes an elastic deformable vacuum seal for gripping objects with irregular surfaces, together with press rods or pin array configured to assist the vacuum seal in filling any gaps between the vacuum seal and the object surface.

20 Claims, 35 Drawing Sheets

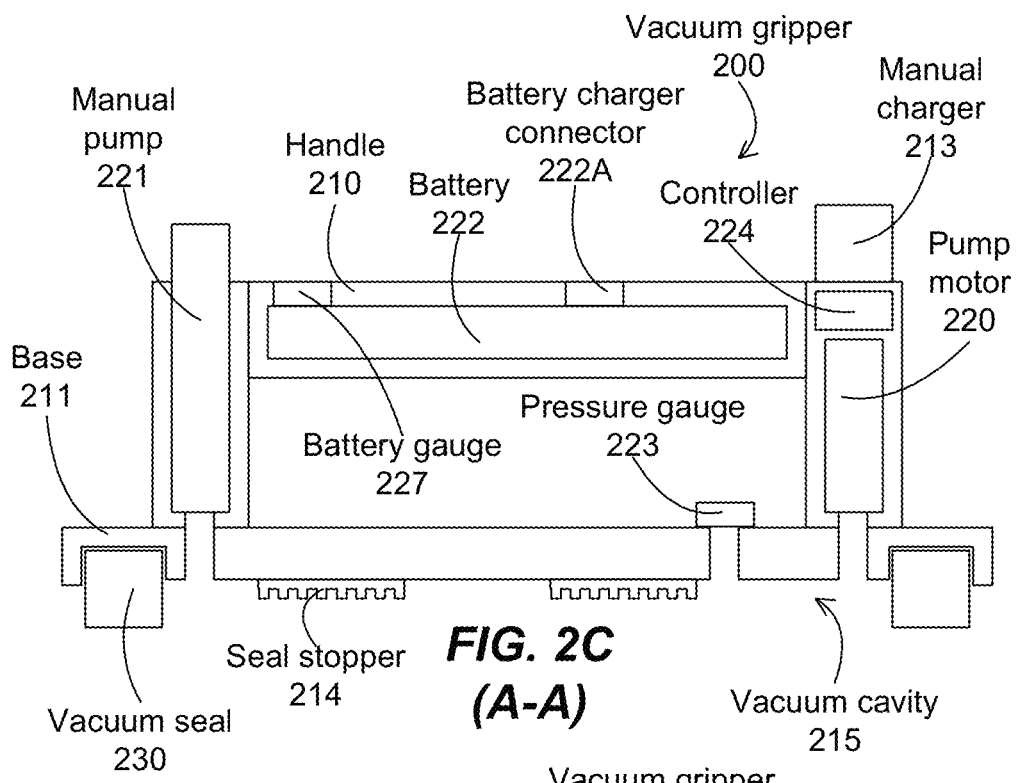
*FIG. 2C (A-A)*
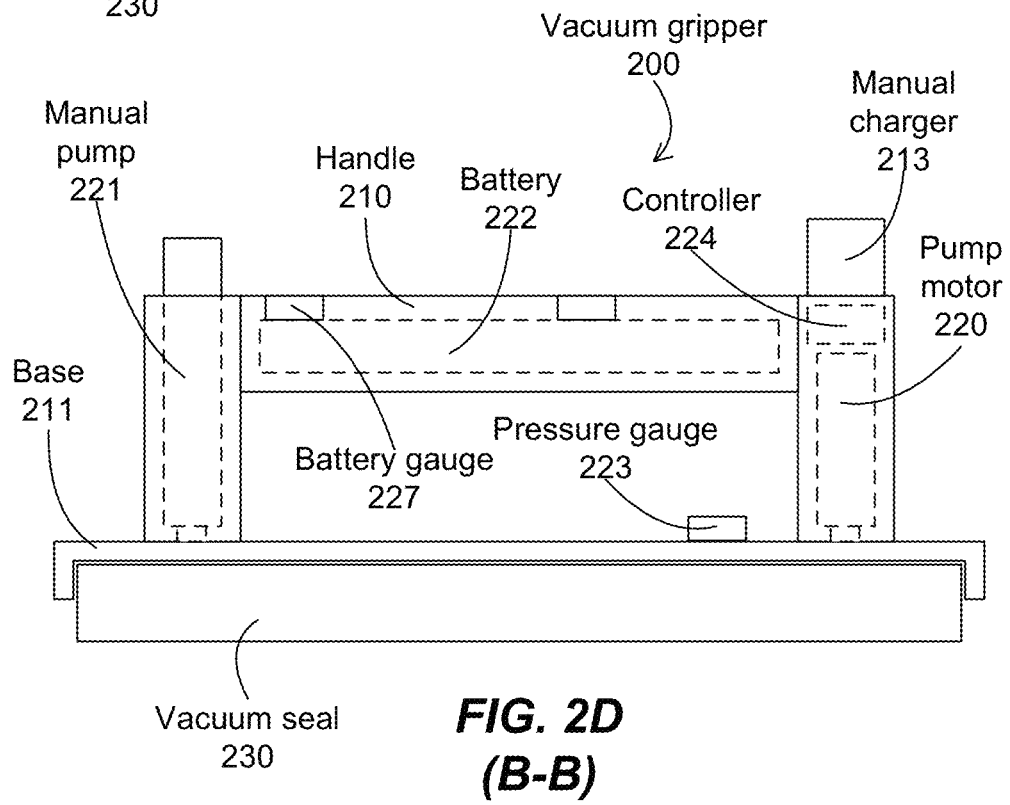
*FIG. 2D (B-B)*

Forming a vacuum gripper for gripping an object surface.
The vacuum gripper includes
- a base element,
- a close-loop vacuum seal element coupled to a surface of the base element to form a cavity when contacting the object surface,
- a vacuum pump coupled to the base element and fluidly communicated with the cavity for evacuating air in the cavity
400

FIG. 4A

Forming a vacuum gripper for gripping an object surface.
The vacuum gripper includes
- a base element,
- a close-loop vacuum seal element coupled to a surface of the base element to form a cavity when contacting the object surface,
- a vacuum pump coupled to the base element and fluidly communicated with the cavity for evacuating air in the cavity,
- a battery for supplying power to the vacuum pump,
- a release mechanism for introducing air into the cavity,
- a manual charger for manually recharging the battery,
- a manual pump for manually evacuating air in the cavity,
- a handle coupled to the base element,
- a battery gauge for monitoring a battery level,
- a pressure gauge for monitoring a pressure in the cavity,
- hookable element coupled to the base element for lifting the vacuum gripper with the object,
- a controller for regulating the vacuum pump to maintain a desired pressure in the cavity and for notifying of low battery levels
420

FIG. 4B

Operation 500 couples a vacuum gripper to a panel.

Operation 510 turns on a motor for generating a vacuum in a cavity of the vacuum gripper until reaching a vacuum or pressure level.

Operation 520 automatically turns off the motor when the vacuum or pressure level is reached.

*FIG. 5A*

Operation 500 couples a vacuum gripper to a panel.

Operation 540 turns on a motor for generating a vacuum in a cavity of the vacuum gripper.

Operation 550 operates a manual pump to generate vacuum in the cavity when a battery level is low and a pressure is low.

*FIG. 5B*

Operation 500 couples a vacuum gripper to a panel.

Operation 570 turns on a motor for generating a vacuum in a cavity of the vacuum gripper.

Operation 580 operates a manual charging system to charge a battery for the motor when the battery level is low.

*FIG. 5C*

Operation 700 places a vacuum gripper on a surface of a panel

Operation 710 turns on the vacuum pump in the vacuum gripper to secure the vacuum gripper to the panel Operation 720 checks for adhesion between the vacuum gripper and the panel when the pressure gauge in the vacuum gripper indicates a suitable pressure level Operation 730 couples cables having hook ends to the hookable elements of the vacuum gripper Operation 740 lifts the cables for transferring the panel

*FIG. 7A*

Operation 750 lowers cables coupled to hookable elements of a vacuum gripper so that a panel coupled to the vacuum gripper rests on a support Operation 760 turns off the vacuum pump in the vacuum gripper Operation 770 releases the panel from the vacuum gripper by letting air into a vacuum coupling between the vacuum gripper and the panel Operation 780 decouples the cables by removing the hook ends from the hookable elements of the vacuum gripper

*FIG. 7B*

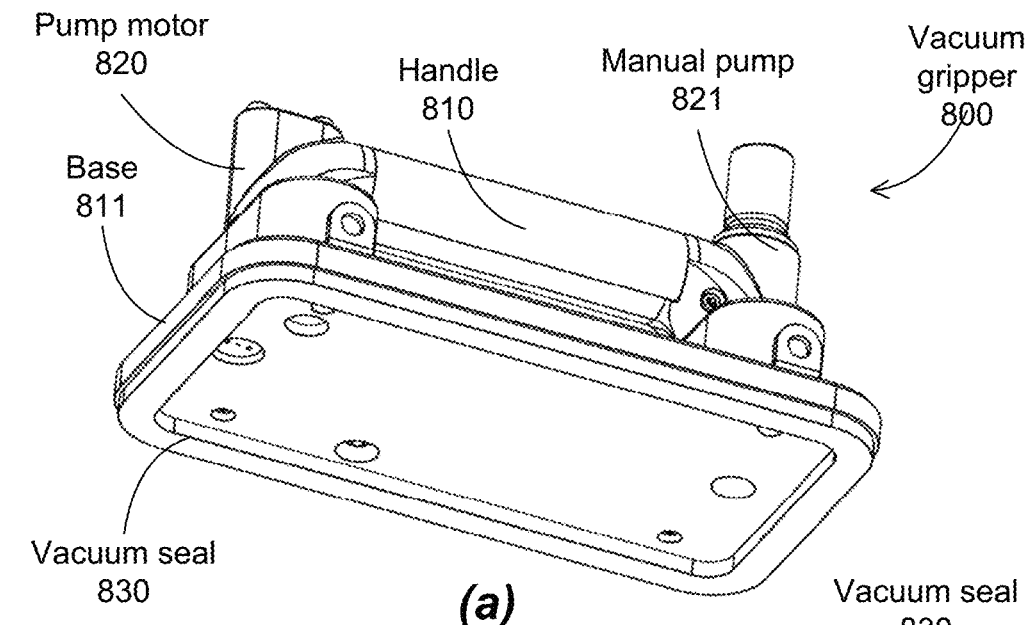
FIG. 8A
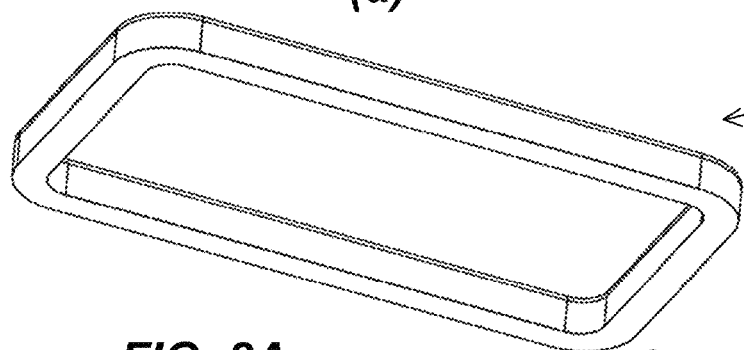
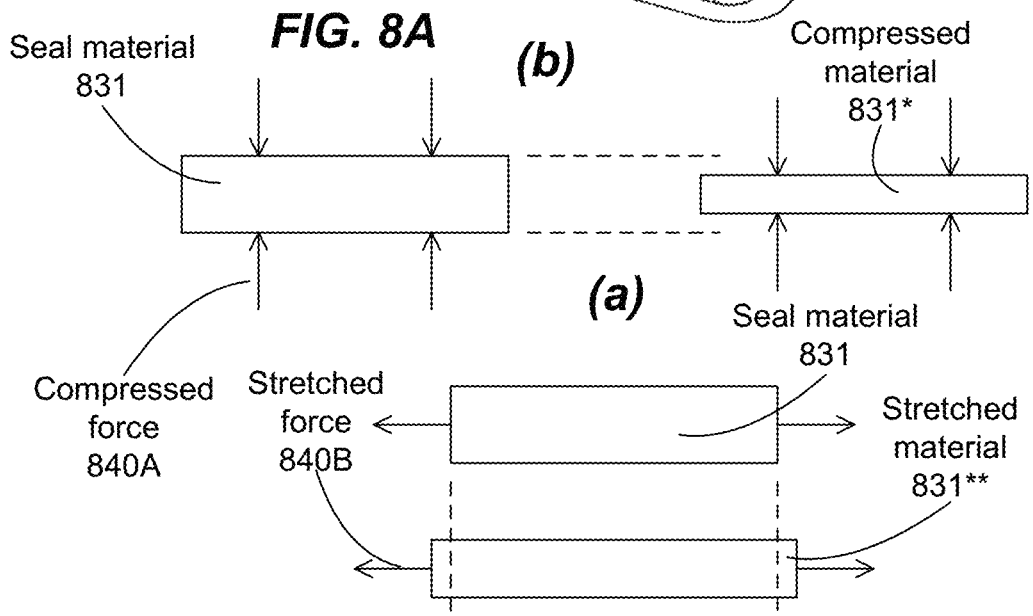
FIG. 8B

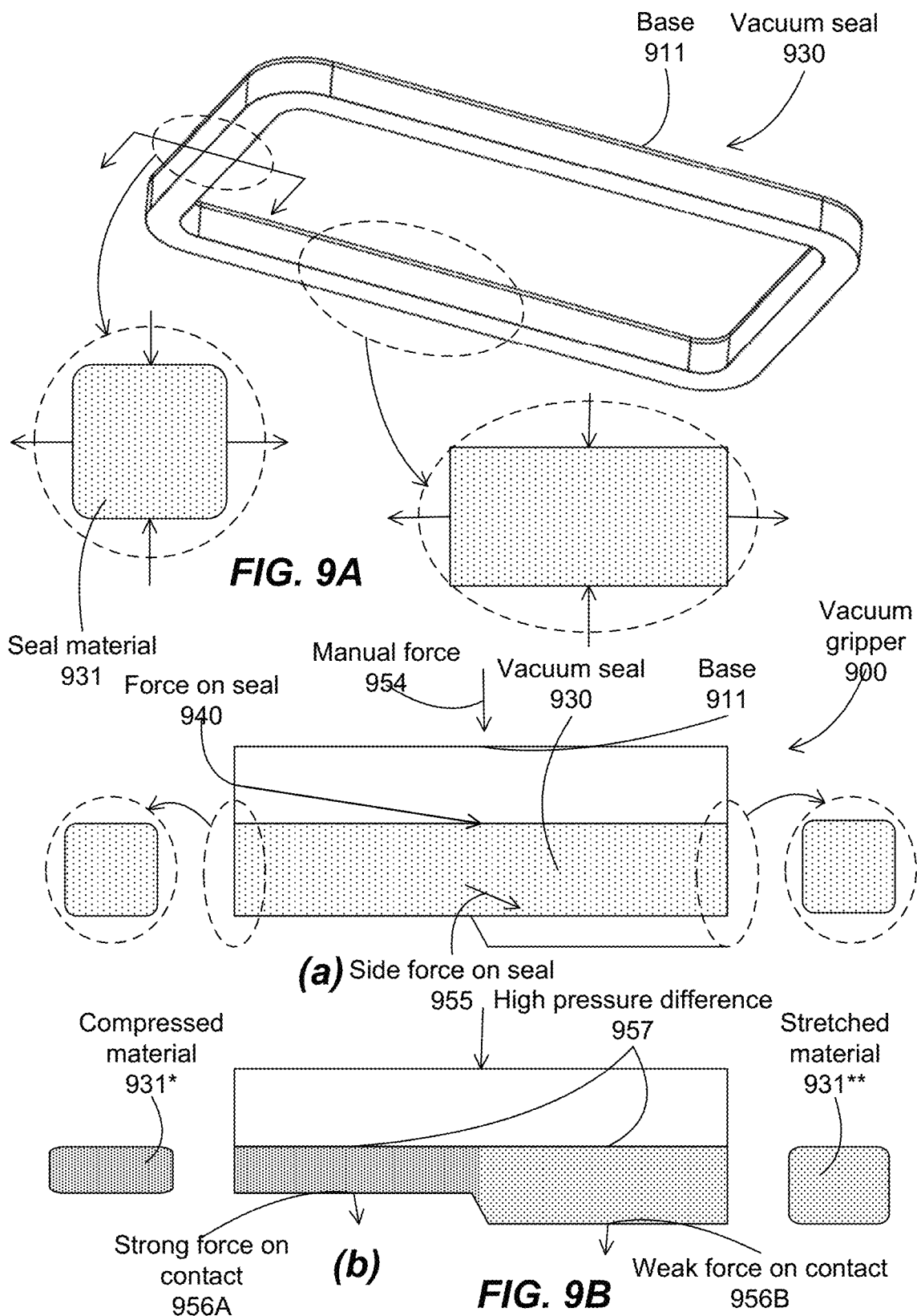

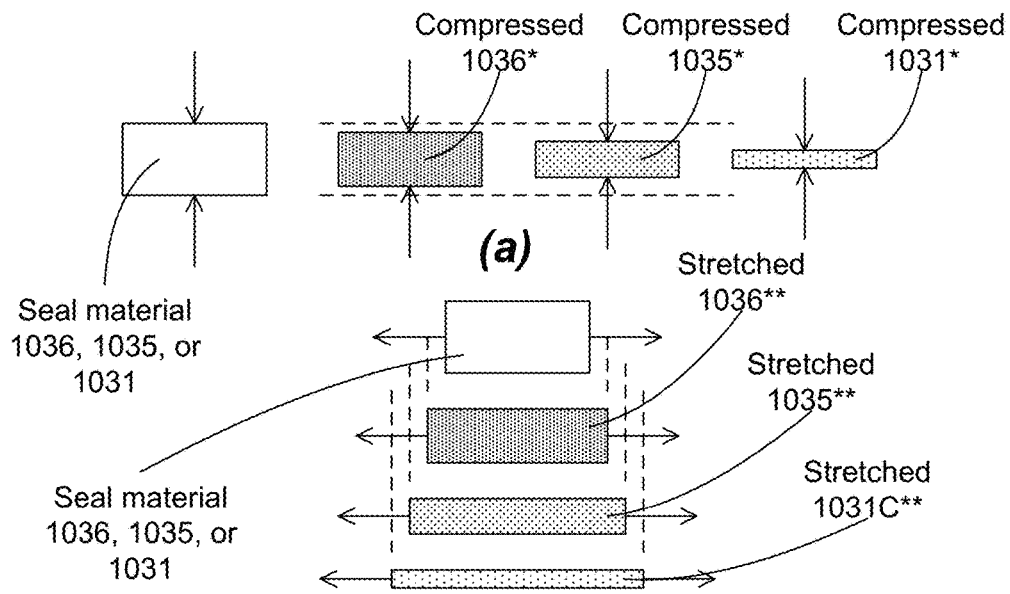
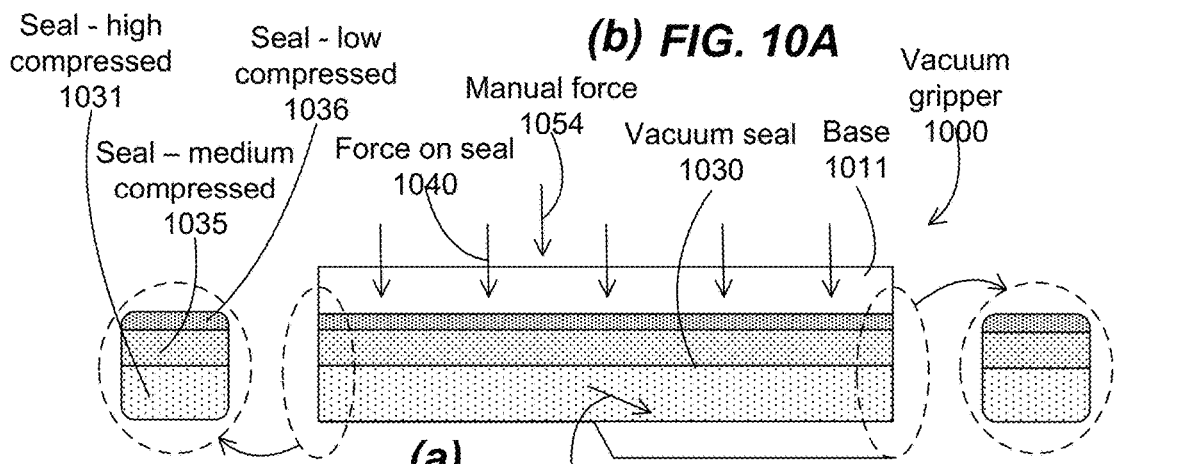
FIG. 10A
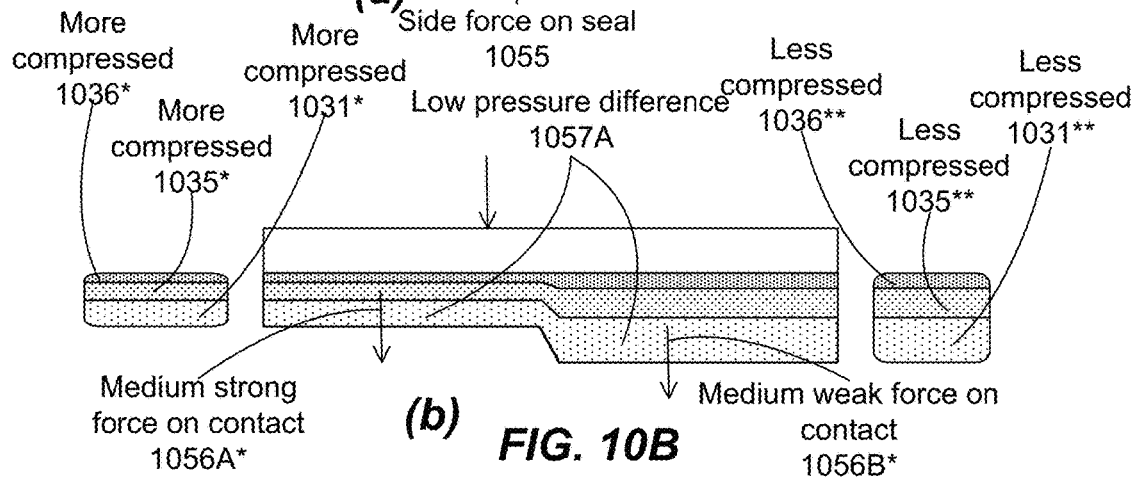
FIG. 10B

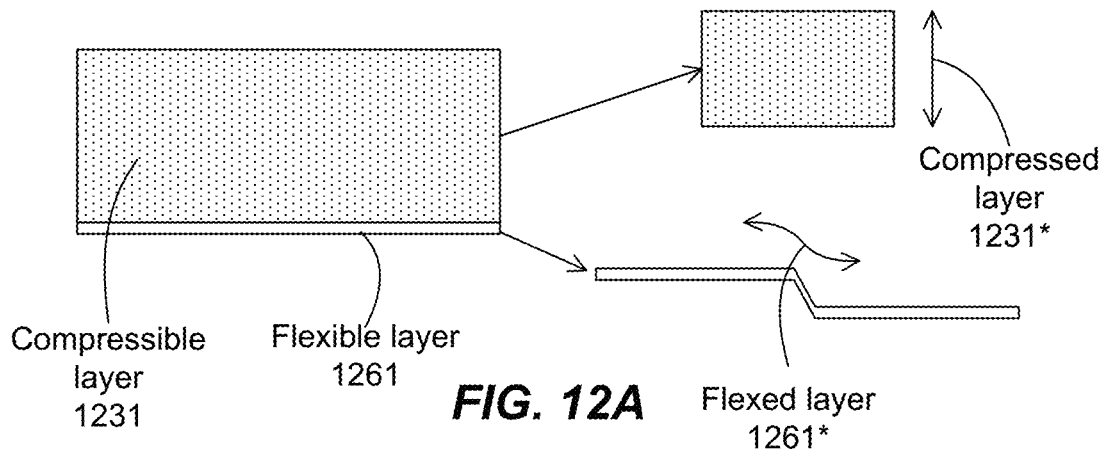
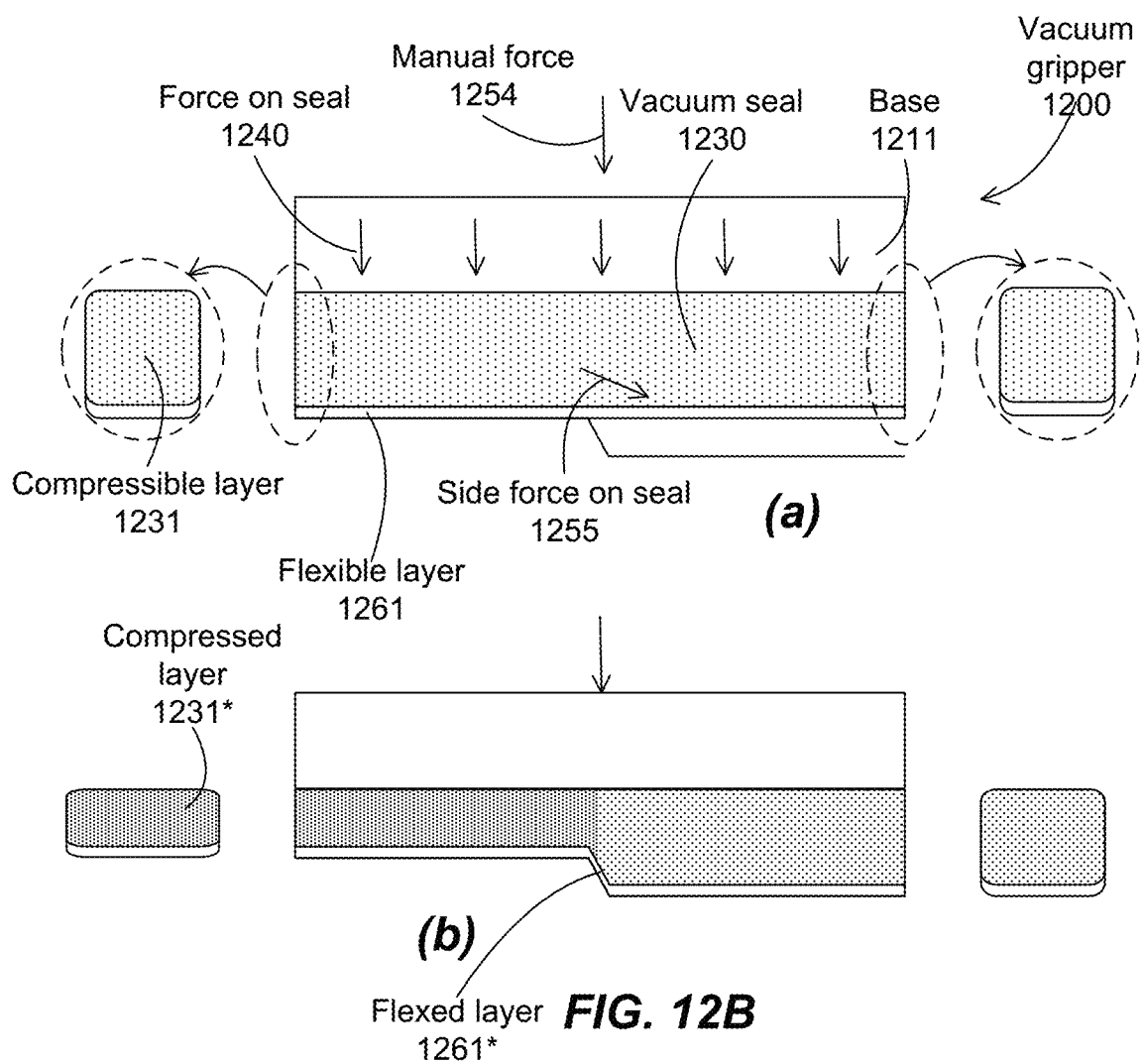

Forming a vacuum gripper for gripping an object surface.
The vacuum gripper includes
- a base element,
- a close-loop vacuum seal element coupled to a surface of the base element to form a sealed cavity when contacting the object surface,
- a vacuum pump coupled to the base element and fluidly communicated with the cavity for evacuating air in the cavity.
The vacuum seal element includes a compressible material having a gradual varying compressible property or multiple layers of different compressible properties.
The gradual varying compressible property or the multiple layers of different compressible properties are configured to balance contact forces on the vacuum seal element with a height variation of the object surface.
The vacuum seal element optionally includes a flexible layer coupled at a surface opposite the surface of the base element.
The flexible layer includes a more abrasion-resistant material than the compressible material of the vacuum seal element.
Alternatively, the vacuum seal element includes a pneumatic or hydraulic element having a flexible layer forming a fluid filled cavity.
The pneumatic or hydraulic element has a fluid filled cavity pressure optimized for a sealing of the vacuum seal element on a height variation object surface.
The vacuum gripper optionally includes a pumping mechanism to adjust a pressure of the fluid filled cavity.
1400

*FIG. 14A*

Operation 1420 generates a vacuum in a cavity of a vacuum gripper after coupling the vacuum gripper to a panel surface
Operation 1430 presses on the vacuum gripper at irregular surface locations of the panel surface to obtain a desired vacuum level

*FIG. 14B*

Forming a vacuum gripper for gripping an object surface.
The vacuum gripper includes
- a base element,
- a close-loop vacuum seal element coupled to a surface of the base element to form a sealed cavity when contacting the object surface,
- a vacuum pump coupled to the base element and fluidly communicated with the cavity for evacuating air in the cavity.

* The vacuum seal element includes a compressible material having a gradual varying compressible property.
* The vacuum seal element includes a compressible material having multiple layers of different compressible properties.
* The vacuum seal element includes a compressible structure having a pneumatic or hydraulic element having a flexible layer surrounding a fluid filled cavity.
* The vacuum seal element includes a compressible material on a flexible layer.
* The vacuum seal element includes a compressible material having a combination of two or more layers of a gradual varying compressible property, multiple layers of different compressible properties, a pneumatic or hydraulic element having a flexible layer forming a fluid filled cavity, or a flexible layer.

The layers of the vacuum seal element are optimized for a sealing of the vacuum seal element on a height variation object surface
1600

*FIG. 16*

Forming a vacuum seal for a vacuum gripper. The vacuum seal is configured to be compressible and stretchable. The vacuum seal can include an air pocket, The vacuum seal can include one layer of compressible and stretchable material, The vacuum seal can include multiple layers of compressible and stretchable material with different thicknesses
1700

FIG. 17A

Pressing on a vacuum seal of a vacuum gripper on an irregular surface. The vacuum seal is compressed more at higher surface areas and is stretched to lower surface areas so that the contact surface of the vacuum seal with the irregular surface is conformed to the irregular surface
1720

FIG. 17B

Pressing a multilayer vacuum seal of a vacuum gripper on an irregular surface. The bottom layers of the multilayers are compressed and stretched more than top layers so that the bottom surface of the seal is conformed to the irregular surface
1740

FIG. 17C

Pressing a vacuum seal having a flexible layer on a vacuum gripper on an irregular surface. The flexible layer is configured for smoothly conforming to the irregular surface
1760

FIG. 17D

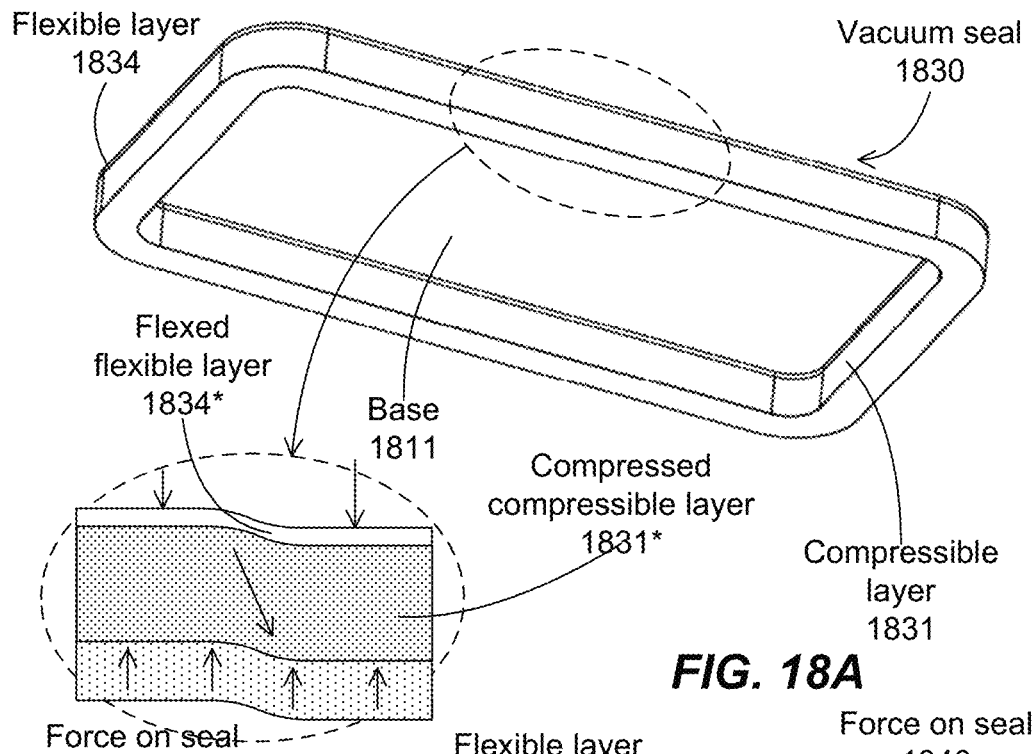
FIG. 18A
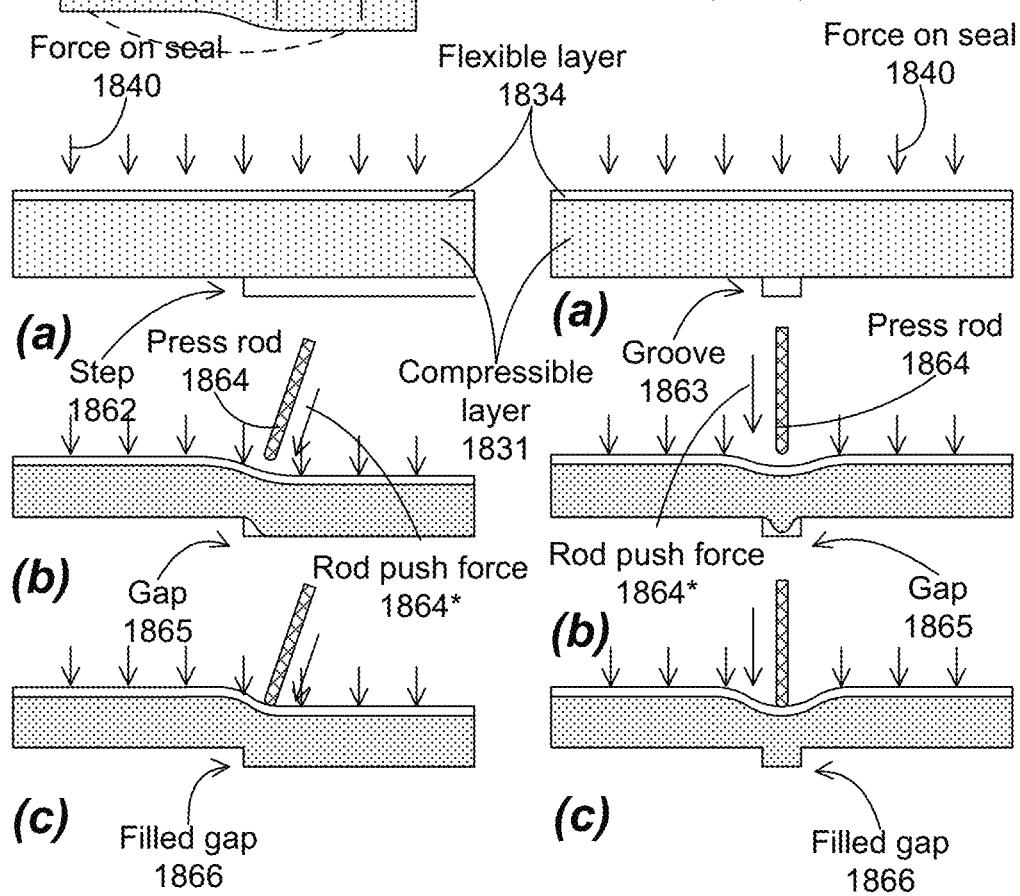
FIG. 18B       FIG. 18C

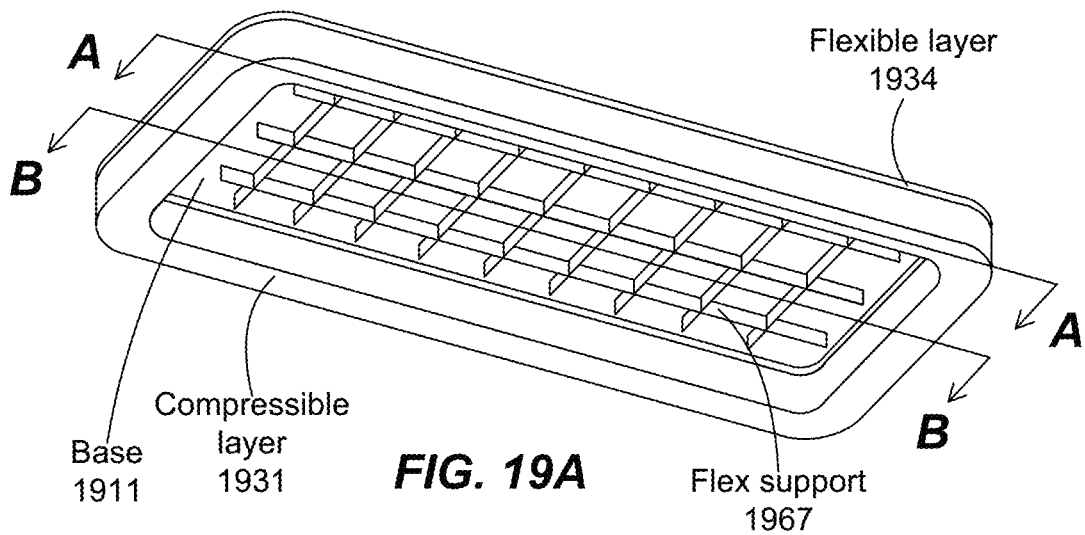
FIG. 19A
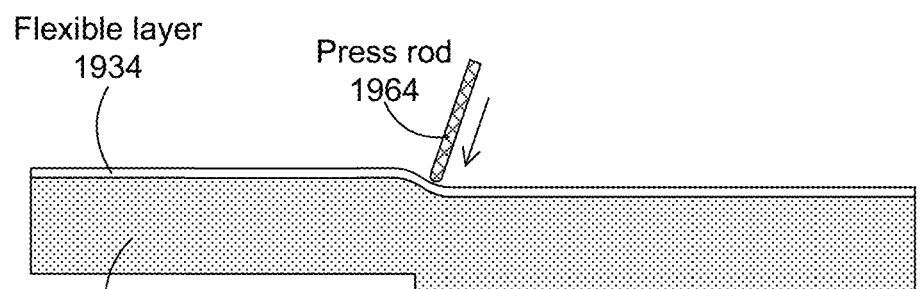
FIG. 19B (A – A)
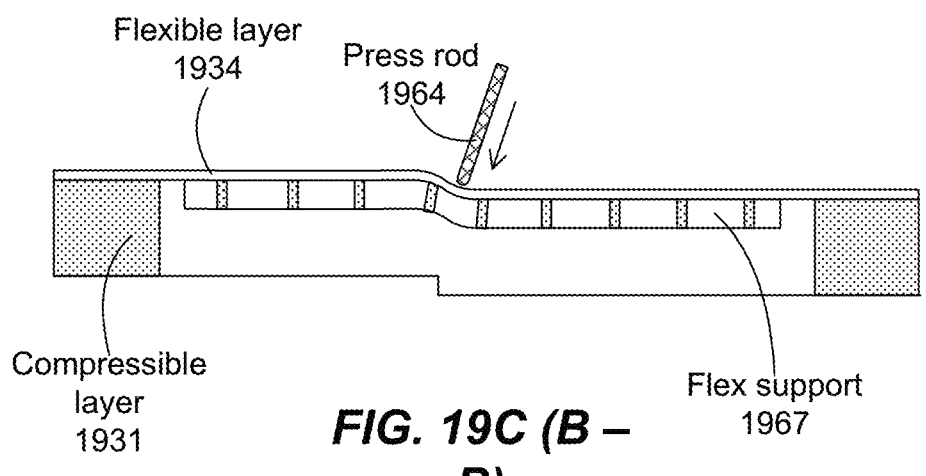
FIG. 19C (B – B)

Forming a vacuum gripper for gripping an object surface. The vacuum gripper includes
- a base element,
- a close-loop vacuum seal element coupled to a surface of the base element to form a sealed cavity when contacting the object surface,
- a vacuum pump coupled to the base element and fluidly communicated with the cavity for evacuating air in the cavity. The vacuum seal element includes a compressible material, a multiplayer compressible material, a composite gradually varied compressible material, or a compressible structure having a pneumatic or hydraulic element having a flexible layer surrounding a fluid filled cavity.

The vacuum gripper further includes a flexible layer disposed between the base element and the vacuum seal element.
The flexible layer is configured to deform in a same surface with a less localized pattern than the compressible material under a point indentation.
The flexible layer is configured to deform more in an opposite surface than the compressible material under the point indentation, by having higher hardness.
The flexible layer includes a flexible support in area inside the close-loop vacuum seal element.

The vacuum gripper optionally includes a press rod for pressing on the flexible layer to assist the compressible layer to be conformed to irregularities of the object surface.
2000

*FIG. 20A*

Operation 2020 generates a vacuum in a cavity of a vacuum gripper after coupling the vacuum gripper to a panel surface. Operation 2030 presses on selective areas of a vacuum seal element of the vacuum gripper to conform the vacuum seal element at irregular surface locations of the panel surface.

Forming a vacuum gripper for gripping an object surface.
The vacuum gripper includes
- a base element,
- a flexible layer at least partially coupled to a surface of the base element,
- a close-loop vacuum seal element at least partially coupled to the flexible layer, with the vacuum seal element configured to form a sealed cavity with at least one of the base element or the flexible layer when contacting the object surface,
- a vacuum pump coupled to the base element and fluidly communicated with the cavity for evacuating air in the cavity.

The vacuum seal element includes a compressible material, a multiplayer compressible material, a composite gradually varied compressible material, or a compressible structure having a pneumatic or hydraulic element having a flexible layer surrounding a fluid filled cavity.
- The flexible layer is less compressible than the compressible vacuum seal element,
- The flexible layer is configured to deform in a same surface with a less localized pattern than the compressible material under a point indentation.
The flexible layer is configured to deform more in an opposite surface than the compressible material under the point indentation, by having higher hardness.
The flexible layer includes a support in area inside or outside the close-loop vacuum seal element.
The support includes a flexible material or a compressible material.

The base element includes openings around a periphery at locations of the vacuum seal element for a press rod to press on the flexible layer or on the vacuum seal element to assist the compressible layer to be conformed to irregularities of the object surface.

Operation 2300 couples a vacuum gripper to a panel surface.

Operation 2310 turns on a motor for generating a vacuum in a cavity of the vacuum gripper.

Operation 2320 presses on the vacuum gripper to assist the vacuum seal element in conforming to surface irregularities of the panel surface.

Operation 2330 presses on selective areas of a vacuum seal element of the vacuum gripper, using a press rod, to further conform the vacuum seal element at the surface irregularities.

Operation 2340 continues presses on the vacuum gripper and on the vacuum seal until reaching a vacuum or pressure level.

Operation 2350 automatically turns off the motor when the vacuum or pressure level is reached.

Operation 2360 automatically turns on the motor when the vacuum in the cavity drops below the vacuum or pressure level.

Operation 2370 automatically turns on a charging system for charging a battery of the vacuum gripper when a battery level is below a predetermined battery level.

*FIG. 23*

Forming a vacuum gripper for gripping an object surface. The vacuum gripper includes
- a base element,
- a flexible layer having a compressible portion coupled to a surface of the base element,
- a close-loop vacuum seal element coupled to the flexible layer, with the vacuum seal element configured to form a sealed cavity with at least one of the base element or the flexible layer when contacting the object surface,
- a vacuum pump coupled to the base element and fluidly communicated with the cavity for evacuating air in the cavity.

The vacuum seal element includes a compressible material, a multiplayer compressible material, a composite gradually varied compressible material, or a compressible structure having a pneumatic or hydraulic element having a flexible layer surrounding a fluid filled cavity.

The base element includes at least an opening at a periphery of the vacuum seal element for a press rod to press on the flexible layer or on the vacuum seal element to assist the compressible layer to be conformed to irregularities of the object surface.
The compressible portion of the flexible layer is at a middle portion of the flexible layer inside the periphery of the vacuum seal element.
The compressible portion of the flexible layer is optionally at a portion of the flexible layer outside the periphery of the vacuum seal element.
The vacuum seal element optionally include a flexible portion inside the periphery of the vacuum seal element, with the flexible portion having a thickness less than the peripheral portion.
2500

FIG. 25

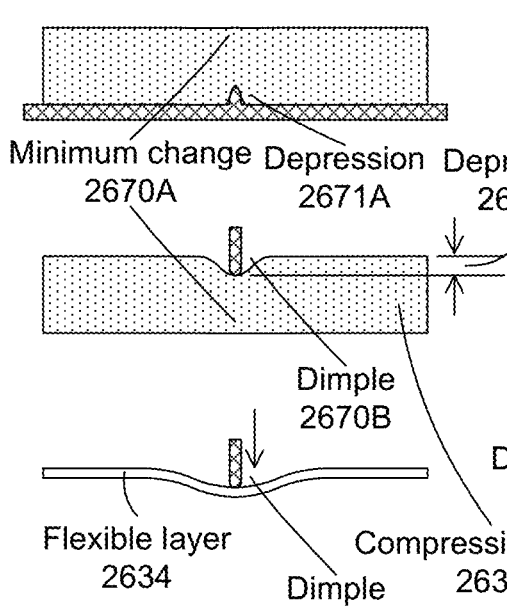
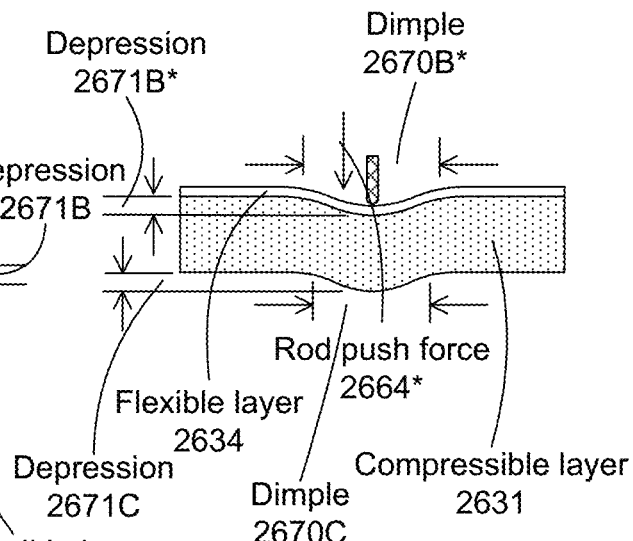
FIG. 26A  FIG. 26B
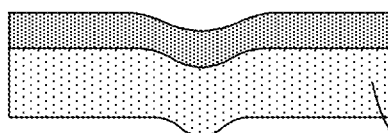
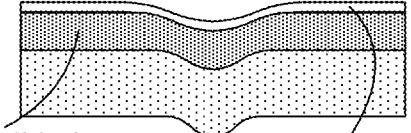
FIG. 26C  FIG. 26D
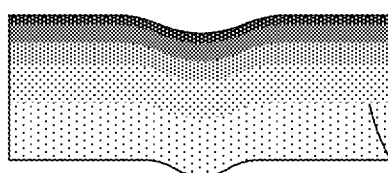
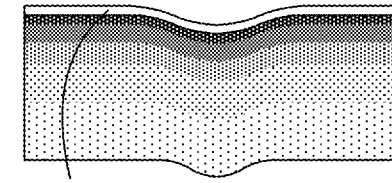
FIG. 26E  FIG. 26F
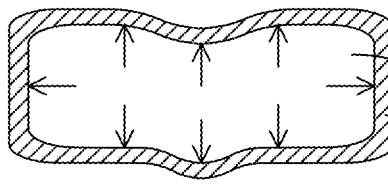
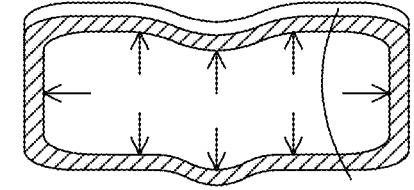
FIG. 26G  FIG. 26H

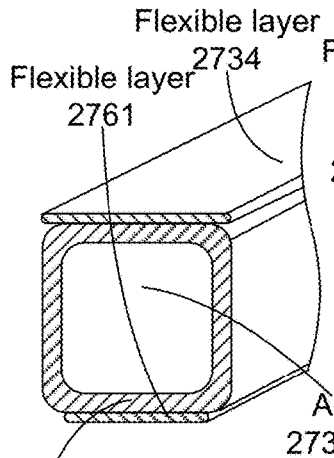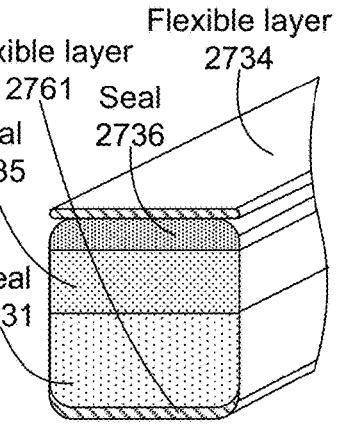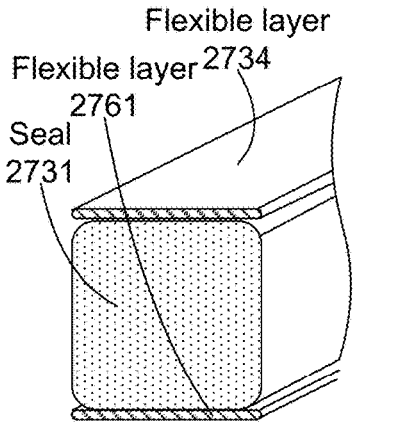
FIG. 27A  FIG. 27B  FIG. 27C
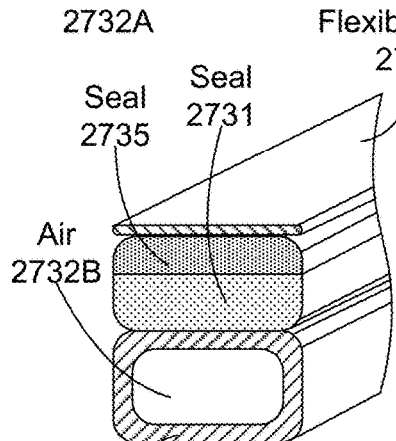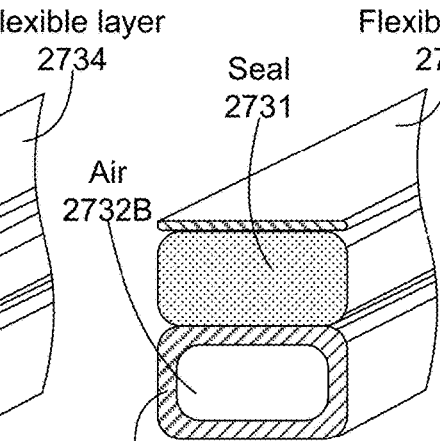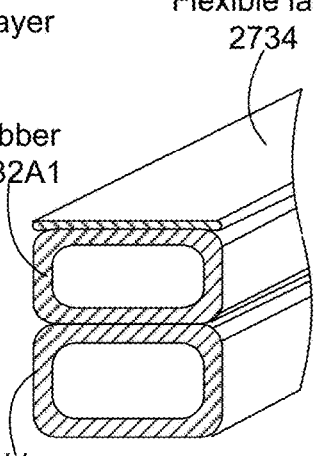
FIG. 27D  FIG. 27E  FIG. 27F
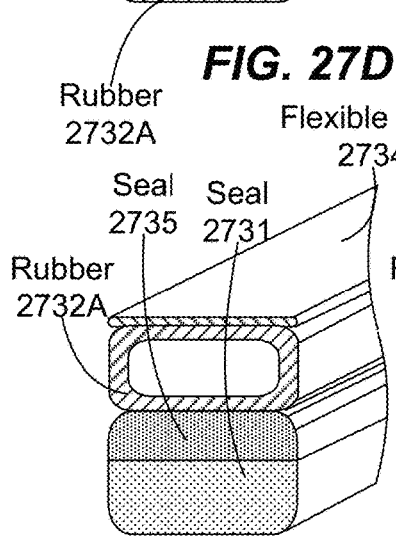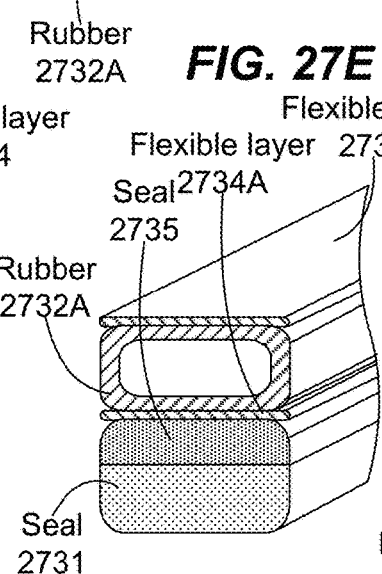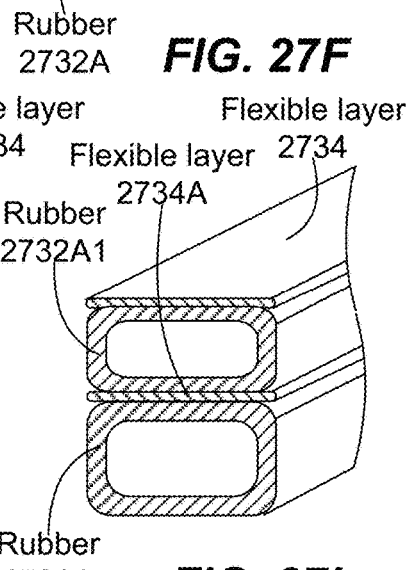
FIG. 27G  FIG. 27H  FIG. 27I Forming a vacuum gripper for gripping an object surface.
The vacuum gripper includes
- a base element,
- a flexible layer having a compressible portion coupled to a surface of the base element,
- a close-loop vacuum seal element coupled to the flexible layer, with the vacuum seal element configured to form a sealed cavity with at least one of the base element or the flexible layer when contacting the object surface,
- a vacuum pump coupled to the base element and fluidly communicated with the cavity for evacuating air in the cavity.

* The vacuum seal element includes a compressible material having a gradual varying compressible property.
* The vacuum seal element includes a compressible material having multiple layers of different compressible properties.
* The vacuum seal element includes a compressible structure having a pneumatic or hydraulic element having a flexible layer surrounding a fluid filled cavity.
* The vacuum seal element includes a compressible material on a flexible layer.
* The vacuum seal element includes a compressible material having a combination of two or more layers of a gradual varying compressible property, multiple layers of different compressible properties, a pneumatic or hydraulic element having a second flexible layer forming a fluid filled cavity, or a third flexible layer.
The layers of the vacuum seal element are optimized for a sealing of the vacuum seal element on a height variation object surface.

- The flexible layer is less compressible than the compressible vacuum seal element,
- The flexible layer is configured to deform in a same surface with a less localized pattern than the compressible material under a point indentation.
- The flexible layer is configured to deform more in an opposite surface than the compressible material under the point indentation, by having higher hardness.

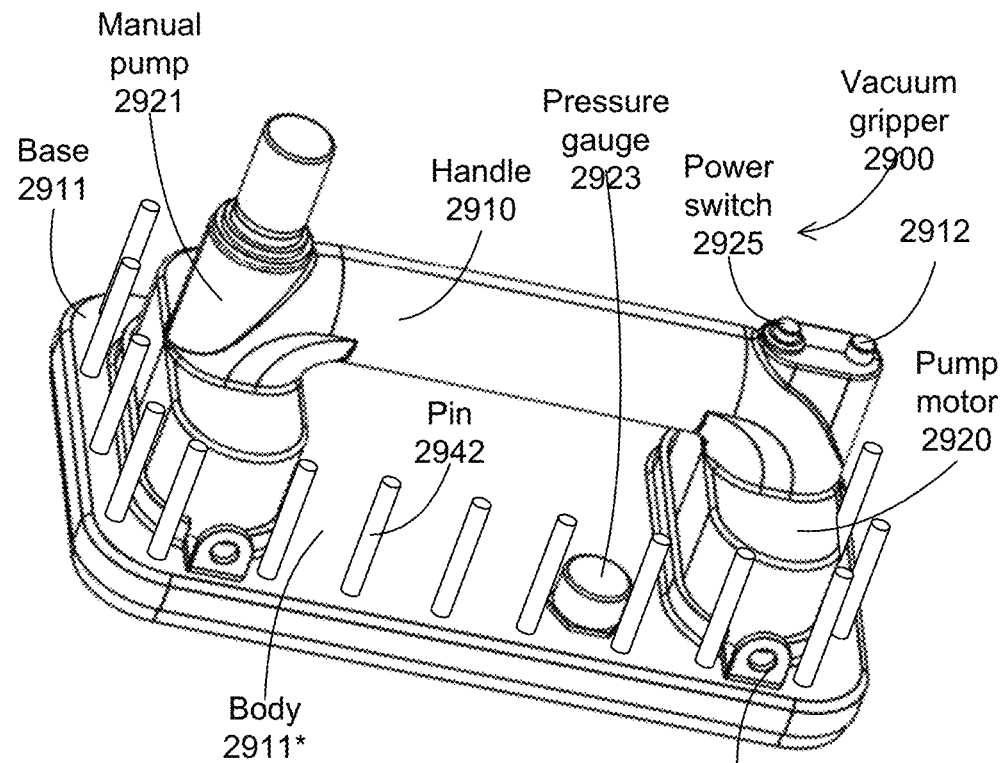
*FIG. 29A*
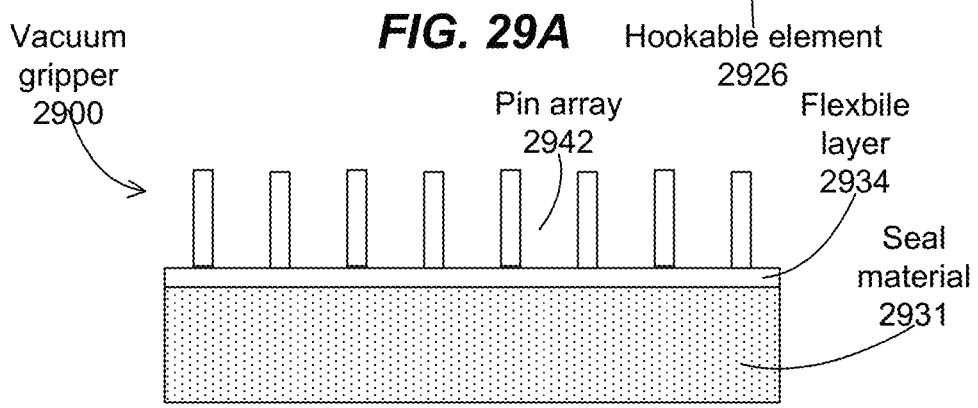
(a)
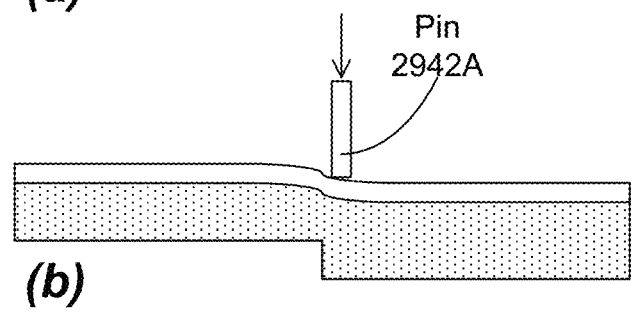
(b)
*FIG. 29B*

Forming a vacuum gripper for gripping an object surface.
The vacuum gripper includes
- a base element,
- a flexible layer having a compressible portion coupled to a surface of the base element,
- a close-loop vacuum seal element coupled to the flexible layer, with the vacuum seal element configured to form a sealed cavity with at least one of the base element or the flexible layer when contacting the object surface,
- a vacuum pump coupled to the base element and fluidly communicated with the cavity for evacuating air in the cavity.

The vacuum seal element includes a compressible material having a gradual varying compressible property, a compressible material having multiple layers of different compressible properties, a compressible structure having a pneumatic or hydraulic element having a flexible layer surrounding a fluid filled cavity, a compressible material on a flexible layer, or any combination thereof.
The layers of the vacuum seal element are optimized for a sealing of the vacuum seal element on a height variation object surface.

The flexible layer is configured to improve a conformation of the vacuum seal element on the object surface when being pressed.

The vacuum gripper includes movable pins disposed around a periphery at locations of the vacuum seal element for pressing on the flexible layer or on the vacuum seal element to assist the compressible layer to be conformed to irregularities of the object surface.
The movable pins are configured to be movable toward the vacuum seal element by sliding, by rotating, by screwing, or by pressing down.
3200

FIG. 32

Pressurizing a deformable air pocket disposed along a length of a seal to cause the seal to conform to an irregular surface
3300

FIG. 33A

Moving, toward an irregular surface, individual pins in an array of pins disposed along a length of a seal to cause the seal to conform to the irregular surface
3320

FIG. 33B

Sliding or rotating individual pins in an array of pins disposed along a length of a seal to cause the seal to conform to the irregular surface
3340

FIG. 33C

Screwing or pressing down individual pins in an array of pins disposed along a length of a seal to cause the seal to conform to the irregular surface
3360

FIG. 33D

PORTABLE VACUUM GRIPPER

The present application is a continuation of application Ser. No. 17/724,791, filed on Apr. 20, 2022, entitled "Portable vacuum gripper", which claims priority from U.S. Provisional Patent Applicant Ser. No. 63/176,890, filed on Apr. 20, 2021, entitled "Portable vacuum gripper", of the same inventors, hereby incorporated by reference in its entirety.

BACKGROUND OF THE INVENTION

Suction devices, such as vacuum grippers, can be used to grip for lifting flat objects using vacuum. The suction devices can include suction cups in which a partial vacuum, e.g., an air pressure lower than the atmospheric pressure, is produced to adhere the suction devices to the flat objects. The vacuum grippers typically require a seal between a surface of the vacuum gripper and a contacting surface on the object.

FIGS. 1A-1B illustrate examples of prior art vacuum grippers. In FIG. 1A, a vacuum gripper 100 includes a vacuum seal 130, e.g., a flexible material such as rubber, which can contact a surface of the object to make a seal with the object surface. The vacuum gripper 100 further includes a handle 110 for holding the vacuum gripper.

FIG. 1B shows another configuration of a vacuum gripper 100*, which includes two vacuum seals 130 connected by a handle 110. The vacuum gripper 100* also includes manual actuators for forming a vacuum under the vacuum seals 130.

SUMMARY OF THE EMBODIMENTS

In some embodiments, the present invention discloses a vacuum gripper for gripping an object surface using vacuum suction. The vacuum gripper is a portable vacuum gripper, e.g., having a handle to be carried by a person, with or without attaching to an object. With the handle, the portable vacuum gripper can be used for hand carry small objects. In addition, the portable vacuum gripper has multiple hookable elements configured to be coupled to cables having hook ends. With the hookable elements, the portable vacuum gripper can be used for hoisting large objects.

The vacuum gripper is configured for safe transportation of objects, by providing a long term vacuum generation capability through a controller regulating an air extraction mechanism to conserve and maximizing the usage of battery energy. The vacuum gripper is further configured with safeguard components to prevent vacuum loss when the vacuum gripper is transporting an object. The safeguard components include a recharging mechanism for recharging the battery on the job, for example, through a portable power pack or through an integrated power generator. The safeguard components include a manual vacuum pump for generating needed vacuum suction in the event that the battery-operated vacuum pump is malfunctioned.

The vacuum gripper is configured with an elastic deformable vacuum seal for gripping objects with irregular surfaces, such as rough surfaces, or surfaces with steps, grooves, or bumps. The deformable vacuum seal can be compressible and stretchable to conform to the irregular surface of the objects.

In some embodiments, the vacuum gripper includes a base element configured to expose top portions of the vacuum seal for ease of assisting the conformity of the vacuum seal with the object surface. For example, a press rod can be used to press on top areas of the vacuum seal, at locations that the vacuum seal forms gaps with the object surface. With the press rod pressing on a top side of the vacuum seal, the bottom side of the vacuum seal can protrude to fill in the gaps.

The vacuum seal is configured to allow a transfer of material, e.g., a protrusion at the bottom side when the top side is depressed. For example, a flexible layer with higher hardness can be disposed on a compressible layer of the vacuum seal, which can improve the material transfer for gap filling when pressed. Alternatively, multilayer compressible seal can be used with the top portion having higher hardness than the bottom portion.

The vacuum gripper can have a press rod, configured to be stored in the vacuum gripper, which can be used for pressing on the vacuum seal to improve the conformity with the object surface.

In some embodiments, the vacuum gripper includes an array of movable pins disposed on the vacuum seal at the periphery of the vacuum gripper. Pins of the pin array can be pressed to push the vacuum seal toward the object surface, for filling gaps between the vacuum seal and the object surface.

BRIEF DESCRIPTION OF THE DRAWINGS

FIGS. 2A-2G illustrate a portable vacuum gripper configuration according to some embodiments.

FIGS. 4A-4B illustrate flow charts for forming a portable vacuum gripper according to some embodiments.

FIGS. 5A-5C illustrate flow charts for operating a portable vacuum gripper according to some embodiments.

FIGS. 7A-7B illustrate flow charts for operating a vacuum gripper according to some embodiments.

FIGS. 8A-8B illustrate a configuration for a vacuum seal in a portable vacuum gripper according to some embodiments.

FIGS. 9A-9B illustrate a configuration for a vacuum seal according to some embodiments.

FIGS. 10A-10B illustrate a multilayer configuration for a vacuum seal according to some embodiments.

FIGS. 12A-12B illustrate a vacuum seal with a flexible bottom layer according to some embodiments.

FIGS. 14A-14B illustrate a vacuum gripper formation according to some embodiments.

FIG. 16 illustrates a formation process for a vacuum seal according to some embodiments.

FIGS. 17A-17D illustrate flow charts for forming and operating a vacuum seal in a portable vacuum gripper according to some embodiments.

FIGS. 18A-18C illustrate configurations for localized pressing on a vacuum seal according to some embodiments.

FIGS. 19A-19C illustrate a configuration for a flexible support for a flexible layer according to some embodiments.

FIGS. 20A-20B illustrate a formation and operation of a flexible support according to some embodiments.

FIGS. 21A-21C illustrate a configuration of a vacuum gripper having base openings according to some embodiments.

FIG. 22 illustrates a flow chart for forming a vacuum gripper with openings according to some embodiments.

FIG. 23 illustrates a process for operating a vacuum gripper with openings according to some embodiments.

FIG. 25 illustrates a process for forming a vacuum gripper according to some embodiments.

FIGS. 26A-26H illustrate configurations of a vacuum seal according to some embodiments.

FIGS. 27A-27I illustrate configurations for a vacuum seal according to some embodiments.

FIG. 28 illustrates a process to form a vacuum gripper according to some embodiments.

FIGS. 29A-29B illustrate a portable vacuum gripper having seal deforming components according to some embodiments.

FIG. 32 illustrates a process for forming a vacuum gripper having a pin array according to some embodiments.

FIGS. 33A-33D illustrate flow charts for operating seal deforming components in a portable vacuum gripper according to some embodiments.

DETAILED DESCRIPTION OF THE EMBODIMENTS

Figure 1A:
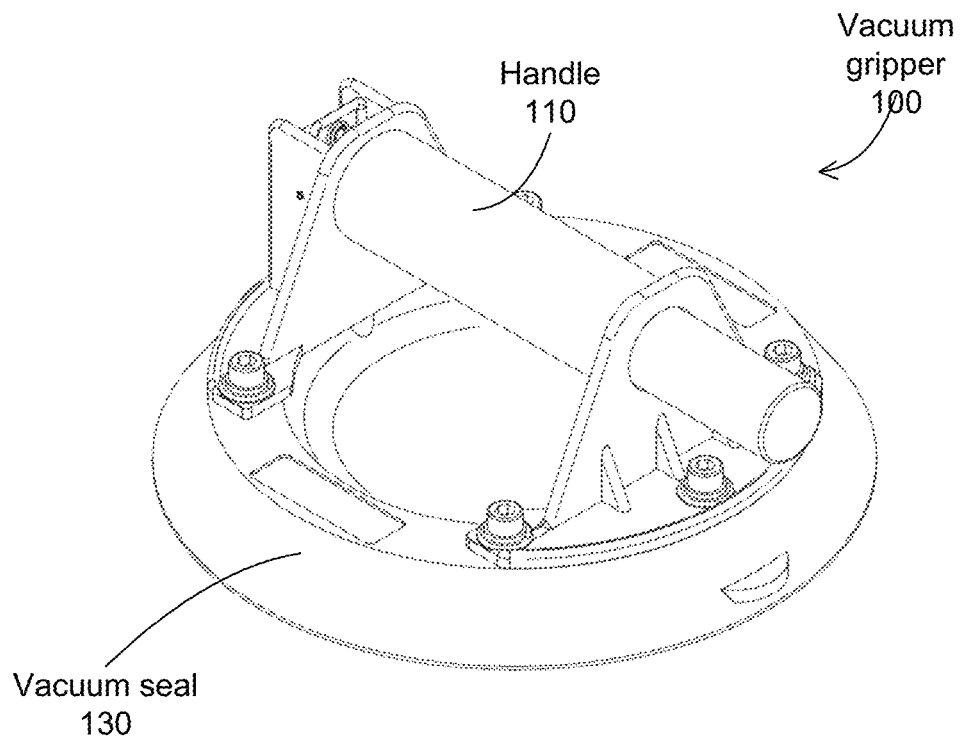
FIGS. 1A-1B illustrate examples of prior art vacuum grippers.
Figure 1B:
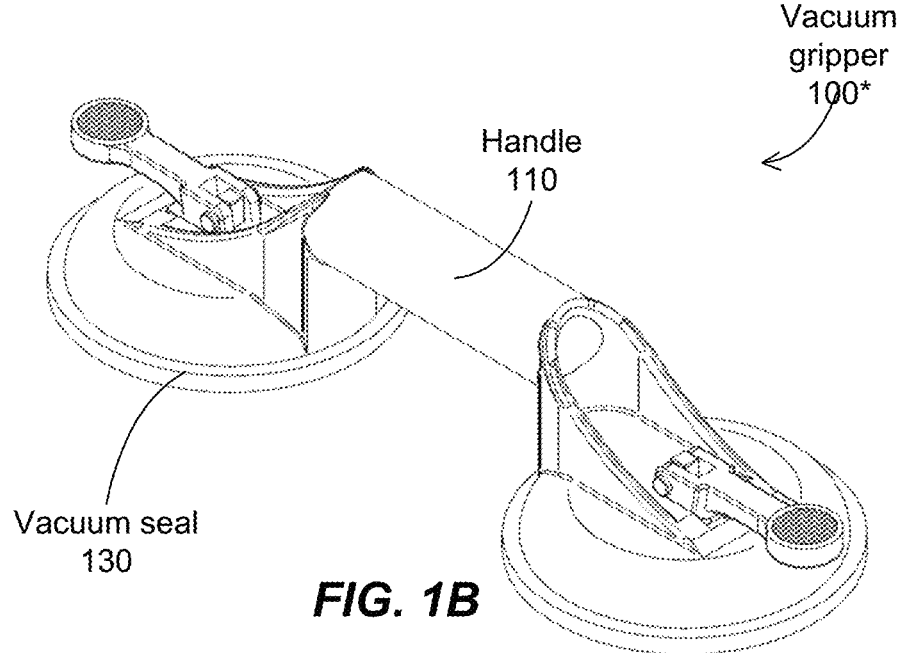

In some embodiments, the present invention discloses a portable vacuum gripper using suction for lifting objects. The portable vacuum gripper can include a body having a hollow cavity for forming a vacuum, e.g., having an air pressure lower than the atmospheric pressure within the cavity. The vacuum gripper is configured to grip the object, at the object surface, using the vacuum formed in the cavity. The body of the portable vacuum gripper can have components configured to lifting, such as a handle for a manual lifting, or one or more hooks for lifting the object using connected cables.

The vacuum gripper has a high surface area for increasing suction, and a low volume cavity volume for fast response, e.g., fast pressure reduction. Also, the vacuum gripper is configured to be coupled to irregular surfaces by having a vacuum seal designed for better conforming to the irregular surfaces. In addition, the vacuum gripper is designed with power saving features for long term usages, such as a controller to regulate a vacuum pump to reduce battery consumption, together with a manual or portable battery recharge to prolong the vacuum gripper capability when the battery runs out.

The portable vacuum gripper can include a seal extending around a periphery of the hollow cavity for sealing the with an object surface. Using deformable materials, such as highly elastic deformable, e.g., at least mostly returning to the original shape after being deformed, including compressible and stretchable characteristics for the vacuum seal element, the portable vacuum gripper can be used on irregular surfaces, such as non smooth surfaces including rough surfaces, surfaces with steps, or surfaces with grooves, of objects while still obtaining a vacuum level.

The portable vacuum gripper can include a vacuum generating system, e.g., an air extraction mechanism, such as a vacuum pump using a motor powered by a power source, such as by a battery pack. A controller can be included for controlling the vacuum pump, such as for automatically maintaining a vacuum level in the hollow cavity. For example, the controller can be configured to turn off or slow down the vacuum pump when the vacuum level reaches a predetermined level, e.g., when the pressure in the cavity reduces to the predetermined pressure level. The controller can be configured to turn on or speed up the vacuum pump when the vacuum level drops below the predetermined level, e.g., the pressure in the cavity is higher than the predetermined pressure level. A pressure gauge can also be included, to provide visual indication of the vacuum level, e.g., the below-atmospheric pressure of the hollow cavity indicating the vacuum level.

As used herein, the term "vacuum level" is used to mean "lower-than-atmospheric pressure level", and thus can be used interchangeable with "pressure level", since a vacuum is an environment in which there is less air as compared to the atmosphere, and thus a vacuum level is a pressure level having lower than the atmospheric pressure. Specifically, a vacuum level is a pressure level lower than the atmospheric pressure, and a pressure level can be a pressure level lower, similar, or higher than the atmospheric pressure.

In some embodiments, the portable vacuum gripper can include a manual charger system for charging the battery pack. For example, the manual charging system can include a motor configured to generate a voltage when being rotated by a manual handle. The manual charging system can include a portable battery back, which can be connected to the battery of the vacuum gripper to charge the battery. The manual charging system can ensure that the portable vacuum gripper can have power to maintain the vacuum level, for example, when the vacuum gripper is gripping an object to lift the object. The manual charging system can thus prolong the gripping ability, by supplying power to the battery, for the vacuum gripper to at least finish the gripping and lifting job.

In some embodiments, the vacuum gripper can have a battery alarm to alert an operator about a potential problem with the battery, such as a low power level for the battery. The alarm can be a beeping sound, or a flashing light, or an indicator light.

In some embodiments, the portable vacuum gripper can include a manual pumping system for pumping air from the hollow cavity, e.g., to maintain the vacuum level. For example, the manual pumping system can include a piston-cylinder configuration in which an operator can push on the piston to pump air out of the cavity. The manual pumping system can ensure that the portable vacuum gripper can maintain the vacuum level, for example, by an operator pumping the manual pump when the battery pack runs out of power and when the vacuum level is reduced, e.g., the pressure is higher than the predetermined pressure level due to, for example, a gradual air leak. The manual pumping system can ensure that the portable vacuum gripper can maintain the vacuum level, for example, when the vacuum gripper is gripping an object to lift the object. The manual pumping system can thus prolong the gripping ability, by manually extracting air from the cavity to maintain the vacuum level in the cavity, for the vacuum gripper to at least finish the gripping and lifting job. The manual pumping system can be an alternative, or an addition to the manual charging system, which can assist the vacuum gripper when there is no portable battery pack available.

In some embodiments, the vacuum gripper can have a vacuum alarm to alert an operator about a potential problem with the vacuum level in the cavity, such as a high pressure level for the cavity. The high pressure level of the alarm can be lower than the pressure level for the vacuum pump to turn on, which can provide adequate time for the operator to find a remedy. The vacuum alarm can be coupled to the battery alarm, for example, the vacuum alarm is disabled when there is enough power in the battery, since the vacuum pump can restore the vacuum level in the cavity. Only when there is no battery, the vacuum alarm can be activated to alert the operator.

In some embodiments, the portable vacuum gripper can include components configured to selectively pushing on portions of the vacuum seal. For example, when sealing a step surface, the components can exert a force on the lower step surface area and at the vicinity of the step, to ensure that the vacuum seal is contacting the step surface without or with minimum gaps, e.g., to minimize air leak. The components can include a pressurized pocket disposed along the length of the vacuum seal, which can push on the areas of the seal disposed on the surface of the lower step areas. The components can include an array of pins disposed along the length of the vacuum seal, which can allow an operator to push on selective pins to form a complete seal.

General Configuration of a Vacuum Gripper

In some embodiments, a portable vacuum gripper can include a body or a base element for housing a motorized vacuum pump with a battery pack and a manual vacuum pump, together with a handle for holding the gripper, features for mounting a pressure gauge and a vacuum release button. The portable vacuum gripper can include a seal extending around a periphery of the body for sealing a vacuum between the gripper and an object.

Figure 2A:
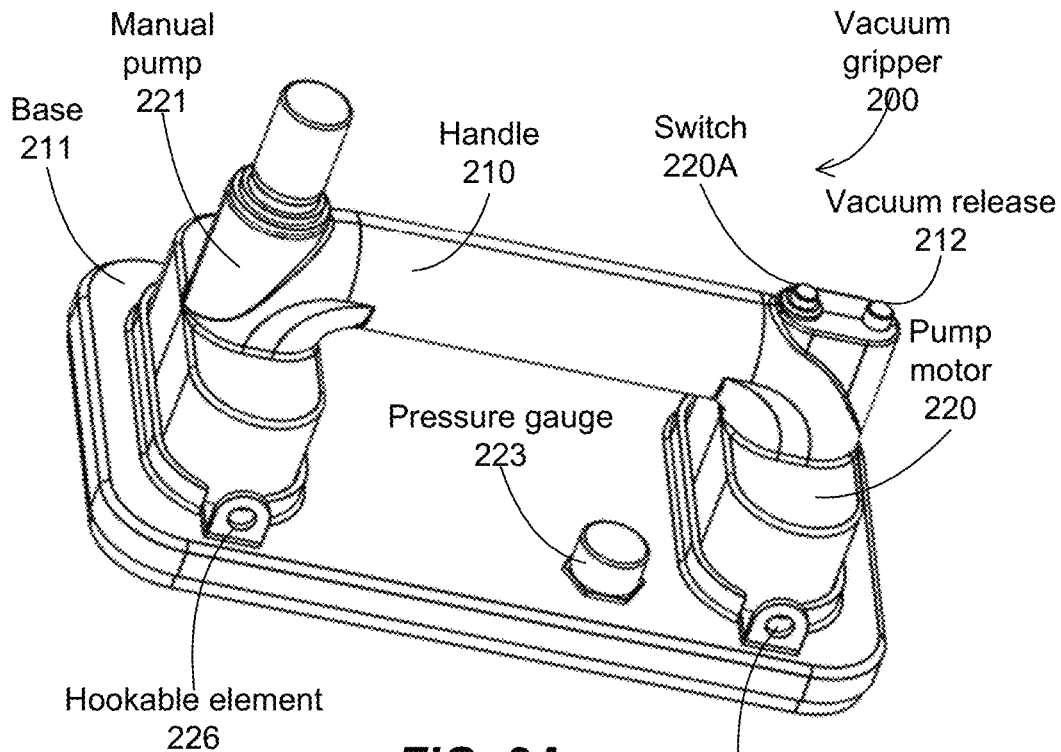

FIGS. 2A-2G illustrate a portable vacuum gripper configuration according to some embodiments. FIG. 2A shows a perspective view of the portable vacuum gripper 200 viewed from above, showing a body or base 211 of the gripper, together with other components such as the motorized pump 220, the manual pump 221, the gripper handle 210 housing a battery pack, and a manual vacuum release button 212. There are other components, such as a power switch 220A for turning on or off the motorized pump 220, hookable elements 226 for coupling with lifting cables, and pressure gauge 223 for monitoring the pressure or vacuum level in the cavity. The pressure gauge can allow detections of proper or poor operations of the vacuum gripper, for example, by showing the vacuum pressure level in the cavity. For vacuum level below an indicator mark on the pressure gauge, the vacuum gripper has adequate vacuum suction to hold and lift the object. For vacuum level above the indicator mark, the vacuum gripper does not have adequate vacuum suction. Inspection of the vacuum gripper should be performed, such as checking for proper seal with the object surface, or for wear and tear of the vacuum seal element.

Figure 2B:
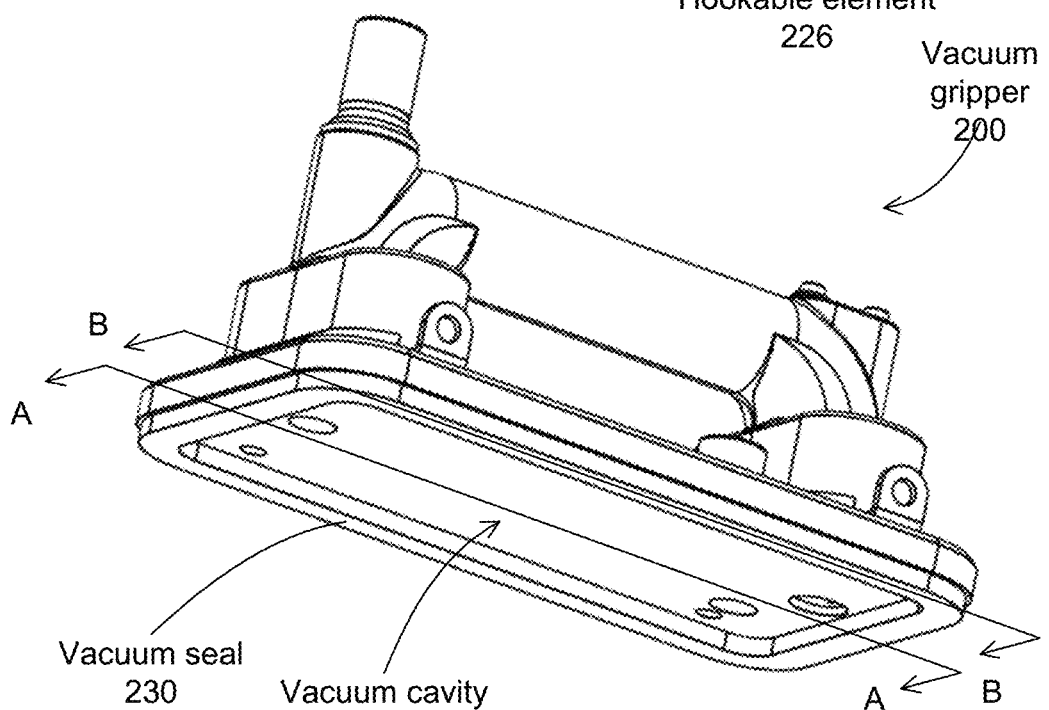

FIG. 2B shows a perspective view of the portable vacuum gripper 200 viewed from below, showing the seal 230 surrounding a hollow cavity 215.

In operation, the portable vacuum gripper can be placed on a surface of an object to be lifted, with the seal 230 contacting the object surface. The vacuum pump can be activated, e.g., turning on the motorized vacuum pump or manually pumping the manual vacuum pump, to evacuate air from the cavity 215, to form a vacuum in the cavity 215, e.g., to generate a pressure level in the cavity that is less than the ambient atmospheric pressure. The vacuum cavity can generate a suction force to adhere the portable vacuum gripper to the object. Views from cut lines AA and BB are discussed in later sections.

In general, the vacuum gripper 200 can include a rigid base element 211 and a loop-shaped vacuum seal element 230. The seal element 230 is attached at least indirectly to the base element. The seal element 230 is elastically deformable, for example, compressible when being pressed, and stretchable when encountering roughness on the object surface to conform to the object surface. The vacuum level in the cavity can be generated by an air extraction mechanism, such as a motorized vacuum pump, e.g., a pump configured for extract gas from the cavity.

The vacuum seal element 230 can surround a periphery of the base element 211. In some embodiments, the vacuum seal element can be smaller than the base element, thus there is an extended portion of the base element extending from the vacuum seal element.

FIG. 2C shows a cross section according to cut A-A through a middle of the portable vacuum gripper and FIG. 2D shows a cross section according to cut B-B through a portion near an edge of the portable vacuum gripper.

A portable vacuum gripper 200 can include a body 211, which can include a handle 210 on a body portion. The handle 210 can be configured to house a motorized pump 220 and a manual pump 221 at two sides, and to house a battery pack 222 in the handle portion. The body 211 can be configured to house a manual vacuum release button 212, a pressure gauge 223, and a controller 224 for maintaining the vacuum level in the cavity 215. A manual charging system 213 can be included for manually charging the battery. The manual charging system can include a motor having a handle to rotate a shaft of the motor. The motor output can be coupled to a circuitry, which is coupled to the battery pack 222, to generate a suitable voltage for charging the battery pack 222. A battery charger connector 222A can be provided for charging the battery, for example, through a portable power source, such as a portable battery pack.

A vacuum seal 220 can be coupled to a bottom portion of the body, such as surrounding a periphery of the bottom surface of the portable vacuum gripper. In general, the vacuum seal 220 can have a loop shape seal, such as a ring. In operation, the vacuum seal can be disposed on an object surface, to form a close cavity 215. The vacuum seal can be made of a compressible and stretchable material, to allow the portable vacuum gripper to adhere to objects having an irregular surface, such as a rough surface, a step surface, a grooved surface, or a surface having cracks or grooves.

The portable vacuum gripper can include seal stoppers or a filler 214, disposed in the cavity at a bottom portion of the portable vacuum gripper. The seal stopper 214 can be configured to stop the compression of the vacuum seal 220, for example, by having a non-compressible material or a material having less compressible than the vacuum seal. The seal stopper can also be configured as a filler for the cavity, for example, to reduce the volume of the cavity without changing the contact surface area of the cavity with the object surface. The seal stopper can be configured with minimum surface area facing the object surface, such as having channels along the bottom surface area. Thus, in operation, when the vacuum seal is compressed under the vacuum force, the vacuum seal compression is stopped at the seal stopper 214.

Figure 2E:
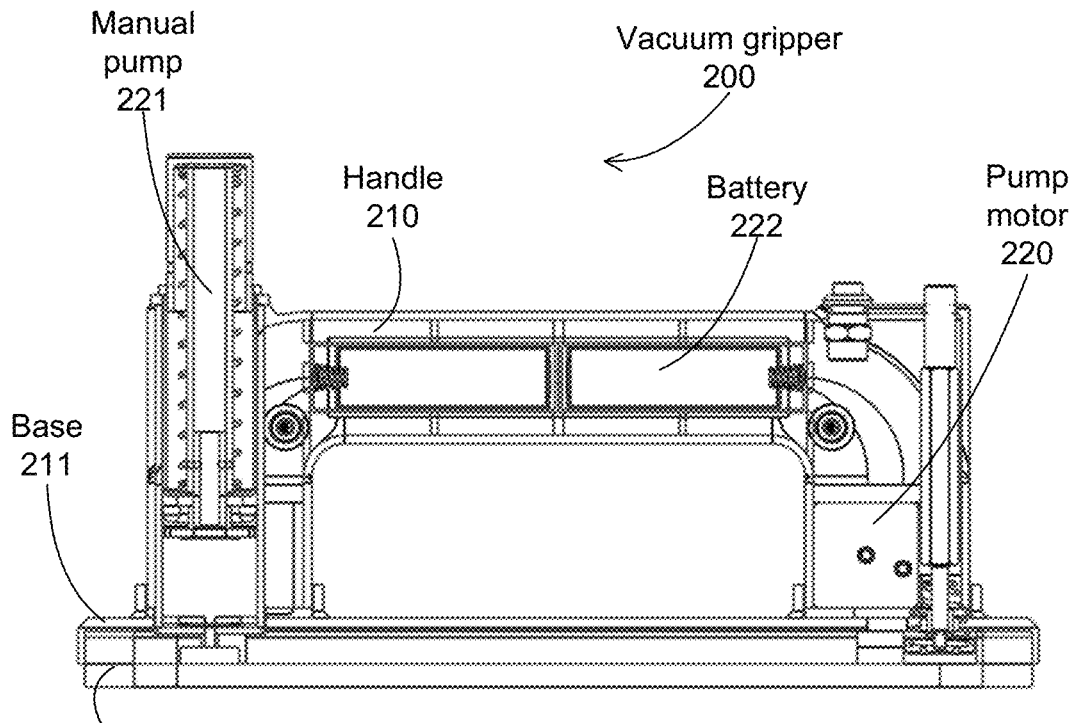
Figure 2F:
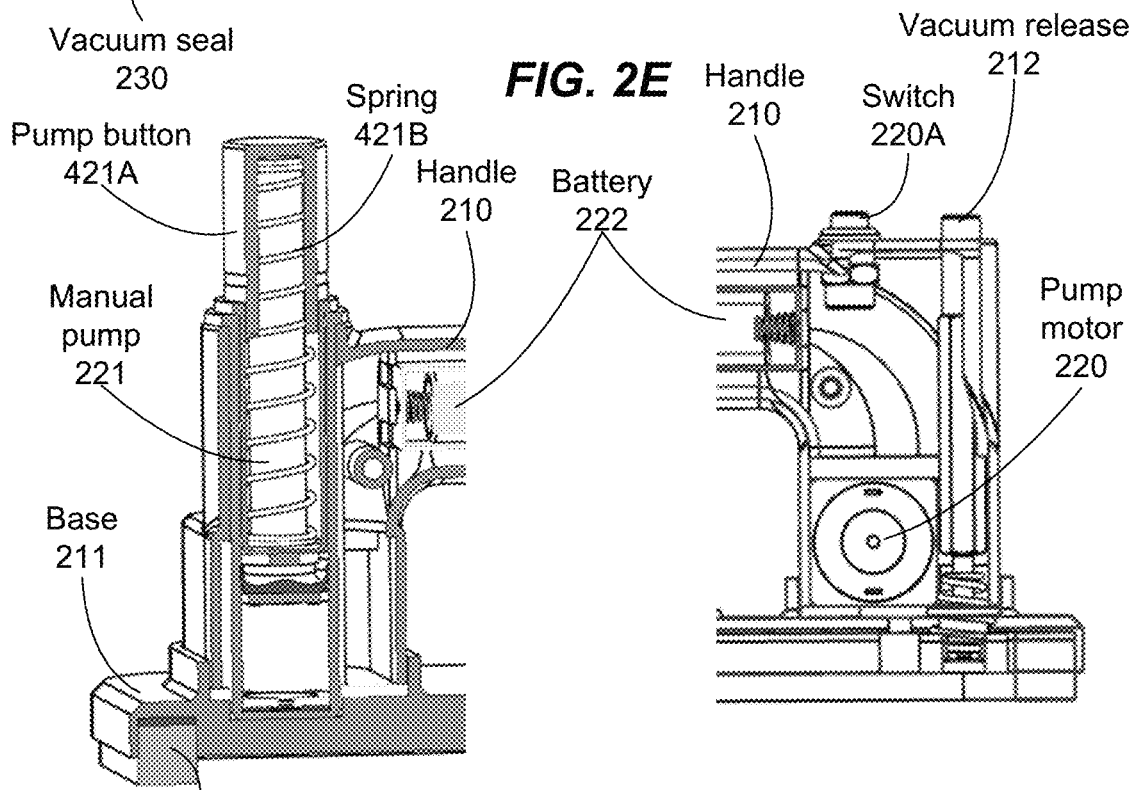
Figure 2G:
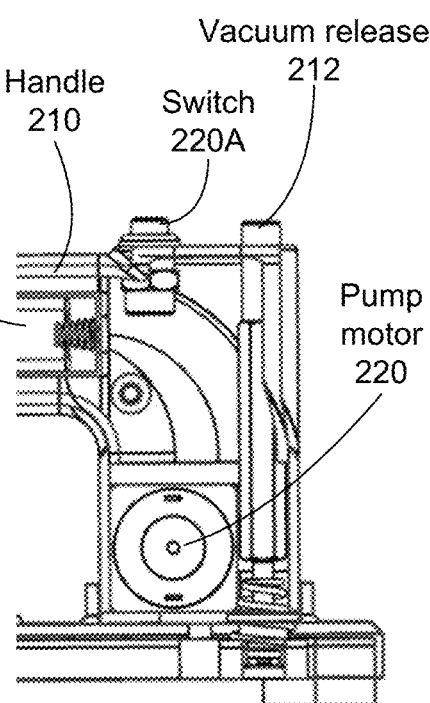

FIG. 2E shows a cross section through a middle of the portable vacuum gripper. FIG. 2F shows a cross section through a manual pump. FIG. 2G shows a cross section through a motorized pump of the portable vacuum gripper.

A portable vacuum gripper 200 can include a body 211, which can include a handle 210 having a U shape to house a motorized pump 220, a manual pump 221, and a battery pack 222. A vacuum seal 220 can be coupled to a bottom portion of the body 211.

The manual vacuum pump can be configured to evacuate air in a cavity of the portable vacuum gripper. The pumping action can include a pushing down on a pump button 221A, with the spring 221B configured to return the pump button to the original position. Thus, by repeatedly pushing on the pump button, the air in the cavity can be evacuated to form a vacuum cavity.

The motorized pump 220 can be connected to the battery pack 222 through a power switch 220A, which can be used to manually turn on or off the motorized pump. The motorized pump can also be controlled by a controller (not shown), to regulate the vacuum level in the cavity. The motorized pump can include an on-off motor, e.g., a motor can be turned on or off, or a variable motor, e.g., a motor can have its speed regulated.

The portable vacuum gripper can include a pressure gauge for monitoring the vacuum level in the cavity, e.g., the pressure level below the atmospheric pressure. The portable vacuum gripper can include a manual vacuum release button, which can be coupled to a seal to a release conduit. When the manual vacuum release button is pressed, the seal is open to allow air to enter the cavity, raising the pressure n the cavity, e.g., reducing the vacuum level. When the manual vacuum release button is released, a spring can push back on the button to re-engage the seal to stop the air flow.

Exploded View

Figure 3:
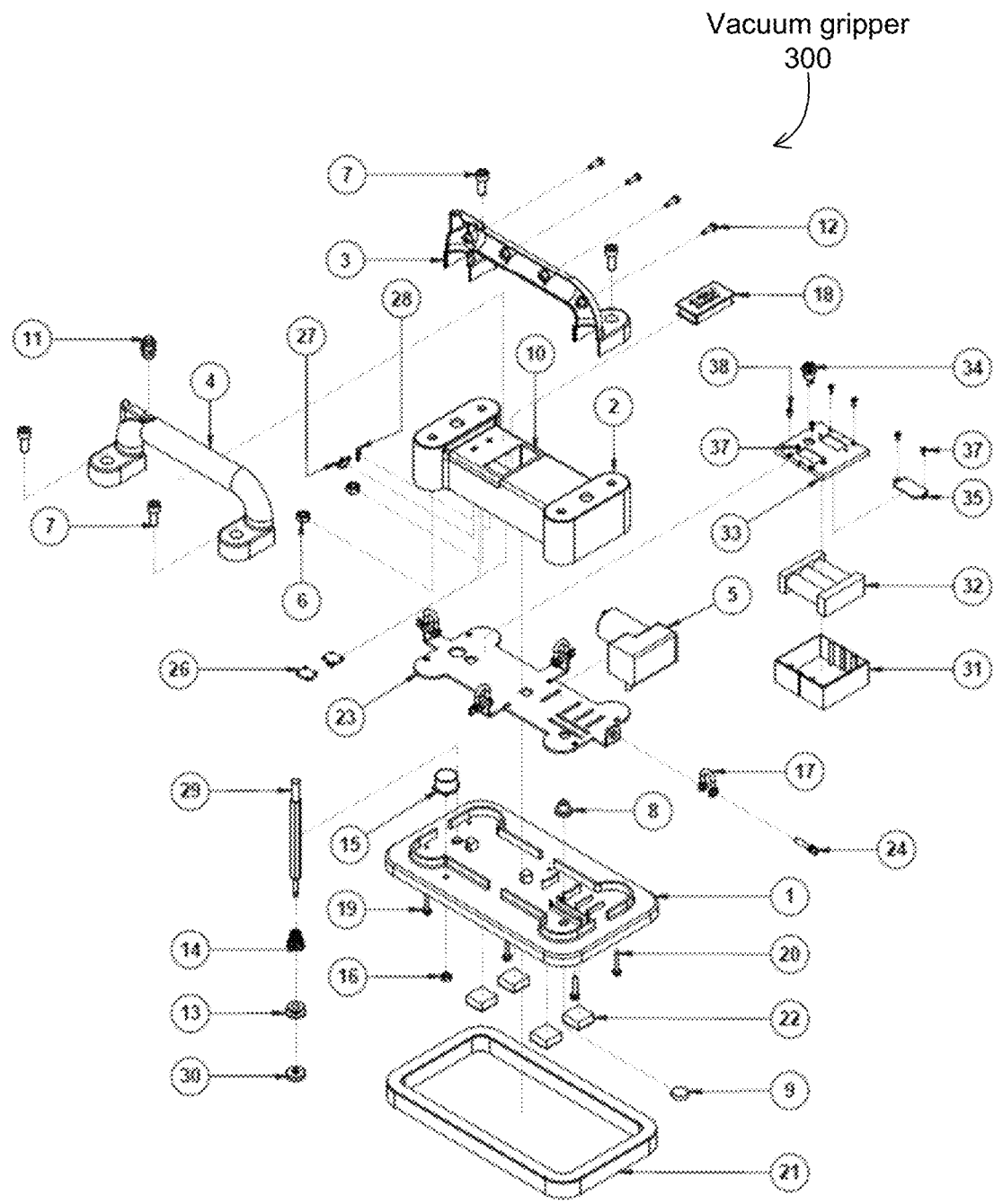
FIG. 3 illustrates an explode view of a portable vacuum gripper according to some embodiments.

FIG. 3 illustrates an explode view of a portable vacuum gripper according to some embodiments. A portable vacuum gripper 300 can include a base plate 1, which, as shown, is a rectangular plate having rounded corners. The bottom side of the base plate 1 can be hollow having grooves to accept the vacuum seal 21 and other seals. The base plate 1 can have reinforced ridges. The top side of the base plate 1 can have attachment ridges for connecting to a handle 2 and 3, and other components such as a support plate 23. The base plate 1 can be made from light materials such as plastic or fiber glass. The base plate can be coupled to the handle and support plate through screws 19, 20 with o-ring 16. On the base plate, there can be a vacuum gauge 15.

A portable vacuum gripper 300 can include a handle configured into 2 portions 3 and 4, having U shape and can be assembled together using screws 12. Inside the handle, there is a hollow area to house a battery pack, a motorized pump 5, a manual pump, and a controller board 35. There can be a door for access to the battery pack. On the handle, there are a button 29 for vacuum release and a button 11 for air evacuation using a motorized pump 5. The handle can be coupled to the base plate through screws 7. Under the vacuum release button 29, there can be a spring 14, an o-ring 13, and an air blocker 30. The support plate 23 can be configured for the attachment of hooks 17, for handling the object coupled to the portable vacuum gripper.

In some embodiments, the vacuum gripper includes an air extraction mechanism configured to remove air (or gas) from the cavity between the object surface and the vacuum gripper, in order to create a vacuum that can couple the object to the vacuum gripper. The air extraction mechanism can include an air pump, e.g., a motor configured to move air from the cavity to the outside ambient. Other devices can be used, such as an impeller or a compressed air vacuum generator using a Venturi nozzle.

The motorized air pump can be configured to operate variably, e.g., gradually power reduction or running intermittently, to conserve power, e.g., to prolong the gripping ability of the vacuum gripper so that the vacuum gripper will not lose its grip when holding, lifting, or moving the object. For example, a pressure sensor coupled to a controller can be included to monitoring the pressure, e.g., the vacuum level or the vacuum pressure, or the rate of pressure in the cavity.

In the intermittent or pulse mode, when the cavity pressure is below a first predetermined operating pressure level, or when the cavity pressure reaches steady state, e.g., indicated by a low rate of change of the pressure, such as a rate of change is below a first predetermined operating rate of change level, the motorized pump stops. When the cavity pressure is higher than a second predetermined operating pressure level, or when the rate of change of the pressure is above a second predetermined operating rate of change level, the motorized pump re-starts.

In the gradually running mode, the power supplied to the motorized pump can be dependent on the monitored vacuum pressure. When the vacuum pressure is high, e.g., low vacuum level, the motorized pump can run on full power to quickly reduce the pressure. When the cavity pressure is below the first predetermined operating pressure level, or when the a rate of change is below the first predetermined operating rate of change level, the motorized pump can run on minimum power, e.g., enough power to maintain the vacuum pressure level or to maintain the rate of change of vacuum pressure.

In some embodiments, an air extraction assembly includes a motorized pump, a battery to supply power to the motorized pump, a pressure sensor to detect a pressure level in the cavity, and a controller programmed to operate the motorized pump based on the detected pressure level due to the pressure sensor. The controller is programmed to conserve power, e.g., reduce the power consumption of the motorized pump to a minimum level.

The vacuum gripper can also include switch buttons, for example, to turn on or turn off the vacuum pump. Further, the vacuum gripper can optionally include a release button to introduce air into the cavity, for releasing the vacuum to remove the object from the vacuum gripper. The vacuum gripper can also optionally include a pressure gauge for monitoring the vacuum pressure, and a battery gauge for monitoring the battery level.

In some embodiments, the vacuum gripper is configured to ensure a non-failure status of the vacuum force, so that the vacuum gripper can safely lift and deliver the object without a sudden lost of vacuum. The vacuum gripper can have a power conserving vacuum pump mechanism, controlled by a controller based on a pressure sensed by a pressure sensor. A vacuum pump can draw power from a battery, to maintain the vacuum suction force on the object.

In some embodiments, the vacuum gripper includes an alarm configured to alert the operator about the status of the vacuum gripper. For example, the alarm can be a low battery power alarm, which can provide an alarm sound, an alarm flashing or steady light to notify the operator of the low battery status. An operator then can manually recharge the battery, to ensure that the vacuum gripper can have enough vacuum power to finish the current job. For example, the vacuum gripper can be used to hold a panel to be transported to a destination. During the transport, the low battery alarm can generate an alarm, so that the operator can manually charge the battery for the vacuum gripper to finish transporting the panel without losing vacuum.

The manual battery recharge can include a power bank, e.g., a portable battery configured to charge the battery of the vacuum gripper. The operator can connect the portable battery charger to the battery of the vacuum gripper for charging the battery. Alternatively, or additionally, the manual battery recharge can include a manual power generator, such as a motor having a crank coupled to the battery of the vacuum gripper. By rotating the crank, the motor can turn to generate a voltage for charging the battery. The low battery alarm can be an early alarm, e.g., determined to sound the alarm when there is still enough power for the motorized pump to run for a while, such as for 10-20 minutes, which can allow adequate time for the operator to operate the manual charging system.

The alarm can be a low vacuum alarm, e.g., when the pressure in the cavity is higher than a predetermined alarm pressure level. In general, the alarm is generated when the motorized pump cannot reduce the cavity pressure, such as when the battery powering the pump has no power, or when the motorized pump is defective.

An operator then can manually correct the alarm error, to ensure that the vacuum gripper can have enough vacuum power to finish the current job. For example, in the case of low vacuum due to low battery, the operator can operate a manual battery recharge, such as a connecting a portable battery recharger or turning a crank to generate power to recharge the battery.

The vacuum gripper can include a manual vacuum pump in parallel with the motorized pump. Thus, in the case of motorized pump failure, the operator can operate the manual vacuum pump to bring back the vacuum level. The operator can repeatably operate the manual vacuum pump to maintain the vacuum pressure level in the cavity until the vacuum gripper finish the current job, such as to finish transporting the panel held by the vacuum gripper vacuum suction.

In some embodiments, the vacuum gripper is a portable vacuum gripper, e.g., having a power source such as a battery for powering the motorized vacuum pump. The motorized vacuum pump and the battery can be housed in a handle coupled to a base element of the vacuum gripper to form a compact arrangement. A manual pump or a motorized battery recharge can also be housed in the handle. For example, the handle can include a handle bar coupled to two connecting bars. The motorized pump and the manual pump can be disposed in the connecting bars, with easy and short access to the cavity for air extraction. The battery powering the motorized pump can be disposed in the handle bar. The controller and the optional motorized battery recharge can also be housed in a portion of the handle bar, or in the connecting bars.

In some embodiments, the vacuum gripper can include a filler material within the cavity, to reduce the volume of the cavity for fast pumping action. The filler material can be coupled to the underside of the base element. The filler material can also function as a seal stopper, e.g., stopping the seal material from being over-compressed. The filler material can include rigid materials to provide a structural integrity to the base element. The filler material is also configured to not affect the vacuum area, e.g., the contact area between the vacuum seal element and the object surface.

In some embodiments, the vacuum seal can be made from a flexible material, such as a ring of soft elastomer, silicone, rubber, closed-cell foam, or pressured thin-walled rubber tubes. The vacuum seal material can include a cellular or granular material, such as rubber and plastics, covered with a thin protective layer. The material of the vacuum seal can be chosen so that the vacuum seal can be elastically deformable to enable the bottom seal surface to conform to the object surface. For example, when pressed against a step surface, the seal can be compressed more at the higher step area. Further, the seal can be stretch at the step corner to allow the seal to flow around the step contour, for sealing against the step surface.

In some embodiments, the elastic deformable material of the vacuum seal element can include flexible, compressible, and stretchable materials such as silicone, rubber, or close-cell foams of silicone or rubber. The deformable materials are flexible enough to conform to an irregular surface, such as an uneven surface having steps and groove, or a rough surface. Close-cell foams can be highly compressible to conform to the irregularities of the surface. Further, close-cell foam can have high elasticity, e.g., capable of returning or spring back to the original shape when the compressive load is removed.

In some embodiments, the elastic deformable material can include a pneumatic or hydraulic element, which includes an outer layer of a flexible and stretchable material such as silicone or rubber, and which has a cavity filled with a fluid, such as air. The pressure in the cavity of the pneumatic or hydraulic element can be adjustable, to be optimized for the conformity of the vacuum seal element with the non-smooth surface of the object.

Formation of a Vacuum Gripper

FIGS. 4A-4B illustrate flow charts for forming a portable vacuum gripper according to some embodiments. In FIG. 4A, operation 400 forms a vacuum gripper for gripping an object surface. The vacuum gripper includes a base element, a close-loop vacuum seal element coupled to a surface of the base element to form a cavity when contacting the object surface, and a vacuum pump coupled to the base element and fluidly communicated with the cavity for evacuating air in the cavity.

In FIG. 4B, operation 420 forms a vacuum gripper for gripping an object surface. The vacuum gripper includes a base element, a close-loop vacuum seal element coupled to a surface of the base element to form a cavity when contacting the object surface, a vacuum pump coupled to the base element and fluidly communicated with the cavity for evacuating air in the cavity, a battery for supplying power to the vacuum pump, a release mechanism for introducing air into the cavity, a manual charger for manually recharging the battery, a manual pump for manually evacuating air in the cavity, a handle coupled to the base element, a battery gauge for monitoring a battery level, a pressure gauge for monitoring a pressure in the cavity, hookable elements coupled to the base element for lifting the vacuum gripper with the object, and a controller for regulating the vacuum pump to maintain a desired pressure in the cavity and for notifying of low battery levels. Some elements can be optional.

In some embodiments, a vacuum gripper can be formed for gripping an object surface. The vacuum gripper includes a base element. The base element can be a plate, which can serve as a body for the vacuum gripper. For example, the vacuum seal element can be coupled to one side of the base element, such as a bottom side to be facing the object. A handle housing the air extraction mechanism can be coupled to an opposite side of the base element, such as a top side facing an operator. Other components can be mounted on the base element, such as the indicator of the pressure gauge, and hook elements for coupling the vacuum gripper to a hoist cable.

The vacuum gripper includes a vacuum seal element coupled directly or indirectly to the base element. For example, the vacuum seal element can be coupled directly to the base element, such as using an adhesive. The vacuum seal element can be coupled indirectly to the base element, such as through a flexible layer, also using an adhesive. The vacuum seal element is configured to form a vacuum cavity with the base element and the surface of the object. The vacuum seal element can be disposed around a periphery of the base element to increase a contact surface area with the object surface.

The vacuum seal element can include an elastic deformable material with the deformable characteristic used to provide conformity with irregular object surfaces, such as rough surfaces, or surfaces with grooves or steps. The deformable seal element can be stretched and compressed to follow the variations of the object surface, so that an adequate vacuum level can be formed within the cavity.

The vacuum gripper includes an air extraction mechanism coupled to the top side of the base element and in fluid communication with the cavity. The air extraction mechanism is configured to extract gas, such as air, from the cavity to create a suction force for coupling the object surface to the vacuum gripper. The air extraction mechanism can include a motor configured to pump air out of the cavity, such as a motorized air pump. The air extraction mechanism can include other system configured to remove air from the cavity, such as an impeller, or a high flow Venturi construction. The air extraction mechanism can be housed in a handle, e.g., a hollow handle can be coupled to the base element, with the air extraction mechanism disposed within the hollow portion of the handle.

The vacuum gripper includes a power source configured to provide power to the air extraction mechanism. The power source can be a battery, such as a rechargeable battery. The power source can be housed in the handle that houses the motorized pump. For example, the handle can have a C shape, with a middle portion parallel to the base element and coupled to two bars perpendicular to the base element at two end of the middle portion. The middle portion and the two end bars are hollow to house the air extraction mechanism, such as an end bar is configured to house the motorized pump and the middle portion is configured to house the battery. The battery can be a rechargeable battery, with a connector configured to accept a charger, such as a portable charger for charging the battery on the field, e.g., without requiring an outlet.

The vacuum gripper includes a controller configured to regulate the air extraction mechanism. The power regulation can be configured to save energy, e.g., to prolong the vacuum generation in the cavity so that the vacuum gripper can hold and transport a load for longer time. In an intermittent power regulation, the controller is configured to turn off the air extraction mechanism when a pressure level in the cavity reaches a predetermined pressure level or when a rate of pressure reduction in the cavity reaches a predetermined level. The controller is also configured to turn on the air extraction mechanism when a pressure level in the cavity is below the predetermined pressure level. Alternatively, the power regulation can use a variable power motor for the motorized pump, e.g., the motorized pump can run at different power levels, such as a full power for a maximum air extraction, or a lower power for lower air extraction capability. The controller can run the variable motor based on the cavity pressure, such as higher power when the cavity pressure or the rate of pressure change is high, and lower power when the cavity pressure or the rate of pressure change is low. When the pressure reaches steady state, e.g., when the rate of pressure change is small, the controller can run the motor at a base power, which is enough to compensate for the pressure loss to maintain the proper vacuum level in the cavity.

The vacuum gripper includes an alarm, configured to provide an alarm when a power level of the battery is below a predetermined battery value or when the pressure level in the cavity is above a predetermined pressure value. The alarm can alert an operator to care for the vacuum gripper, especially when the vacuum gripper is in use, e.g., holding and lifting or transporting an object.

The vacuum gripper includes a manual mechanism configured to maintain an operation of the vacuum gripper, e.g., to address the cause of the alarm to clear the alarm to maintain the operation of the vacuum gripper. In the case of low battery alarm, the manual mechanism can include a remote portable power source, or an integrated power generator for charging the battery. For example, the manual mechanism can be configured to charge the power source from an external power supply by an operator using a portable power source to connect to the battery for charging the battery. The manual mechanism can be configured to manually charging the battery by an operator using a manual charger mechanism such as a manual power generator.

In the case of low vacuum alarm, e.g., high pressure in the cavity of the vacuum gripper, the manual mechanism can include an integrated manual pump configured to extract gas from the cavity to lower the pressure level by an operator using a manual pump to pump air from the cavity.

The vacuum gripper can also include other components, such as an air release mechanism coupled to the base element and in fluid communication with the cavity to release gas or air from the cavity upon being activated, hookable elements coupled to the base element, and configured to be coupled to a hoist mechanism to lifting the object, and a bottom flexible layer coupled to the bottom of the vacuum seal element, e.g., to the surface of the vacuum seal facing the object surface, configured to prolong the life of the vacuum seal element by being a material more durable or more abrasion-resistant than that of the vacuum seal element.

Operation

FIGS. 5A-5C illustrate flow charts for operating a portable vacuum gripper according to some embodiments. In operation, the portable vacuum gripper is moved to position at a middle area of an object, such as a panel, to be transported. The portable vacuum gripper is then pushed so that the vacuum seal is compressed onto the surface of the object. The motorized pump is turned on to generate a vacuum n a cavity between the portable vacuum gripper and the object surface. The motorized pump is turned on until the pressure gauge drops to a predetermined vacuum level. The portable vacuum gripper can be raised, for example, by holding on the handle or by attaching to the hooks on the portable vacuum gripper.

After the object is transported to the desired location, the vacuum release button can be pressed to allow air to enter the cavity, e.g., releasing the vacuum pressure. The portable vacuum gripper and the object can be separated. In the event of battery running out, the manual vacuum pump can be used to evacuate air. Alternatively, the manual charger system can be used to recharge the battery.

In FIG. 5A, operation 500 turns on a motor for generating a vacuum seal for the portable vacuum gripper until reaching a vacuum level. Operation 510 automatically turns on the motor when a pressure is below the vacuum level. The motor can be automatically turned on and off to maintain the vacuum level.

In FIG. 5B, operation 530 turns on a motor for generating a vacuum seal for the portable vacuum gripper. Operation 540 manually pumps the manual pump to generate a vacuum or to maintain the vacuum when the battery is out.

In FIG. 5C, operation 560 turns on a motor for generating a vacuum seal for the portable vacuum gripper. Operation 570 manually turns a charging system to charge a battery for the motor when the battery is out.

Hookable Elements

In some embodiments, the vacuum gripper can include hookable elements to convert the vacuum gripper from a hand carrying gripper to a hoist carrying gripper. The vacuum gripper has a handle, configured for an operator to hand carrying an object vacuum coupled to the vacuum gripper. The vacuum gripper also has one or more hookable elements, which are configured to be hooked to cables from a hoist, such as from an overhead crane, to allow the hoist to lift and transport the object. The hookable elements can have a loop shape, such as a ring or an open hook, to be attached to a cable having a hook end. Other configurations can be used, such as a bar coupled at both ends to the vacuum gripper, or a pin having a through hole.

Figure 6A:
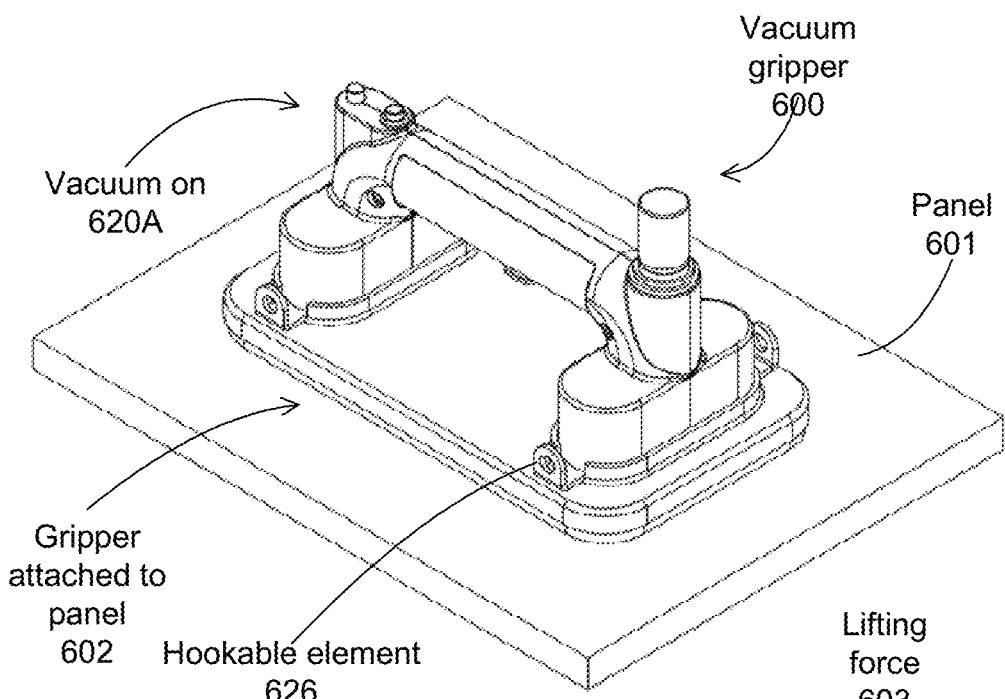
FIGS. 6A-6B illustrate a configuration for lifting an object with the vacuum gripper according to some embodiments.
Figure 6B:
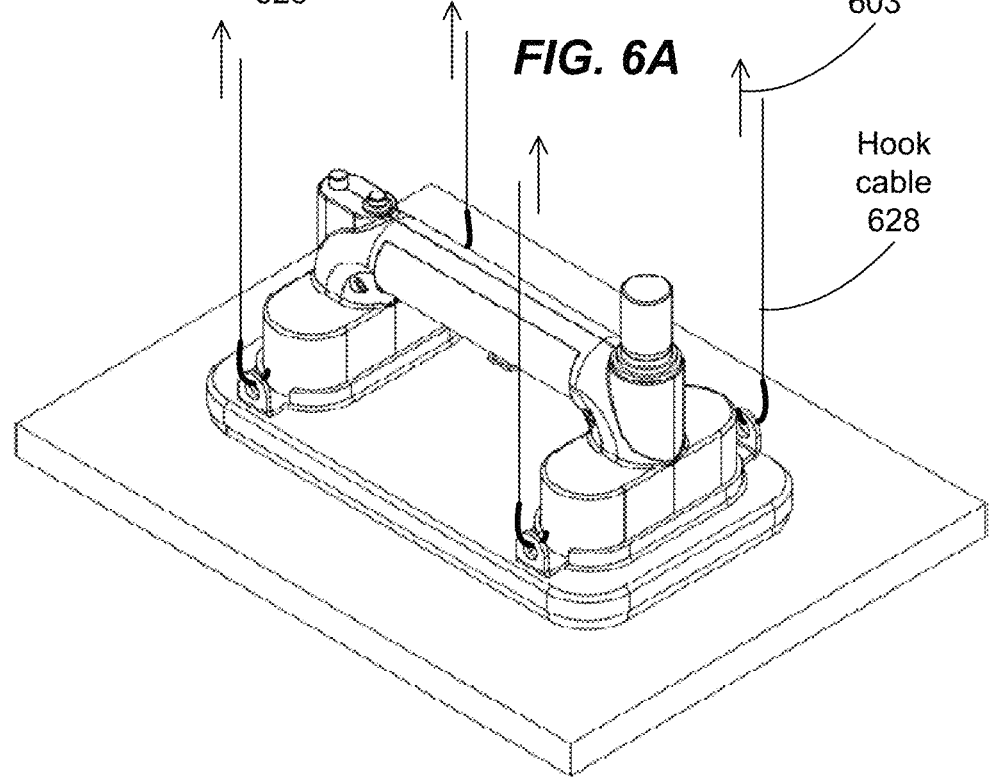

FIGS. 6A-6B illustrate a configuration for lifting an object with the vacuum gripper according to some embodiments. In FIG. 6A, a vacuum gripper 600 is placed on an object, such as a flat panel 601. The motorized pump is turned on, for example, by pressing the vacuum on 620A button. When the vacuum pressure is stable, the vacuum gripper is attached 602 to the panel 601. The vacuum gripper 600 has multiple hookable elements 620, in the form of flat rings, disposed around the vacuum gripper.

In FIG. 6B, cables 628 having hook end are coupled to the hookable elements 626. The other ends of the cables can be coupled to a hoist, which can exert a lifting force 603 to lift the panel.

FIGS. 7A-7B illustrate flow charts for operating a vacuum gripper according to some embodiments. FIG. 7A shows a process to machine transport an object, such as a panel, using a vacuum gripper. Operation 700 places a vacuum gripper on a surface of a panel. Operation 710 turns on the vacuum pump in the vacuum gripper to secure the vacuum gripper to the panel. Operation 720 checks for adhesion between the vacuum gripper and the panel when the pressure gauge in the vacuum gripper indicates a suitable pressure level. Operation 730 couples cables having hook ends to the hookable elements of the vacuum gripper. Operation 740 lifts the cables for transferring the panel.

FIG. 7B shows a process to release the vacuum gripper after completing the transportation. Operation 750 lowers cables coupled to hookable elements of a vacuum gripper so that a panel coupled to the vacuum gripper rests on a support. Operation 760 turns off the vacuum pump in the vacuum gripper. Operation 770 releases the panel from the vacuum gripper by letting air into a vacuum coupling between the vacuum gripper and the panel. Operation 780 decouples the cables by removing the hook ends from the hookable elements of the vacuum gripper.

Elastic Deformable Vacuum Seal Element

In some embodiments, a portable vacuum gripper can include a close-loop vacuum seal element for sealing a bottom surface of the portable vacuum gripper with the surface of an object to be transported. The vacuum seal can be made of a single material or can be formed as composite materials or layers.

FIGS. 8A-8B illustrate a configuration for a vacuum seal in a portable vacuum gripper according to some embodiments. FIG. 8A(a) shows a perspective view of the portable vacuum gripper 800 viewed from above, showing a vacuum seal 830, together with a body 811 of the gripper for housing a motorized pump 820, a manual pump 821, and a handle 810. FIG. 8A(b) shows a perspective view of the vacuum seal 830, which has the form of a close loop seal. The vacuum seal can have a cross sectional area of a rounded rectangle, having a width adequate for making a seal, and having a thickness adequate for handling irregular surfaces of objects. For example, the seal thickness can be greater than the irregular variation of the irregular surface, such as greater than the depth of a groove on the irregular surface or greater than a step height on the irregular surface.

In some embodiments, the vacuum seal can be made of a compressible and stretchable material. FIG. 8B(a) shows a response of the vacuum seal 831 under a compressed force 840A. The vacuum seal 831 is compressed under the compressed force 840A. The compressed factor can be up to 70%, e.g., can be compressed an amount less than 10%, less than 20%, less than 30%, less than 40%, less than 50%, less than 60%, or less than 70% of the original thickness.

FIG. 8B(b) shows a response of the vacuum seal 831 under a stretched force 840B. The vacuum seal 831 is stretched under the stretched force 840B. The stretched factor can be up to 40%, e.g., can be stretched an additional amount less than 10%, less than 20%, less than 30%, or less than 40% of the original width.

One Layer Vacuum Seal Element

FIGS. 9A-9B illustrate a configuration for a vacuum seal according to some embodiments. In FIG. 9A, the vacuum seal 930 can have a solid configuration, e.g., having a solid material 931. The vacuum seal can include a flexible, e.g., compressible and stretchable, material 931 such as rubber or elastomer. Due to the compressible and stretchable nature of the flexible material 931, the vacuum seal 931 can be conformed to grooved or step or irregular surface areas.

In FIG. 9B(a), the portable vacuum gripper 900 can be placed on a step surface of an object. The portable vacuum gripper 900 can include a vacuum seal 930 coupled to a body 911 of the portable vacuum gripper 900. The portable vacuum gripper 900 can be pushed down to make a seal between the vacuum seal and the step surface. In addition, the motorized vacuum pump can be turned on to generate a vacuum in a cavity under the portable vacuum gripper.

In FIG. 9B(b), the vacuum seal can be compressed along the thickness of the seal due to the vacuum generation in the cavity of the portable vacuum gripper. The direction of the compression is perpendicular to the surface of the object, thus the vacuum seal is compressed more 931* at the higher step and compressed less 931** at the lower step of the step surface.

In addition, at the step corner, the vacuum seal material can be stretched, due to a side force 955, to fill in the step corner, so that the vacuum seal is conformed to the step surface to make a good seal with the step surface. Thus, the vacuum seal can be used to form conformal seal with irregular surfaces of objects, such as step surfaces, groove surfaces, or rough surfaces.

Due to the uneven surface, e.g., the step, there can be a strong force 956A on contact with the object surface at the higher portion of the step, as compared to a weak force 956B on contact with the object surface at the lower portion of the step. The force difference can result in different adhesion to the object surface, with stronger adhesion at the higher step portion and weaker adhesion at the lower step portion.

Multilayer Discrete Vacuum Seal Element

To reduce the force difference, a multilayer vacuum seal element can be used. The multilayer seal element can include different layers having different elastic deformation characteristics, such as higher compressibility and higher stretchability in bottom layers as compared to top layers.

FIGS. 10A-10B illustrate a multilayer configuration for a vacuum seal according to some embodiments. A vacuum seal can be a composite seal, e.g., having multiple layers 1031, 1035, and 1036 with different properties. In FIG. 10A(a), the layers can have different compressible properties, e.g., can be compressed more or less for a same compressed force. For example, layers 1031, 1035, and 1036 can have a same thickness and subjected to a same compressed force. The layer 1031 can be compressed the most to become a very thin layer 1031*. The layer 1035 can be compressed less to become a thin layer 1035*. The layer 1036 can be compressed the least to become a thicker layer 1036*.

In FIG. 10A(b), the layers can have different stretchable properties, e.g., can be stretched more or less for a same stretched force. For example, layers 1031, 1035, and 1036 can have a same thickness and subjected to a same stretched force. The layer 1031 can be stretched the most to become a very long layer 1031. The layer 1035 can be stretched less to become a long layer 1035. The layer 1036 can be stretched the least to become a shorter layer 1036**.

In FIG. 10B(a), a portable vacuum gripper 1000 can include a vacuum seal 1030 coupled to a body 1011 of the portable vacuum gripper 1000. The vacuum seal 1030 can include multiple layers 1031, 1035 and 1036 each having a different compressed and stretched property. In addition, the higher compressible and stretchable layer 1031 can be thicker than the lower compressible and stretchable layer 1035 and 1036.

The portable vacuum gripper 1000 can be placed on a step surface of an object. The portable vacuum gripper 1000 can be pushed down to make a seal between the vacuum seal and the step surface. In addition, the motorized vacuum pump can be turned on to generate a vacuum in a cavity under the portable vacuum gripper.

In FIG. 10B(b), the vacuum seal can be compressed along the thickness of the seal due to the vacuum generation in the cavity of the portable vacuum gripper. The direction of the compression is perpendicular to the surface of the object, thus the vacuum seal is compressed more 1031*/1035*/1036* at the higher step and compressed less 1031/1035/1036** at the lower step of the step surface. The more compressible and stretchable layers 1031 and 1035 are flexed more as compared to the less compressible and stretchable layers 1035 and 1036, respectively.

In addition, at the step corner, the vacuum seal material can be stretched, due to a side force 1055, to fill in the step corner, so that the vacuum seal is conformed to the step surface to make a good seal with the step surface. Thus, the vacuum seal can be used to form conformal seal with irregular surfaces of objects, such as step surfaces, groove surfaces, or rough surfaces.

Due to the multilayer seal, there can be a medium strong force 1056A* on contact with the object surface at the higher portion of the step, as compared to a medium weak force 1056B* on contact with the object surface at the lower portion of the step. For appropriate thicknesses of the layers in the multilayer seal, the force difference can be smaller as compared to a single layer seal.

Composite Seal with Gradually Varying Elastic Deformable Properties

To further reduce the force difference, a vacuum seal element having gradually varying elastic deformable properties can be used. The gradual varying seal element can include a composite layer having continuous or gradual different elastic deformation characteristics.

Figures 11A, 11B:
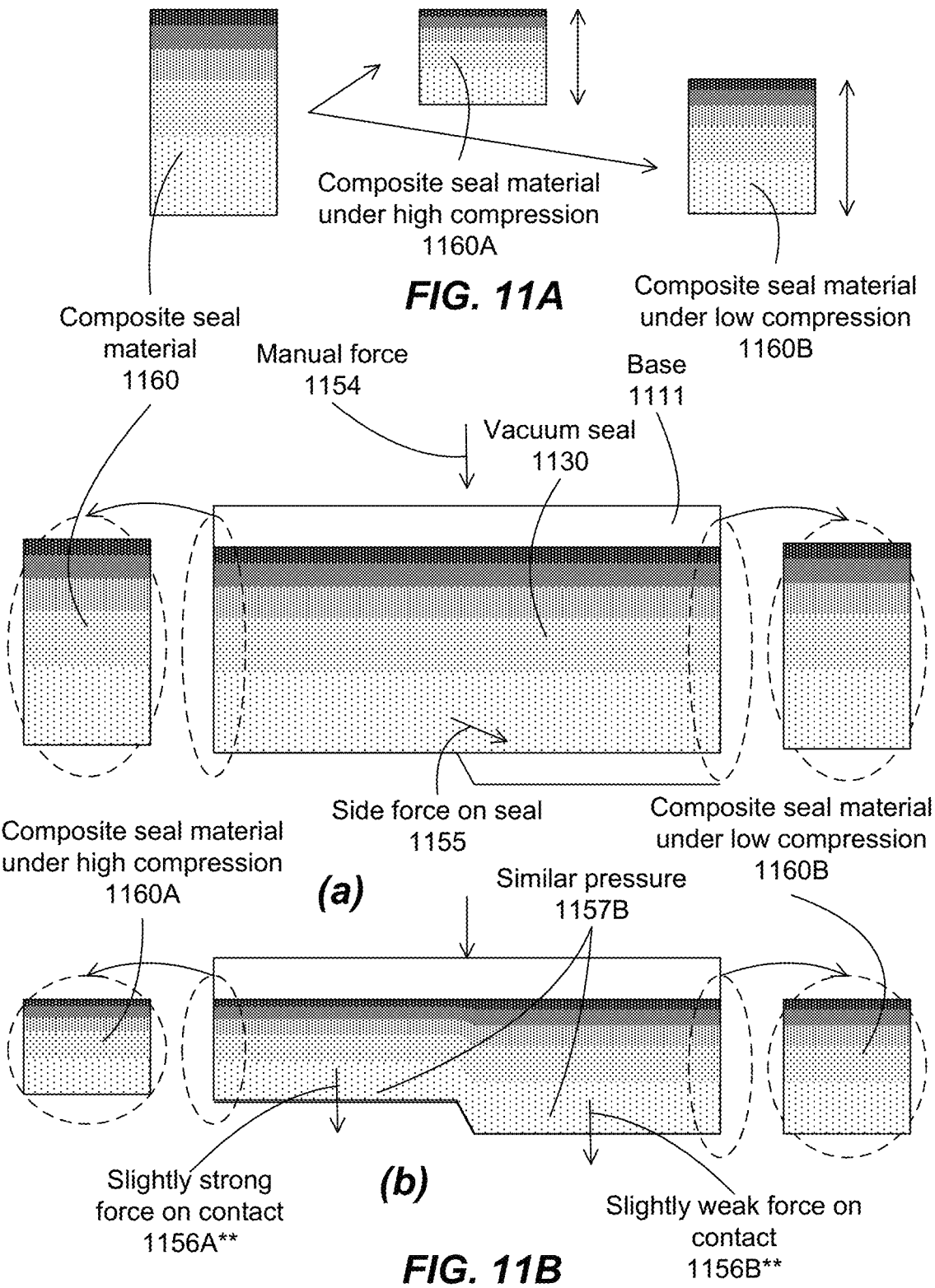
FIGS. 11A-11B illustrate a gradually composite vacuum seal according to some embodiments.

FIGS. 11A-11B illustrate a gradually composite vacuum seal according to some embodiments. A vacuum seal can be a gradually composite seal, e.g., having a gradually varying elastic deformable properties. In FIG. 11A, a composite layer 1160 can have gradually different compressible properties. The composite layer 1160 can be compressed more 1160A under a high force, and can be compressed less 1160B under a lower force.

In FIG. 11B(a), a portable vacuum gripper 1100 can include a vacuum seal 1130 coupled to a body 1111 of the portable vacuum gripper 1100. The vacuum seal 1130 can include a gradual composite layer 1160.

The portable vacuum gripper 1100 can be placed on a step surface of an object. The portable vacuum gripper 1100 can be pushed down to make a seal between the vacuum seal and the step surface. In addition, the motorized vacuum pump can be turned on to generate a vacuum in a cavity under the portable vacuum gripper.

In FIG. 11B(b), the vacuum seal can be compressed along the thickness of the seal due to the vacuum generation in the cavity of the portable vacuum gripper.

In addition, at the step corner, the vacuum seal material can be stretched, due to a side force 1155, to fill in the step corner, so that the vacuum seal is conformed to the step surface to make a good seal with the step surface. Due to the gradual composite seal, there can be a slightly strong force 1156A on contact with the object surface at the higher portion of the step, as compared to a slightly weak force 1156B on contact with the object surface at the lower portion of the step, which can form similar pressure 1157B on the object surface. For appropriate variation of the elastic deformable properties, the force difference can be smaller as compared to a single layer seal.

Flexible Layer in Bottom

In some embodiments, a durable layer can be disposed under the vacuum seal to protect the vacuum seal, especially when the vacuum seal includes a foam material. The durable layer can be thin and flexible, e.g., stretchable, to follow the contour of the object surface.

FIGS. 12A-12B illustrate a vacuum seal with a flexible bottom layer according to some embodiments. A vacuum seal can be an elastic deformable seal 1231, such as a single layer seal, a multilayer seal, or a gradually composite seal. In FIG. 12A, a vacuum seal includes a compressible layer 1231 coupled to a flexible layer 1261. The compressible layer 1231 can be an elastic deformable layer, such as compressible and stretchable. For example, under a compressed force, the compressible layer 1231 can be compressed to a compressed layer 1231*. The flexible layer can be thin and flexible, such as stretchable. For example, upon encounter a step, the flexible layer 1261 can be flexed to a flexed layer 1261* to match with the step surface of the object.

In FIG. 12B(a), a portable vacuum gripper 1200 can include a vacuum seal 1230 coupled to a body 1211 of the portable vacuum gripper 1200. The vacuum seal 1230 can include a compressible layer 1231 coupled to a flexible layer 1261.

The portable vacuum gripper 1200 can be placed on a step surface of an object. The portable vacuum gripper 1200 can be pushed down to make a seal between the vacuum seal and the step surface. In addition, the motorized vacuum pump can be turned on to generate a vacuum in a cavity under the portable vacuum gripper. At the step corner, the vacuum seal material can be stretched, due to a side force 1255, to fill in the step corner, so that the vacuum seal is conformed to the step surface to make a good seal with the step surface.

In FIG. 12B(b), the vacuum seal can be compressed along the thickness of the seal due to the vacuum generation in the cavity of the portable vacuum gripper. The flexible layer can include a more durable material than the compressible layer, thus can prolong the lifetime of the vacuum gripper.

Rubber Tube Vacuum Seal

In some embodiments, the vacuum seal can include a pneumatic or hydraulic element such as a rubber tube. The rubber tube can be compressible and stretchable, together with having a bottom flexible layer of rubber.

Figures 13A, 13B:
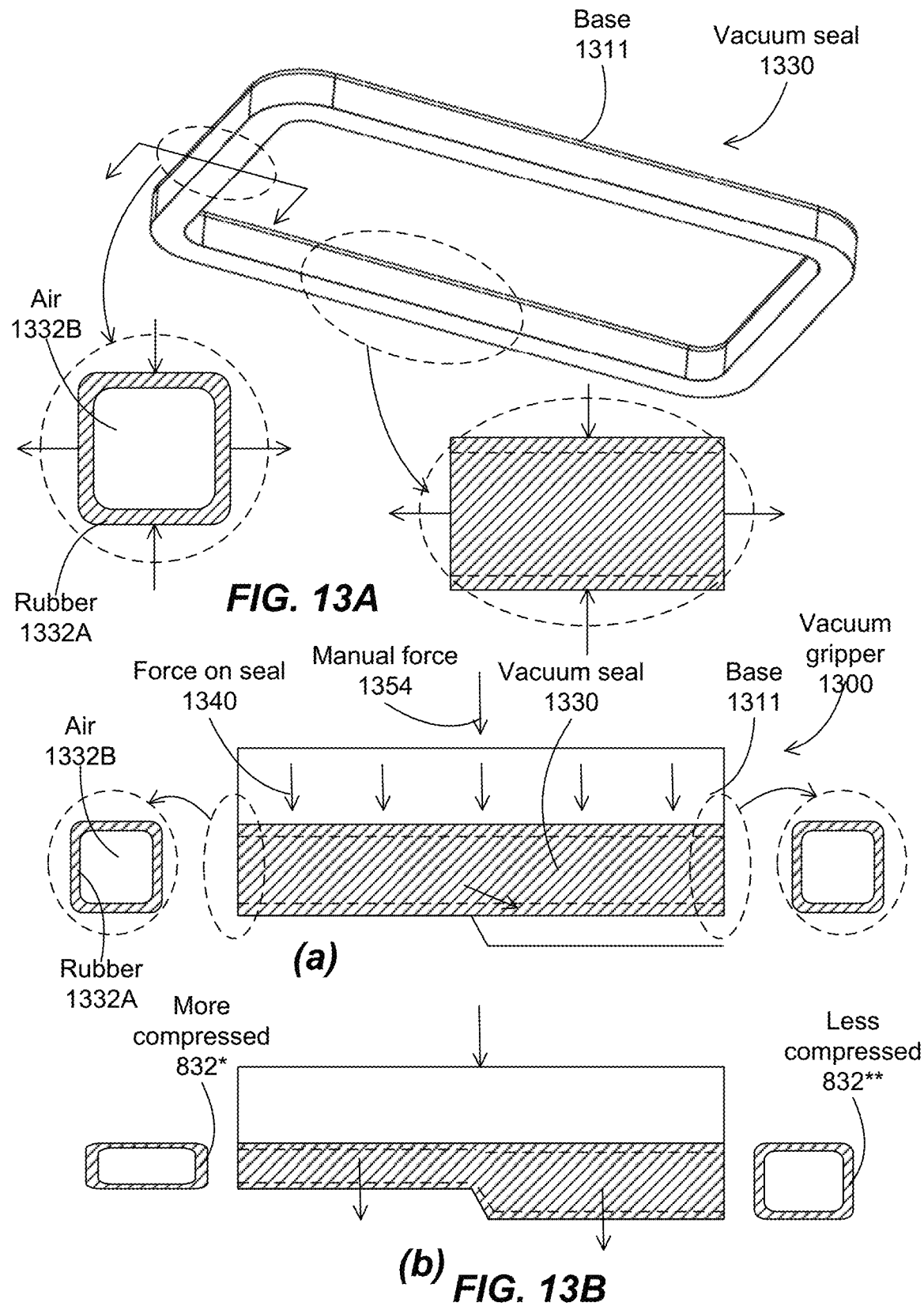
FIGS. 13A-13B illustrate a configuration for a vacuum seal according to some embodiments.

FIGS. 13A-13B illustrate a configuration for a vacuum seal according to some embodiments. In FIG. 13A, the vacuum seal 1330 can have a tube configuration, e.g., having a cover 1332A surrounding an interior gas 1332B. The vacuum seal can include a flexible, e.g., compressible and stretchable, cover material 1332A such as rubber or elastomer. The vacuum seal can be hollow, e.g., filled with a gas 1332B such as air. In addition to the compressible and stretchable nature of the rubber tube configuration of the vacuum seal, the air pressure in the vacuum seal area 1332B can be configured to allow the vacuum seal to be conformed to grooved or step or irregular surface areas.

In FIG. 13B(a), the portable vacuum gripper 1300 can be placed on the surface of an object. The surface can be an irregular surface, such as having a step configuration. The step surface can be shown with the step exaggerated to illustrate the sealing nature of the portable vacuum gripper on a step surface. The portable vacuum gripper 1300 can include a vacuum seal 1330 coupled to a body 1311 of the portable vacuum gripper 1300. At the beginning, the vacuum seal can touch the step surface or can be deformed somewhat under the weight of the portable vacuum gripper.

The portable vacuum gripper 1300 can be pushed down to make a seal between the vacuum seal and the step surface. In addition, the motorized vacuum pump can be turned on to generate a vacuum in a cavity under the portable vacuum gripper.

In FIG. 13B(b), the vacuum seal can be compressed along the thickness of the seal due to the vacuum generation in the cavity of the portable vacuum gripper. The direction of the compression is perpendicular to the surface of the object, thus the vacuum seal is compressed more 1332\* at the higher step and compressed less **1332\*\*** at the lower step of the step surface.

In addition, at the step corner, the vacuum seal material can be stretched to fill in the step corner, so that the vacuum seal is conformed to the step surface to make a good seal with the step surface. Thus, the rubber tube vacuum seal can be used to form conformal seal with irregular surfaces of objects, such as step surfaces, groove surfaces, or rough surfaces.

FIGS. 14A-14B illustrate a vacuum gripper formation according to some embodiments. In FIG. 14A, operation 1400 forms a vacuum gripper for gripping an object surface. The vacuum gripper includes a base element, a close-loop vacuum seal element coupled to a surface of the base element to form a sealed cavity when contacting the object surface, a vacuum pump coupled to the base element and fluidly communicated with the cavity for evacuating air in the cavity.

The vacuum seal element includes a compressible material having a gradual varying compressible property or multiple layers of different compressible properties. The gradual varying compressible property or the multiple layers of different compressible properties are configured to balance contact forces on the vacuum seal element with a height variation of the object surface. The vacuum seal element optionally includes a flexible layer coupled at a surface opposite the surface of the base element. The flexible layer includes a more abrasion-resistant material than the compressible material of the vacuum seal element.

Alternatively, the vacuum seal element includes a pneumatic or hydraulic element having a flexible layer forming a fluid filled cavity. The pneumatic or hydraulic element has a fluid filled cavity pressure optimized for a sealing of the vacuum seal element on a height variation object surface. The vacuum gripper optionally includes a pumping mechanism to adjust a pressure of the fluid filled cavity.

In FIG. 14B, operation 1420 generates a vacuum in a cavity of a vacuum gripper after coupling the vacuum gripper to a panel surface. Operation 1430 presses on the vacuum gripper at irregular surface locations of the panel surface to obtain a desired vacuum level.

Different Configurations

FIGS. 15A-15I illustrate configurations for a vacuum seal according to some embodiments. A flexible thin layer 1534 can be disposed under a vacuum seal or between multiple vacuum seals, such as on a rubber tube seal 1532A/1532B, a solid material seal 1531, a multilayer material seal 1531/1535/1536, or a seal having any combination of layers of rubber tube, solid material, multilayer material, or gradual varying material.

Figure 15A:
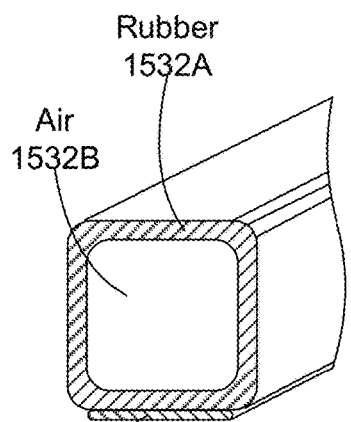
FIGS. 15A-15I illustrate configurations for a vacuum seal according to some embodiments.
Figure 15B:
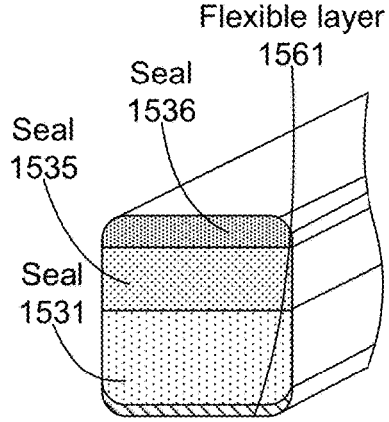
Figure 15C:
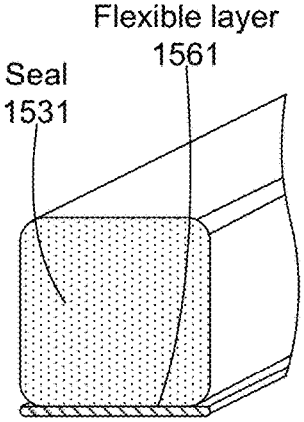
Figure 15D:
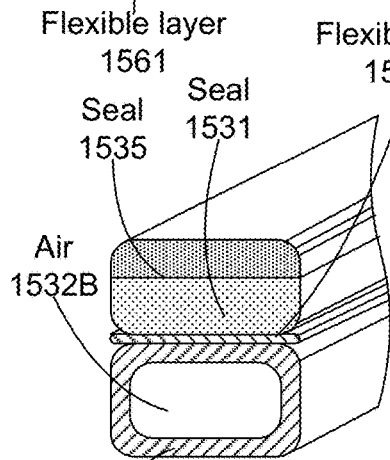
Figure 15E:
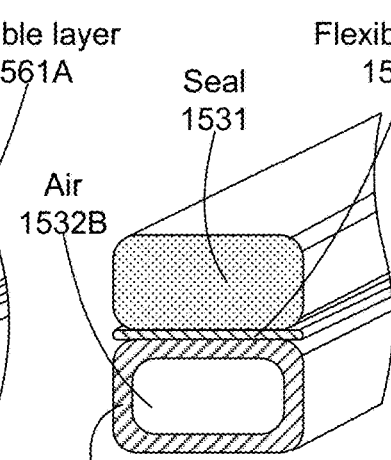
Figure 15F:
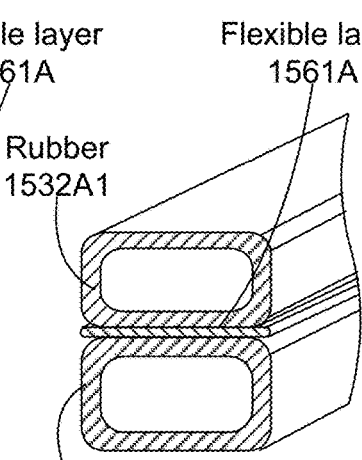
Figure 15G:
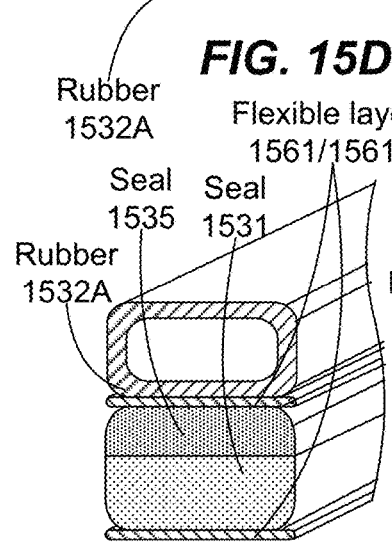
Figure 15H:
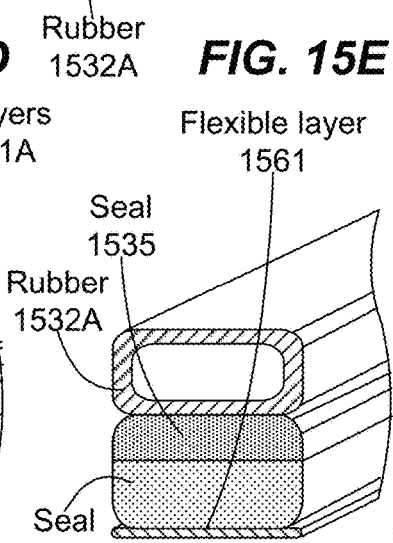
Figure 15I:
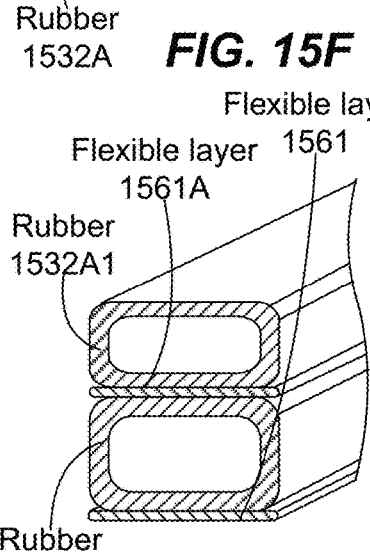

For example, FIG. 15A shows a flexible thin layer 1561 disposed under a rubber tube seal having pressured air 1532B inside a rubber wall 1532A. FIG. 15B shows a flexible thin layer 1561 disposed under a seal having layers 1536, 1535, and 1531, each with different compressible and stretchable material. FIG. 15C shows a flexible thin layer 1561 disposed under a seal having a layer 1531. FIG. 15D shows a flexible thin layer 1561A disposed between a seal having layers 1535/1531 and a rubber tube seal 1532A/1532B. FIG. 15E shows a flexible thin layer 1561A disposed between a seal having a layer 1531 and a rubber tube seal 1532A/1532B. FIG. 15F shows a flexible thin layer 1561A disposed between a seal having a rubber tube 1532A1 and a rubber tube seal 1532A. FIG. 15G shows a flexible thin layer 1561A disposed between a seal having a rubber tube 1532A and a seal having layers 1535/1531, together with another flexible thin layer 1561 under the seal having layers 1535/1531. FIG. 15H shows a flexible thin layer 1561 disposed under a seal having a rubber tube 1532A and a seal having layers 1535/1531. FIG. 15I shows a flexible thin layer 1561A disposed between two seals having rubber tubes 1532A1 and 1532A, together with another flexible thin layer 1561 under the seal having a rubber tube 1532A.

FIG. 16 illustrates a formation process for a vacuum seal according to some embodiments. Operation 1600 forms a vacuum gripper for gripping an object surface. The vacuum gripper includes a base element, a close-loop vacuum seal element coupled to a surface of the base element to form a sealed cavity when contacting the object surface, a vacuum pump coupled to the base element and fluidly communicated with the cavity for evacuating air in the cavity.

The vacuum seal element includes a compressible material having a gradual varying compressible property. The vacuum seal element includes a compressible material having multiple layers of different compressible properties. The vacuum seal element includes a compressible structure having a pneumatic or hydraulic element having a flexible layer surrounding a fluid filled cavity. The vacuum seal element includes a compressible material on a flexible layer. The vacuum seal element includes a compressible material having a combination of two or more layers of a gradual varying compressible property, multiple layers of different compressible properties, a pneumatic or hydraulic element having a flexible layer forming a fluid filled cavity, or a flexible layer.

The layers of the vacuum seal element are optimized for a sealing of the vacuum seal element on a height variation object surface.

FIGS. 17A-17D illustrate flow charts for forming and operating a vacuum seal in a portable vacuum gripper according to some embodiments. The vacuum seals are designed to be conformed to irregular surfaces, such as step surfaces, groove surfaces, or rough surfaces.

In FIG. 17A, operation 1700 forms a seal for a vacuum gripper device. The seal can be configured to be compressible and stretchable. In some embodiments, the seal can include an air pocket, such as an air tube. The seal can include one layer of a compressible and stretchable material. The seal can include multiple layers of compressible and stretchable materials with different thicknesses. The seal can include a combination of one or more air tubes and one or more layers of compressible and stretchable materials with different thicknesses.

In FIG. 17B, operation 1720 presses a seal of a suction device on an irregular surface, wherein the seal is compressed more at higher surface areas and is stretched at lower surface areas so that the bottom surface of the seal is conformed to the irregular surface.

In FIG. 17C, operation 1740 presses a multilayer seal of a suction device on an irregular surface, wherein bottom layers of the seal are compressed and stretched more than top layers so that the bottom surface of the seal is conformed to the irregular surface.

In FIG. 17D, operation 1760 presses a flexible layer on a seal of a suction device on an irregular surface, wherein the flexible layer is configured for smoothly conformed to the irregular surface.

Localized Pressing on the Vacuum Seal for Better Conformity

In some embodiments, a flexible layer can be disposed on top of the vacuum seal element, e.g., between the base element and the vacuum seal element. The flexible layer can be configured to assist in making the vacuum seal more conforming to the irregularities of the object surface. For example, by pressing on the flexible layer, the vacuum seal can protrude from the opposite side to fill in any gap with the object surface. Thus, the flexible layer can be configured to be deformed with a less localized pattern than the elastic deformable material under a point indentation. Alternatively or additionally, the flexible layer can be configured to be protruded more in an opposite surface than the elastic deformable material under the point indentation. For example, the flexible layer can include a higher hardness than the elastic deformable material of the vacuum seal.

FIGS. 18A-18C illustrate configurations for localized pressing on a vacuum seal according to some embodiments. In FIG. 18A, a vacuum seal 1830 can have a flexible layer 1834 on a compressible layer 1831. The vacuum seal 1830 can be coupled to a base element 1811. Under a compressed force on the vacuum gripper, the compressible layer 1831 can be compressed 1831*, and the flexible layer 1834 can be flexed 1834* at irregular surface area.

FIGS. 18B(a)-18B(c) show a process for improving conformity of the vacuum seal with a step surface of an object. In FIG. 18B(a), a vacuum gripper, having a vacuum seal which includes a flexible layer 1834 on a deformable layer 1831, is placed on an object surface that contains a step 1862. When placed on the object, the vacuum seal can rests on the higher portion of the step, with a gap with the lower portion. A force 1840 is applied to the vacuum gripper, which is transferred to the vacuum seal. The vacuum seal can be deformed to meet the object surface. Far away from the step, the vacuum seal contacts the object surface. At the vicinity of the step, there can be a gap 1865 between the vacuum seal and the lower corner of the step, especially if the step is abrupt.

In FIG. 18B(b), a press rod 1864 is used to pressed on the flexible layer at location of the gap 1865, e.g., using a force 1864* on the press rod. The deformable layer 1831 can be soft and easily deformed to conform to the irregularities of the object surface. Without the flexible layer 1834, pressing on the top side of the soft deformable layer 1831 can form a localized dent at the pressed area, but with minimum effect at the opposite bottom side of the deformable layer 1831. The flexible layer 1834 is formed from a harder material than the deformable layer 1831, thus, pressing on the flexible layer can form a larger dent, which can cause the deformable layer 1831 to move at the bottom side surface to fill the gap 1865.

In some embodiments, the flexible layer is chosen, e.g., layer thickness, layer hardness, or layer flexibility, to assist in making the deformable layer more conforming to the irregularities of the object surface, such as to fill in the gap 1865 at a step surface. For example, the flexible layer and the deformable layer are chosen to allow a force 1864* from a press rod 1864 on the flexible layer to cause the deformable layer to protrude at the opposite surface. The flexible layer can be configured to be deformed with a less localized pattern than the deformable layer under a point indentation. Alternatively or additionally, the flexible layer can be configured to generate at least a protruded portion in an opposite surface of the deformable layer under the point indentation. The press rod can be pushed at an angle from the vertical direction, such as at a direction pointing toward the gap.

As a result, pushing on a press rod 1864 at the gap area can help reducing the size of the gap 1865 to provide adequate vacuum suction force between the vacuum gripper and the object (FIG. 18B(c)).

FIGS. 18C(a)-18C(c) show a process for improving conformity of the vacuum seal with a groove surface of an object. In FIG. 18C(a), the vacuum gripper is placed on an object surface that contains a groove 1863. When placed on the object, the vacuum seal can rests on the flat portion of the surface, with a gap with the groove. A force 1840 is applied to the vacuum gripper, which is transferred to the vacuum seal. The vacuum seal can be deformed to meet the object surface. For shallow and gradually transition groove, the vacuum seal can be conformal to the groove surface. For deep groove or for abrupt groove, there can be a gap 1865 between the vacuum seal and the lower portion of the groove, especially at the bottom corners of the groove.

In FIG. 18C(b), a press rod 1864 is used to pressed on the flexible layer at locations of the gap 1865, e.g., using a force 1864* on the press rod. The pressing force 1864* can form a larger dent, which can cause the deformable layer 1831 to move at the bottom side surface to fill the gap 1865. The press rod can be pushed at a straight direction pointing toward the gap.

As a result, pushing on a press rod 1864 at the gap area can help reducing the size of the gap 1865 to provide adequate vacuum suction force between the vacuum gripper and the object (FIG. 18C(c)).

Support for Top Flexible Layer

In some embodiments, the flexible layer can be configured to just cover the periphery of the vacuum gripper, e.g., running along the vacuum seal portion of the vacuum gripper. Alternatively, the flexible layer can also cover the whole surface of the cavity, e.g., covering the bottom side of the base element. The flexible layer can have a flexible support at the middle portion of the flexible layer, for example, to provide rigidity and also flexibility for the vacuum gripper when coupling to irregular object surface.

FIGS. 19A-19C illustrate a configuration for a flexible support for a flexible layer according to some embodiments. In FIG. 19A, a vacuum seal 1930 can have a flexible layer 1934 on a compressible layer 1931. The vacuum seal 1930 can be coupled to a base element 1911 around a periphery of the base element. The flexible layer can also cover the base element, e.g., on top of the peripheral vacuum seal and also at the middle portion of the base element. Thus, the cavity can be formed between the vacuum seal and the flexible layer, together with the object surface.

The flexible layer 1934 can include a flexible support 1967, disposed inside the area surrounded by the compressible layer 1931. The flexible support 1967 is configured to be rigid enough to provide strength to the vacuum gripper, and flexible enough to accommodate the bending of the compressible layer when encountering an irregular object surface.

FIG. 19B shows a cross section view of the flexible support across the compressible layer, together with surrounding components. The flexible layer and the compressible layer can bend when encountering a step object surface. Under the action of a press rod 1964, the bottom surface of the compressible layer 1931 is pressed down to contact the step surface.

FIG. 19C shows a cross section view of the flexible support across a portion of the flexible support, together with surrounding components. The flexible support is flexible enough to allow the compressible layer 1931 and the flexible layer 1934 to bend in response to the step object surface. Under the action of a press rod 1964, the bottom surface of the compressible layer 1931 is pressed down to contact the step surface.

Formation and Operation of the Flexible Support

FIGS. 20A-20B illustrate a formation and operation of a flexible support according to some embodiments. In FIG. 20A, operation 2000 forms a vacuum gripper for gripping an object surface. The vacuum gripper includes a base element, a close-loop vacuum seal element coupled to a surface of the base element to form a sealed cavity when contacting the object surface, a vacuum pump coupled to the base element and fluidly communicated with the cavity for evacuating air in the cavity.

The vacuum seal element includes a compressible material, a multiplayer compressible material, a composite gradually varied compressible material, or a compressible structure having a pneumatic or hydraulic element having a flexible layer surrounding a fluid filled cavity. The vacuum gripper further includes a flexible layer disposed between the base element and the vacuum seal element. The flexible layer is configured to deform in a same surface with a less localized pattern than the compressible material under a point indentation. The flexible layer is configured to deform more in an opposite surface than the compressible material under the point indentation, by having higher hardness. The flexible layer includes a flexible support in area inside the close-loop vacuum seal element. The vacuum gripper optionally includes a press rod for pressing on the flexible layer to assist the compressible layer to be conformed to irregularities of the object surface.

In FIG. 20B, operation 2020 generates a vacuum in a cavity of a vacuum gripper after coupling the vacuum gripper to a panel surface. Operation 2030 presses on selective areas of a vacuum seal element of the vacuum gripper to conform the vacuum seal element at irregular surface locations of the panel surface.

Vacuum Gripper with Openings in the Base Element

In some embodiments, the present invention discloses a vacuum gripper having openings in a base element, e.g., in a body of the vacuum gripper to expose the vacuum seal. There can be one opening along a periphery of the base element. Alternatively, there can be multiple openings separated by connecting ridges between an outer periphery and a middle portion of the base element.

In some embodiments, a vacuum gripper can be formed for gripping an object surface. The vacuum gripper includes a base element having openings around a periphery. The base element can be a plate, which can serve as a body for the vacuum gripper. A handle can be coupled to the base element, such as a top side facing an operator.

The vacuum gripper includes a flexible layer having a flexible portion and a compressible portion. The flexible portion is disposed along the periphery to be accessible through the openings in the base element. The compressible portion is served as a support and formed in a middle of the flexible portion. The compressible is coupled to the base element.

The compressible portion includes a more compressible material than the flexible portion. The compressible portion is located outside a periphery of the vacuum seal element, or located in an inner area portion of the base element.

In some embodiments, the flexible layer is configured to be deformed with a less localized pattern than the elastic deformable material under a point indentation. Alternatively or additionally, the flexible layer is configured to be protruded more in an opposite surface than the elastic deformable material under the point indentation. Alternatively or additionally, the flexible layer comprises a higher hardness than the elastic deformable material.

The vacuum gripper includes a vacuum seal element coupled to the flexible layer. The vacuum seal element can include an elastic deformable material with the deformable characteristic used to provide conformity with irregular object surfaces, such as rough surfaces, or surfaces with grooves or steps. The deformable seal element can be stretched and compressed to follow the variations of the object surface, so that an adequate vacuum level can be formed within the cavity.

The vacuum seal element and the flexible layer are configured to form a cavity with the object surface contacted by the vacuum gripper. The openings in the base element are configured to allow the flexible layer to be pressed toward the vacuum seal element to assist the vacuum seal element to be conformed to irregularities of the object surface.

The vacuum seal element can be coupled to the flexible layer along the periphery. Alternatively, the vacuum seal element is coupled to the flexible layer at an inner portion inside a periphery of the vacuum seal element, with the inner portion comprising a thickness less than the peripheral portion.

In some embodiments, the elastic deformable material includes multiple different elastic deformable materials, with the multiple different elastic deformable materials arranged in discrete layers, or forming a composite layer having continuously varying levels of elastic deformation. The multiple different elastic deformable materials are configured to balance contact forces on the vacuum seal element when encounter the object surface that comprises a surface roughness.

In some embodiments, the elastic deformable material includes a pneumatic or hydraulic element comprising a flexible and stretchable layer forming a fluid-filled cavity, with the fluid-filled cavity has a pressure optimized for sealing the vacuum seal element on the object surface when the object surface is non-smooth.

In some embodiments, the vacuum gripper further has a press rod, configured to be removably coupled to the base element. A size of the press rod is smaller than an opening of the openings to be used for pressing on the flexible layer through the opening.

The vacuum gripper includes an air extraction mechanism coupled to the base element and in fluid communication with the cavity. The air extraction mechanism is configured to extract gas from the cavity to create a suction force for coupling the object surface to the vacuum gripper. The air extraction mechanism can include a motor configured to pump air out of the cavity, such as a motorized air pump. The air extraction mechanism can include other system configured to remove air from the cavity, such as an impeller, or a high flow Venturi construction. The air extraction mechanism can be housed in a handle, e.g., a hollow handle can be coupled to the base element, with the air extraction mechanism disposed within the hollow portion of the handle.

The vacuum gripper can include a second flexible layer coupled to the vacuum seal element, with the flexible layer having a material more durable or more abrasion-resistant than that of the vacuum seal element.

The vacuum gripper can include hookable elements coupled to the base element, with the hookable elements configured to be coupled to a hoist mechanism.

The vacuum gripper can include a manual air extraction mechanism coupled to the second surface of the base element and in fluid communication with the cavity, with the manual air extraction mechanism configured to extract gas from the cavity to create a suction force for coupling the object surface to the vacuum gripper. The manual air extraction mechanism is configured to be operated by a person.

The vacuum gripper can include a pressure gauge coupled to the base element and in fluid communication with the cavity, with the pressure gauge configured to provide indication of a pressure or vacuum level in the cavity.

The vacuum gripper can include an air release mechanism coupled to the base element and in fluid communication with the cavity, with the air release mechanism configured to release gas from the cavity.

The vacuum gripper can include a power source configured to provide power to the air extraction mechanism, with the power source housed in a handle coupled to the second surface of the base element. The power source can be a battery, such as a rechargeable battery. The power source can be housed in the handle that houses the motorized pump. For example, the handle can have a C shape, with a middle portion parallel to the base element and coupled to two bars perpendicular to the base element at two end of the middle portion. The middle portion and the two end bars are hollow to house the air extraction mechanism, such as an end bar is configured to house the motorized pump and the middle portion is configured to house the battery. The battery can be a rechargeable battery, with a connector configured to accept a charger, such as a portable charger for charging the battery on the field, e.g., without requiring an outlet.

The vacuum gripper can include a charging mechanism configured to charge the power source, with the charging mechanism configured to charge the power source from an external power supply or manually from a person.

The vacuum gripper can include a vacuum alarm, with the alarm configured to provide an alarm when the pressure level in the cavity is above a determined value.

The vacuum gripper can include a manual mechanism configured to maintain an operation of the vacuum gripper, with the manual mechanism configured to extract gas from the cavity to lower the pressure level by a person when the alarm showing the pressure level is above the predetermined value.

The vacuum gripper can include a battery alarm coupled to the power source, with the battery alarm configured to provide an alarm to notify a person when a power level of the battery is below a determined value.

The vacuum gripper includes an alarm, configured to provide an alarm when a power level of the battery is below a predetermined battery value or when the pressure level in the cavity is above a predetermined pressure value. The alarm can alert an operator to care for the vacuum gripper, especially when the vacuum gripper is in use, e.g., holding and lifting or transporting an object.

The vacuum gripper includes a manual mechanism configured to maintain an operation of the vacuum gripper, e.g., to address the cause of the alarm to clear the alarm to maintain the operation of the vacuum gripper. In the case of low battery alarm, the manual mechanism can include a remote portable power source, or an integrated power generator for charging the battery. For example, the manual mechanism can be configured to charge the power source from an external power supply by an operator using a portable power source to connect to the battery for charging the battery. The manual mechanism can be configured to manually charging the battery by an operator using a manual charger mechanism such as a manual power generator.

In the case of low vacuum alarm, e.g., high pressure in the cavity of the vacuum gripper, the manual mechanism can include an integrated manual pump configured to extract gas from the cavity to lower the pressure level by an operator using a manual pump to pump air from the cavity.

The vacuum gripper includes a controller configured to regulate the air extraction mechanism. The power regulation can be configured to save energy, e.g., to prolong the vacuum generation in the cavity so that the vacuum gripper can hold and transport a load for longer time. In an intermittent power regulation, the controller is configured to turn off the air extraction mechanism when a pressure level in the cavity reaches a predetermined pressure level or when a rate of pressure reduction in the cavity reaches a predetermined level. The controller is also configured to turn on the air extraction mechanism when a pressure level in the cavity is below the predetermined pressure level. Alternatively, the power regulation can use a variable power motor for the motorized pump, e.g., the motorized pump can run at different power levels, such as a full power for a maximum air extraction, or a lower power for lower air extraction capability. The controller can run the variable motor based on the cavity pressure, such as higher power when the cavity pressure or the rate of pressure change is high, and lower power when the cavity pressure or the rate of pressure change is low. When the pressure reaches steady state, e.g., when the rate of pressure change is small, the controller can run the motor at a base power, which is enough to compensate for the pressure loss to maintain the proper vacuum level in the cavity.

Figure 21A:
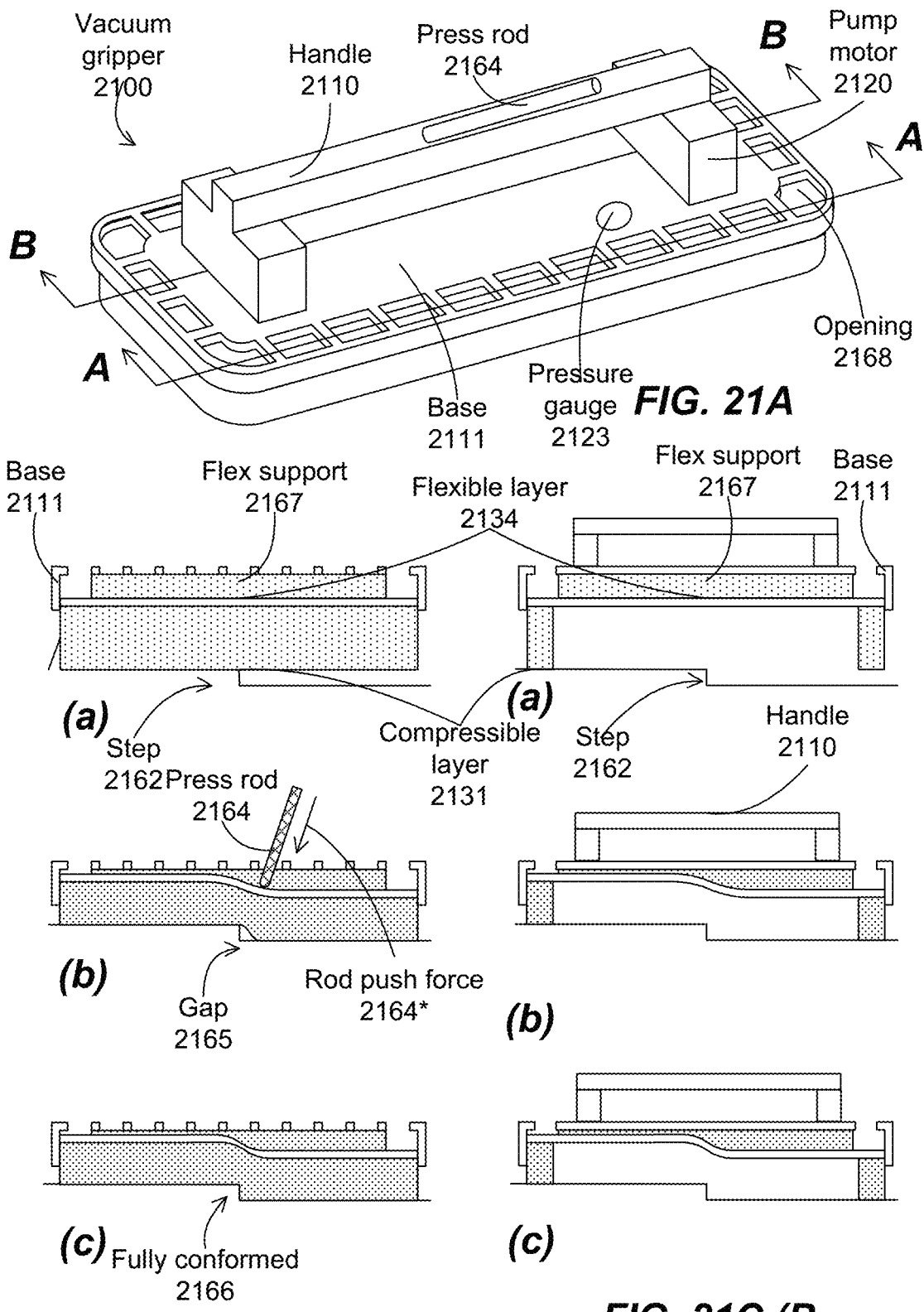

FIGS. 21A-21C illustrate a configuration of a vacuum gripper having base openings according to some embodiments. FIG. 21A shows a perspective view of the portable vacuum gripper 2100 viewed from above, showing a body or base element 2111 of the gripper having openings 2168 disposed around a periphery of the base element. The openings 2168 can be spaced from the edges of the base element, and are configured to expose a flexible layer 2134 on a compressible layer 2131 of a vacuum seal. A pressure gauge 2123 can be mounted on the base element for monitoring the pressure or vacuum level in a gripping cavity of the vacuum gripper. The vacuum gripper has a handle 2110 disposed in a middle portion of the base element. The handle is configured to house multiple components of the vacuum gripper, such as a motorized pump 2120, a manual pump, a battery pack, a manual vacuum release button, a power switch 2120A for turning on or off the motorized pump, hookable elements for coupling with lifting cables, and a controller for regulating the motorized pump to conserve power. The handle can have a recess for storing a press rod 2164, which can be used for pressing on the flexible layer through the openings for reducing potential gaps between the vacuum seal and the object surface.

FIGS. 21B(a)-21B(c) show a cross section view across the compressible layer of a process for improving conformity of the vacuum seal with a step surface of an object. FIGS. 21C(a)-21C(c) show a cross section view cutting through the compressible layer of a process for improving conformity of the vacuum seal with a step surface of an object. The base element can remain rigid, while the flexible layer and the compressible layer can bend when encountering a step object surface. Under the action of a press rod 2164, the bottom surface of the compressible layer 2131 is pressed down to contact the step surface.

In FIG. 21B(a) and FIG. 21C(a), a vacuum gripper, having a vacuum seal which includes a flexible layer 2134 on a deformable layer 2131, is placed on an object surface that contains a step 2162. When placed on the object, the vacuum seal can rests on the higher portion of the step, with a gap with the lower portion.

In FIG. 21B(b) and FIG. 21C(b), the vacuum gripper is pressed down to make contact with the object surface. The vacuum seal can be deformed to meet the object surface. Far away from the step, the vacuum seal contacts the object surface. At the vicinity of the step, there can be a gap 2165 between the vacuum seal and the lower corner of the step.

A press rod 2164 is used to pressed on the flexible layer through an opening of the multiple openings, at the location of the gap 2165, e.g., using a force 2164* on the press rod. The deformable layer 2131 moves at the bottom side surface to fill the gap 2165.

As a result, pushing on a press rod 2164 at the gap area can help reducing the size of the gap 2165 to provide adequate vacuum suction force between the vacuum gripper and the object (FIG. 21B(c) and FIG. 21C(c)).

FIG. 22 illustrates a flow chart for forming a vacuum gripper with openings according to some embodiments. Operation 2200 forms a vacuum gripper for gripping an object surface. The vacuum gripper includes a base element, a flexible layer at least partially coupled to a surface of the base element, a close-loop vacuum seal element at least partially coupled to the flexible layer, with the vacuum seal element configured to form a sealed cavity with at least one of the base element or the flexible layer when contacting the object surface, and a vacuum pump coupled to the base element and fluidly communicated with the cavity for evacuating air in the cavity.

The vacuum seal element includes a compressible material, a multiplayer compressible material, a composite gradually varied compressible material, or a compressible structure having a pneumatic or hydraulic element having a flexible layer surrounding a fluid filled cavity.

The flexible layer is less compressible than the compressible vacuum seal element. The flexible layer is configured to deform in a same surface with a less localized pattern than the compressible material under a point indentation. The flexible layer is configured to deform more in an opposite surface than the compressible material under the point indentation, by having higher hardness. The flexible layer includes a support in area inside or outside the close-loop vacuum seal element. The support includes a flexible material or a compressible material.

The base element includes openings around a periphery at locations of the vacuum seal element for a press rod to press on the flexible layer or on the vacuum seal element to assist the compressible layer to be conformed to irregularities of the object surface.

FIG. 23 illustrates a process for operating a vacuum gripper with openings according to some embodiments. Operation 2300 couples a vacuum gripper to a panel surface. Operation 2310 turns on a motor for generating a vacuum in a cavity of the vacuum gripper. Operation 2320 presses on the vacuum gripper to assist the vacuum seal element in conforming to surface irregularities of the panel surface. Operation 2330 presses on selective areas of a vacuum seal element of the vacuum gripper, using a press rod, to further conform the vacuum seal element at the surface irregularities. Operation 2340 continues presses on the vacuum gripper and on the vacuum seal until reaching a vacuum or pressure level. Operation 2350 automatically turns off the motor when the vacuum or pressure level is reached. Operation 2360 automatically turns on the motor when the vacuum in the cavity drops below the vacuum or pressure level. Operation 2370 automatically turns on a charging system for charging a battery of the vacuum gripper when a battery level is below a predetermined battery level.

Configurations of Vacuum Grippers with Openings

In some embodiments, the vacuum gripper can have a flexible layer/compressible layer seal coupled to a rigid base element. The base element can be rigid for support the handle and other components. The flexible layer and the compressible layer seal can be flexible and deformable to match with the irregularities of the object surface. The coupling of the flexible layer to the base element can include another deformable layer to allow for the movements of the flexible layer while the base element remains rigid.

Figure 24A:
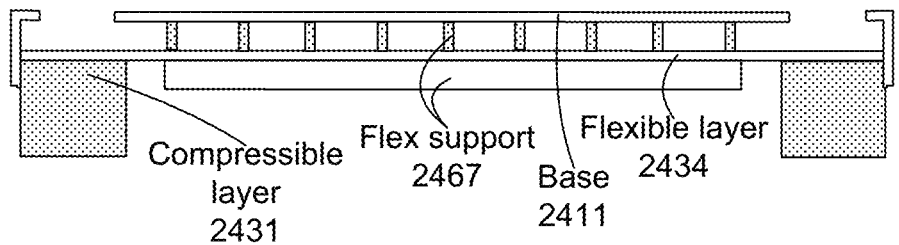
FIGS. 24A-24E illustrate configurations for the coupling between a base element and a flexible layer according to some embodiments.

FIGS. 24A-24E illustrate configurations for the coupling between a base element and a flexible layer according to some embodiments. In FIG. 24A, the compressible layer 2431 of the vacuum seal has a close loop shape running around a periphery of the base element 2411. The flexible layer 2434 is coupled to the compressible layer 2431 along the periphery. The flexible layer 2434 has a flexible support 2467 above and below the flexible layer, with the flexible support disposed at an area inside the periphery. The top portion of the flexible support, e.g., the portion of the flexible support above the flexible layer is coupled to the base element 2411. The flexible support can include an elastic deformable material, such as being compressible and stretchable. The deformable characteristic of the flexible support can allow the vacuum seal to bend to match the irregularities of the object surface, while keeping the base element rigid.

Figure 24B:
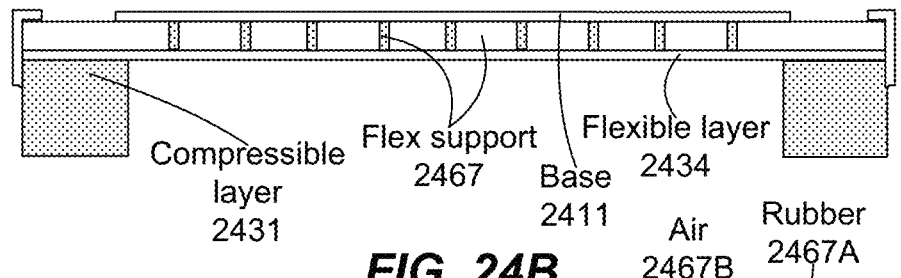

In FIG. 24B, the compressible layer 2431 of the vacuum seal has a close loop shape running around a periphery of the base element 2411. The flexible layer 2434 is coupled to the compressible layer 2431 along the periphery. The flexible layer 2434 has a flexible support 2467 above the flexible layer, with the flexible support disposed at most areas, e.g., in areas along the periphery and in areas inside the periphery. The top portion of the flexible support, e.g., the portion of the flexible support above the flexible layer is coupled to the base element 2411. The openings of the base element also see the flexible support, thus the press rod can press on the flexible support to push on the flexible layer to affect the compressible layer.

Figure 24C:
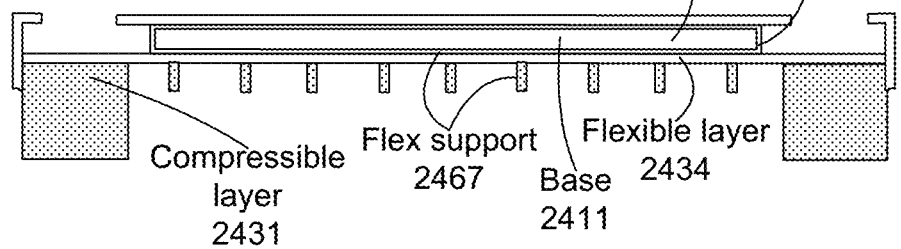

In FIG. 24C, the compressible layer 2431 of the vacuum seal has a close loop shape running around a periphery of the base element 2411. The flexible layer 2434 is coupled to the compressible layer 2431 along the periphery. The flexible layer 2434 has a flexible support 2467 above and below the flexible layer, with the flexible support disposed at an area inside the periphery. The top portion of the flexible support, e.g., the portion of the flexible support above the flexible layer, includes a hydraulic or pneumatic element having a silicone or rubber 2467A outer layer containing a cavity filled with a fluid, such as air 2467B. The pressure in the cavity of the pneumatic or hydraulic element can be adjustable, to be optimized for the conformity of the base element with the vacuum seal element.

Figure 24D:
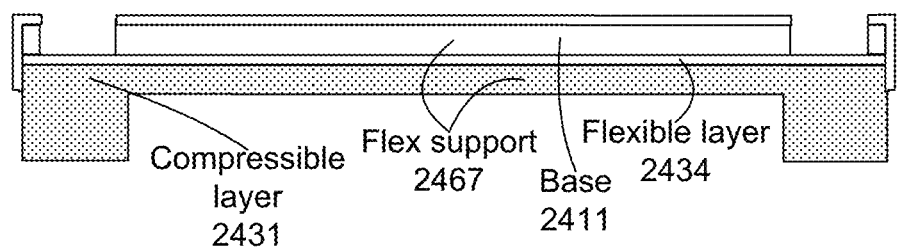

In FIG. 24D, the compressible layer 2431 of the vacuum seal has a close loop shape running around a periphery of the base element 2411, together with a thinner layer at the portion within the peripheral portion. The flexible layer 2434 is coupled to the compressible layer 2431 along the periphery and also at the inside portion. The flexible layer 2434 has a flexible support 2467 above the flexible layer, with the flexible support disposed at an area inside the periphery and also outside the periphery. The top portion of the flexible support is coupled to the base element 2411, e.g., at areas outside and inside the periphery of the base element.

Figure 24E:
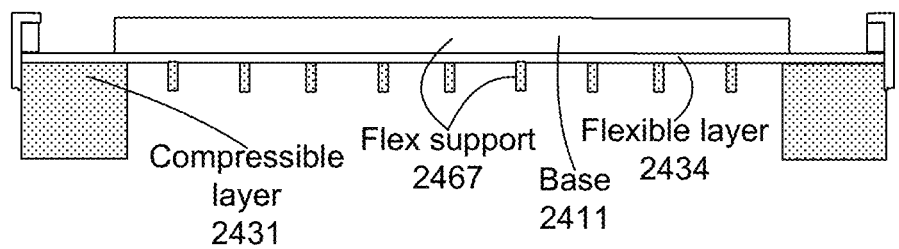

In FIG. 24E, the compressible layer 2431 of the vacuum seal has a close loop shape running around a periphery of the base element 2411. The flexible layer 2434 is coupled to the compressible layer 2431 along the periphery. The flexible layer 2434 has a flexible support 2467 above and below the flexible layer, with the flexible support disposed at an area inside the periphery and also outside the periphery. The top portion of the flexible support is coupled to the base element 2411, e.g., at areas outside and inside the periphery of the base element. The top portion of the support has an opening around the periphery of the base element, to expose the flexible layer.

FIG. 25 illustrates a process for forming a vacuum gripper according to some embodiments. Operation 2500 forms a vacuum gripper for gripping an object surface. The vacuum gripper includes a base element, a flexible layer having a compressible portion coupled to a surface of the base element, a close-loop vacuum seal element coupled to the flexible layer, with the vacuum seal element configured to form a sealed cavity with at least one of the base element or the flexible layer when contacting the object surface, and a vacuum pump coupled to the base element and fluidly communicated with the cavity for evacuating air in the cavity.

The vacuum seal element includes a compressible material, a multiplayer compressible material, a composite gradually varied compressible material, or a compressible structure having a pneumatic or hydraulic element having a flexible layer surrounding a fluid filled cavity.

The base element includes at least an opening at a periphery of the vacuum seal element for a press rod to press on the flexible layer or on the vacuum seal element to assist the compressible layer to be conformed to irregularities of the object surface.

The compressible portion of the flexible layer is at a middle portion of the flexible layer inside the periphery of the vacuum seal element. The compressible portion of the flexible layer is optionally at a portion of the flexible layer outside the periphery of the vacuum seal element. The vacuum seal element optionally includes a flexible portion inside the periphery of the vacuum seal element, with the flexible portion having a thickness less than the peripheral portion.

Deformation Characteristic of the Vacuum Seal with Local Pressing

In some embodiments, the vacuum seal element is configured to form a close seal with an irregular surface of an object with the use of a press rod pressing on localized areas of the vacuum seal. For example, facing a sharp and deep corner of the object surface, the vacuum seal might still leave a gap, even with a high force pressing on the vacuum gripper, since the high force pressing is global with most of the pressing force distributed to other contact areas. A local force, such as a force provided by a press rod pressing on the vacuum seal area at the gap location, can push the vacuum seal into the gap for reducing the gap size and forming adequate suction force between the gripper and the object.

In some embodiments, the vacuum seal is configured to allow a material transfer from a top surface to a bottom surface of the vacuum seal, so that a pressing on the top surface can cause the bottom surface to be deformed, such as protruding to fill the gap. Thus, in addition to be a highly compressible material to conform to the variation of the object surface, the vacuum seal also includes a high hardness material to allow movements of bottom layer when the top layer is pushed. Thus, the vacuum seal can include a composite material, such as having a highly compressible at a bottom side and a less compressible or higher hardness at a top side.

FIGS. 26A-26H illustrate configurations of a vacuum seal according to some embodiments. In FIG. 26A, a soft compressible seal 2631 can be deformed upon being pressed on an irregular surface, such as a surface with a bump. The bottom side of the seal can form depression 2671A matching with the bump of the surface. There can be minimum changes at the opposite side, e.g., at the top side, of the seal. Similarly, soft compressible seal can be deformed to form a dimple 2670B having a depression 2671B when being pressed at a top surface, for example, by a press rod. There also can be minimum changes at the opposite side, e.g., at the bottom side, of the seal.

In contrast, for a harder material such as a flexible layer 2634, both top and bottom sides of the flexible layer are deformed with similar shapes when being pressed with a press rod, for example, forming a dimple 2670B.

FIG. 26B shows a configuration of a composite seal having a flexible layer 2634 disposed on a compressible layer 2631. The hardness and thickness of each layer can be optimized to allow conformity with the object surface, while allow a bottom portion of the seal to protruded upon being pressed at a top portion. A force 2664* by a press rod can be applied to the flexible layer. The force can cause a dimple 2670B* on the flexible layer with a depression 2671B*. The compressible layer is deformed at a bottom side by the dimple 2670B\* and depression 2671B\*, to generate a dimple 2670C and depression 2671C. The flexible layer and the compressible layer are chosen to provide the dimple 2670C and depression 2671C suitable for filling gaps caused by the irregularities of the object surface.

FIG. 26C shows a configuration of a composite seal having a less compressible 2634A disposed on a more compressible layer 2631B. The hardness and thickness of each layer can be optimized to allow conformity with the object surface, while allow a bottom portion of the seal to protruded upon being pressed at a top portion. For example, the more compressible layer 2631B can be a soft compressible, e.g., highly compressible, while the less compressible layer 2631A can be a hard compressible, e.g., mediumly compressible.

FIG. 26D shows a configuration of a composite seal having a flexible layer disposed on a less compressible 2634A disposed on a more compressible layer 2631B. The hardness and thickness of each layer can be optimized to allow conformity with the object surface, while allow a bottom portion of the seal to protruded upon being pressed at a top portion.

FIG. 26E shows a configuration of a composite seal having a gradually compressible material 2672. The hardness and thickness curve of the composite seal can be optimized to allow conformity with the object surface, while allow a bottom portion of the seal to protruded upon being pressed at a top portion.

FIG. 26F shows a configuration of a composite seal having a flexible layer disposed on a gradually compressible material 2672. The hardness and thickness of each layer can be optimized to allow conformity with the object surface, while allow a bottom portion of the seal to protruded upon being pressed at a top portion.

FIG. 26G shows a configuration of a composite seal having a hydraulic or pneumatic tube, such as rubber 2632A, filled with a fluid, such as air 2632B. The rubber layer can function as the hard flexible layer, while the air can function as the soft compressible layer. The air pressure can be optimized to allow conformity with the object surface, while allow a bottom portion of the seal to protruded upon being pressed at a top portion.

FIG. 26H shows a configuration of a composite seal having a flexible layer disposed on a hydraulic or pneumatic tube filled with a fluid. Alternatively, the hydraulic or pneumatic tube can have a thicker layer on top, which can function as a flexible layer.

FIGS. 27A-27I illustrate configurations for a vacuum seal according to some embodiments. FIG. 27A shows a flexible thin layer 2734 disposed on a rubber tube seal having pressured air 2732B inside a rubber wall 2732A, with the rubber tube seal disposed on a bottom flexible layer 2761. FIG. 27B shows a flexible thin layer 2734 disposed on a seal having layers 2736, 2735, and 2731, each with different compressible and stretchable material, with the seal disposed on a bottom flexible layer 2761. FIG. 27C shows a flexible thin layer 2734 disposed on a seal having a layer 2731, with the seal disposed on a bottom flexible layer 2761. FIG. 27D shows a flexible thin layer 2734 disposed on a seal having layers 2735/2731 on a rubber tube seal 2732A/2732B. FIG. 27E shows a flexible thin layer 2734 disposed on a seal having a layer 2731 on a rubber tube seal 2732A/2732B. FIG. 27F shows a flexible thin layer 2734 disposed on a seal having a rubber tube 2732A1 on a rubber tube seal 2732A. FIG. 27G shows a flexible thin layer 2734 disposed on a seal having a rubber tube 2732A which is disposed on a seal having layers 2735/2731. FIG. 27H shows a flexible thin layer 2734 disposed on a seal having a rubber tube 2732A, which is disposed on another flexible layer 2734A, which is disposed on a seal having layers 2735/2731. FIG. 27I shows a flexible thin layer 2734 disposed on two seals having rubber tubes 2732A1 and 2732A, with another flexible thin layer 2734A between the two rubber tubes.

FIG. 28 illustrates a process to form a vacuum gripper according to some embodiments. Operation 2800 forms a vacuum gripper for gripping an object surface. The vacuum gripper includes a base element, a flexible layer having a compressible portion coupled to a surface of the base element, a close-loop vacuum seal element coupled to the flexible layer, with the vacuum seal element configured to form a sealed cavity with at least one of the base element or the flexible layer when contacting the object surface, and a vacuum pump coupled to the base element and fluidly communicated with the cavity for evacuating air in the cavity.

The vacuum seal element includes a compressible material having a gradual varying compressible property. The vacuum seal element includes a compressible material having multiple layers of different compressible properties. The vacuum seal element includes a compressible structure having a pneumatic or hydraulic element having a flexible layer surrounding a fluid filled cavity. The vacuum seal element includes a compressible material on a flexible layer. The vacuum seal element includes a compressible material having a combination of two or more layers of a gradual varying compressible property, multiple layers of different compressible properties, a pneumatic or hydraulic element having a second flexible layer forming a fluid filled cavity, or a third flexible layer.

The layers of the vacuum seal element are optimized for a sealing of the vacuum seal element on a height variation object surface.

The flexible layer is less compressible than the compressible vacuum seal element. The flexible layer is configured to deform in a same surface with a less localized pattern than the compressible material under a point indentation. The flexible layer is configured to deform more in an opposite surface than the compressible material under the point indentation, by having higher hardness.

Vacuum Gripper with a Pin Array

In some embodiments, a portable vacuum gripper can include components for selectively deforming the vacuum seal according to the underlying surface. For example, the components can include pins disposed along a periphery of the portable vacuum gripper on the vacuum seal. By pressing the pins according to the pattern of the sealing surface, the vacuum seal can be appropriately deformed to form a seal with the object surface.

For example, a portable vacuum gripper can be used for lifting an object having a grooved surface. The portable vacuum gripper can be placed on the grooved surface, and pins at the groove areas can be pushed down to push the vacuum seal further down on the grooves for making a better seal with the grooved surface.

In some embodiments, a vacuum gripper includes a base element, an array of press rods coupled to a periphery of the base element, a flexible layer comprising a flexible portion and a compressible portion, with the flexible portion disposed along the periphery to be accessible through the openings, and the compressible portion coupled to the base element, a vacuum seal element coupled to the flexible layer, with the vacuum seal element including an elastic deformable material.

The press rods are configured to be movable toward the vacuum seal element by sliding, by rotating, by screwing, or by pressing down. The press rods are configured to be pressed on the flexible layer toward the vacuum seal element to assist the vacuum seal element to be conformed to irregularities of the object surface.

The vacuum gripper also includes an air extraction mechanism coupled to the second surface of the base element and in fluid communication with the cavity, with the air extraction mechanism configured to extract gas from the cavity to create a suction force for coupling the object surface to the vacuum gripper.

The vacuum gripper can also include other components, such as a handle coupled to the second surface of the base element, a power source configured to provide power to the air extraction mechanism, a controller configured to regulate the air extraction mechanism, an alarm, and a manual mechanism configured to maintain an operation of the vacuum gripper, with the charging mechanism configured to charge the power source from an external power supply or manually from a person when the alarm showing the power level is below the first predetermined value, or to extract gas from the cavity to lower the pressure level by a person when the alarm showing the pressure level is above the second predetermined value.

FIGS. 29A-29B illustrate a portable vacuum gripper having seal deforming components according to some embodiments. In FIG. 29A, a portable vacuum gripper 2900 can include a body 2911*, which can include a base element 2911 and a handle 2910. The handle 2910 can be designed to house a motorized pump 2920, a manual pump 2921, a battery pack disposed in the handle, a power button 2925 for turning on the motorized pump, and a manual vacuum release button 2912. The base element 2911 can be designed to house a pressure gauge 2923 (or a vacuum gauge), which can provide the level of pressure or vacuum in a cavity of the portable vacuum gripper. Hookable elements 2926 can be formed on the base element for attaching to hooks for hoisting.

The portable vacuum gripper 2900 can be configured to have multiple seal deforming components, such as movable pins 2942, disposed on a top surface of the vacuum seal. The pins 2942 can move down, for example, by an operator pushing down on the pins. The movement of the pins can cause the vacuum seal to be deformed, such as to be pushed down. Thus, the pins corresponded to a groove or a step on a surface can be pushed down, which can assist in deforming the vacuum seal into the shape of the underlying surface to form a better seal.

In FIG. 29B(a), the portable vacuum gripper 2900 can include a vacuum seal 2931 disposed under a flexible layer 2934. The portable vacuum gripper 2900 can include an array of pins disposed along a length of the vacuum seal 2931. In FIG. 29B(b), the portable vacuum gripper 2900 can be placed on an irregular surface, such as on a step surface. The vacuum seal 2931 can be somewhat deformed to seal with the step surface. In addition, pins 2942A of the pin array 2942 can be pushed down, which can assist in the deformation of the vacuum seal, and which can make a better seal with the step surface.

Figure 30A:
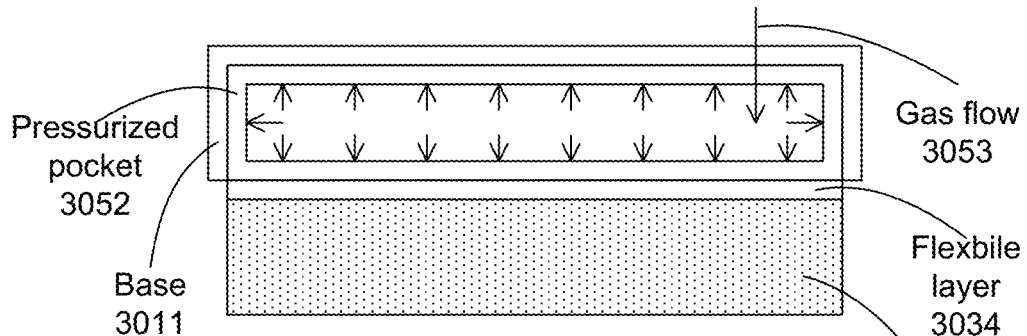
FIGS. 30A-30D illustrate configurations for seal deforming components according to some embodiments.

FIGS. 30A-30D illustrate configurations for seal deforming components according to some embodiments. In FIG. 30A, a pressurized pocket 3041 inside a housing 3011 can be disposed on a flexible layer 3034 which is disposed on a vacuum seal 3031. The pressurized pocket 3041 can be configured to accept a gas flow for regulating the pressure inside the pressurized pocket. The force exerted by the pressurized pocket can be uniform along the length of the vacuum seal on a flat surface. On a step surface, the force can push the vacuum seal further down at lower step areas, which can assist in the deformation of the vacuum seal.

Figure 30B:
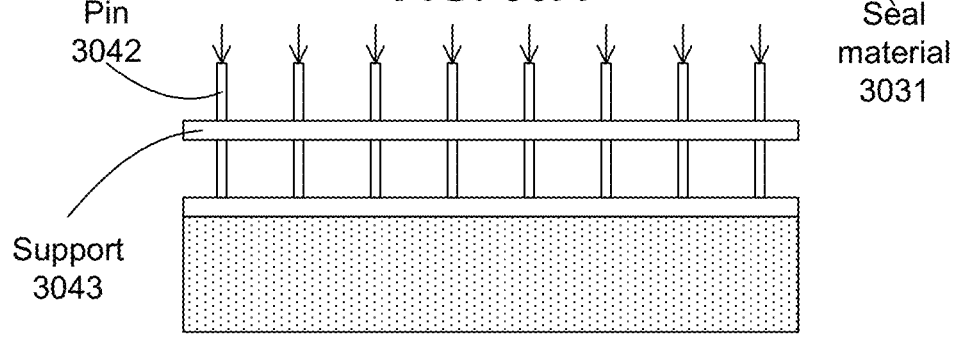

In FIG. 30B, multiple pins 3042 can be arranged on a support 3043 which runs along the length of the vacuum seal. The pins can be uniformly distributed along the length of the vacuum seal. The pins 3042 can be pushed down, relative to the support 3043. On a step surface, the pins corresponded to the lower step areas can be pushed down, which can push the vacuum seal further down at lower step areas, which can assist in the deformation of the vacuum seal.

Figure 30C:
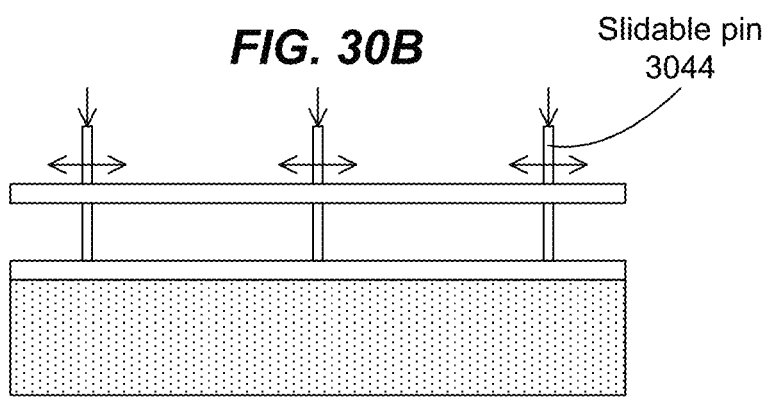

In FIG. 30C, multiple pins 3044 can be arranged on a support which runs along the length of the vacuum seal. The pins 3044 can be configured to move along the support, e.g., the pins can be move along the support to be positioned on a desired location, such as at the location of a groove or a lower step area. The number of pins can be less than a uniform distribution of pins, since the pins can be re-arranged to meet the step down areas. For example, the number of pins can be less than 20, less than 15, or less than 10 pins.

On a step surface, a pin can be slide along the support to be positioned at the lower step areas. The slide pin can then be pushed down, which can push the vacuum seal further down at lower step areas, which can assist in the deformation of the vacuum seal.

Figure 30D:
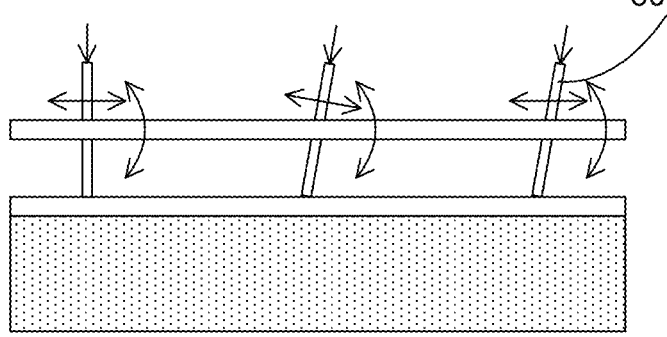

In FIG. 30D, multiple pins 3045 can be arranged on a support which runs along the length of the vacuum seal. The pins 3045 can be configured to move along the support, e.g., the pins can be move along the support to be positioned on a desired location, such as at the location of a groove or a lower step area. The pins 3045 can also be configured to rotate around an axis, in order to position the pins in any direction, such as in a direction that can push the vacuum seal toward the step corner. The sliding and rotating pins can be positioned to push at a step corner, which can assist in deforming the vacuum seal at the step corner for a better seal.

Figure 31A:
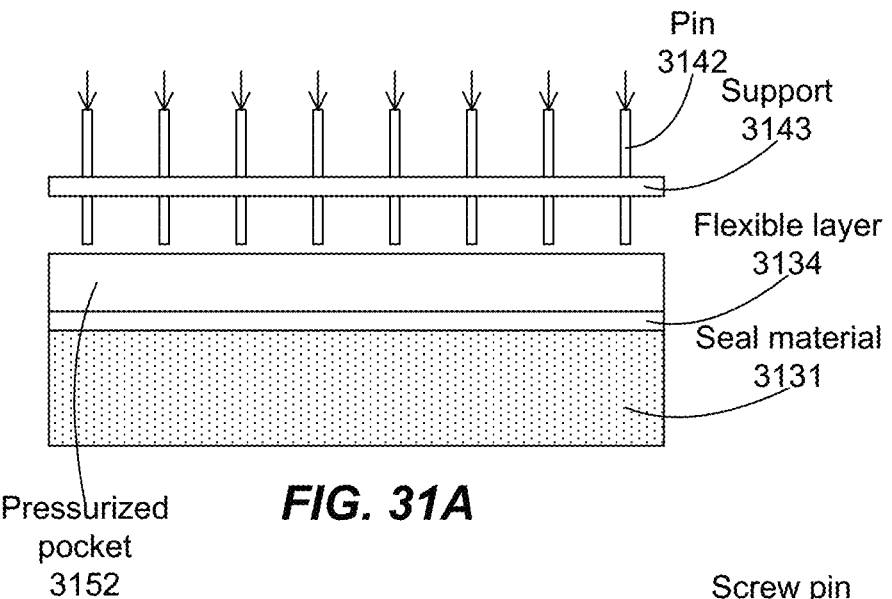
FIGS. 31A-31C illustrate configurations for seal deforming components according to some embodiments.
Figure 31B:
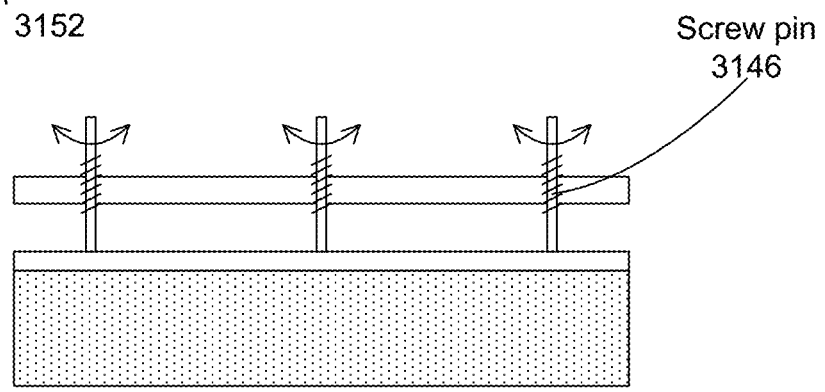
Figure 31C:
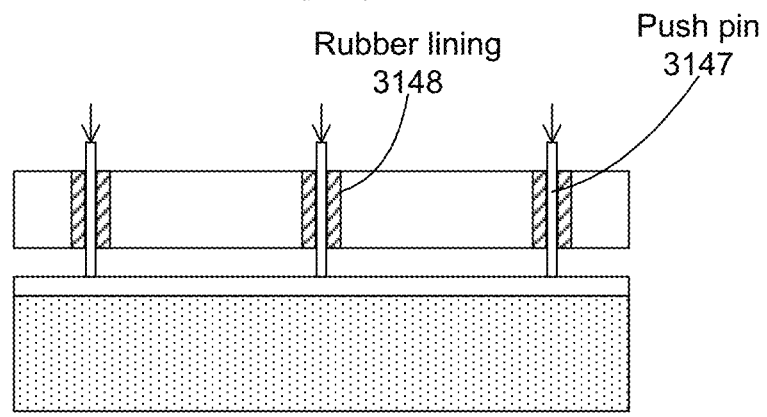

FIGS. 31A-31C illustrate configurations for seal deforming components according to some embodiments. In FIG. 31A, a pressurized pocket 3141 inside a housing 3111 can be disposed on a flexible layer 3134 which is disposed on a vacuum seal 3131. The pressurized pocket 3141 can be configured to accept a gas flow for regulating the pressure inside the pressurized pocket. The force exerted by the pressurized pocket can be uniform along the length of the vacuum seal on a flat surface. On a step surface, the force can push the vacuum seal further down at lower step areas, which can assist in the deformation of the vacuum seal.

In FIG. 31B, the pins can be screwed 3146 on a support, thus by rotating the pins, the pins can push down on the vacuum seal. In FIG. 31C, the pins can be pushed down 3147 on a support. The pins and the support can be configured to keep the pins in the pushed down positions, for example, by making a rough pins with a high friction support such as lining with a rubber material 3148. Thus, by pressing on the pins, the pins can stay down, The support can have a release configuration, for example, by separating the support into two portions, leaving the pins free to move up, for example, by a spring action.

Thus, the release configuration can release all pins at once, while the pushing down action can be performed on individual pins.

FIG. 32 illustrates a process for forming a vacuum gripper having a pin array according to some embodiments. Operation 3200 forms a vacuum gripper for gripping an object surface. The vacuum gripper includes a base element, a flexible layer having a compressible portion coupled to a surface of the base element, a close-loop vacuum seal element coupled to the flexible layer, with the vacuum seal element configured to form a sealed cavity with at least one of the base element or the flexible layer when contacting the object surface, and a vacuum pump coupled to the base element and fluidly communicated with the cavity for evacuating air in the cavity.

The vacuum seal element includes a compressible material having a gradual varying compressible property, a compressible material having multiple layers of different compressible properties, a compressible structure having a pneumatic or hydraulic element having a flexible layer surrounding a fluid filled cavity, a compressible material on a flexible layer, or any combination thereof. The layers of the vacuum seal element are optimized for a sealing of the vacuum seal element on a height variation object surface. The flexible layer is configured to improve a conformation of the vacuum seal element on the object surface when being pressed.

The vacuum gripper includes movable pins disposed around a periphery at locations of the vacuum seal element for pressing on the flexible layer or on the vacuum seal element to assist the compressible layer to be conformed to irregularities of the object surface. The movable pins are configured to be movable toward the vacuum seal element by sliding, by rotating, by screwing, or by pressing down.

FIGS. 33A-33D illustrate flow charts for operating seal deforming components in a portable vacuum gripper according to some embodiments. The seal deforming components can assist in selectively deforming the vacuum seal to be conformed to irregular surfaces, such as step surfaces, groove surfaces, or rough surfaces.

In FIG. 33A, operation 3300 pressurizes a deformable air pocket disposed along a length of a seal to cause the seal to conform to an irregular surface. In FIG. 33B, operation 3320 moves, toward an irregular surface, individual pins in an array of pins disposed along a length of a seal to cause the seal to conform to the irregular surface.

In FIG. 33C, operation 3340 slides or rotates individual pins in an array of pins disposed along a length of a seal to cause the seal to conform to the irregular surface. In FIG. 33D, operation 3360 screws or presses down individual pins in an array of pins disposed along a length of a seal to cause the seal to conform to the irregular surface.

What is claimed is:

1. A vacuum gripper for gripping an object, the vacuum gripper comprising
   a base element,
      wherein the base element comprises a surface area comprising a central area and a periphery surrounding the central area;
   a vacuum seal element coupled to the base element,
      wherein the vacuum seal element is configured to surround a cavity with a bottom side of the cavity being an object surface contacted by the vacuum seal element,
      wherein the vacuum seal element comprises a first portion disposed on a second portion,
      wherein the first portion of the vacuum seal element is disposed adjacent to the periphery,
      wherein the first portion comprises a flexible and stretchable material,
      wherein the second portion comprises a compressible and deformable material,
      wherein the first and second portions are configured to cause the vacuum seal element to reduce a gap size with a step in the object surface;
   an air extraction mechanism coupled to the base element and in fluid communication with the cavity,
      wherein the air extraction mechanism is configured to extract gas from the cavity to create a suction force for coupling the object surface to the vacuum gripper,
   a controller configured to regulate the air extraction mechanism,
      wherein the controller is configured to turn off the air extraction mechanism when a pressure level in the cavity reaches a predetermined pressure level or when a rate of pressure reduction in the cavity reaches a predetermined level,
      wherein the controller is configured to turn on the air extraction mechanism when a pressure level in the cavity is below the predetermined pressure level.

2. A vacuum gripper as in claim 1,
   wherein the first portion comprises a higher hardness than that of the second portion, or
   wherein the first portion is less compressible and less deformable than that of the second portion.

3. A vacuum gripper as in claim 1,
   wherein the second portion comprises multiple different elastic compressible and deformable materials,
   wherein the multiple different materials are arranged in discrete layers.

4. A vacuum gripper as in claim 1,
   wherein the second portion comprises multiple different elastic compressible and deformable materials in a composite layer having continuously varying levels of elastic compressible and deformation.

5. A vacuum gripper as in claim 1,
   wherein the second portion comprises a pneumatic or hydraulic element comprising a flexible and stretchable layer forming a fluid-filled cavity,
   wherein the fluid-filled cavity comprises a pressure optimized for sealing the vacuum seal element with the step in the object surface.

6. A vacuum gripper as in claim 1, further comprising
   a bottom layer coupled to the vacuum seal element at an at an external side of the vacuum seal element,
      wherein the bottom layer comprises a flexible material more durable or more abrasion-resistant than that of the first or second portion of the vacuum seal element.

7. A vacuum gripper as in claim 1, further comprising
   an alarm,
      wherein the alarm is configured to provide an alarm when the pressure level in the cavity is above or below a determined value; or
   a manual mechanism configured to maintain an operation of the air extraction mechanism,
      wherein the manual mechanism is configured to manually extract gas from the cavity by a person.

8. A vacuum gripper as in claim 1, further comprising
   a battery alarm coupled to a battery configured to provide power to the air extraction mechanism, wherein the battery alarm is configured to provide an alarm to notify a person when a power level of the battery is below a determined value; or a charging mechanism configured to charge the power source, wherein the charging mechanism is configured to charge the power source from an external power supply or manually from a person.

9. A vacuum gripper as in claim 1, further comprising a press rod, wherein the press rod is configured to be removably coupled to a body of the vacuum gripper, wherein a size of the press rod is smaller than that of an opening of one or more openings disposed around the periphery of the base element to allow the press rod to push at an angle from the vertical direction toward the step.

10. A vacuum gripper as in claim 1, further comprising an array of press rods coupled to a periphery of the base element and aligned with one or more openings disposed around the periphery of the base element;

wherein the press rods are configured to be movable toward the vacuum seal element by sliding, by rotating, by screwing, or by pressing down, wherein the press rods are configured to be pressed on the first portion toward the second portion.

11. A vacuum gripper as in claim 1, wherein the vacuum seal element comprises an inner portion inside the periphery, with the inner portion comprising a thickness less than that at a peripheral portion, with the inner portion coupled to the base element.

12. A vacuum gripper as in claim 1, wherein the second portion comprises multiple different elastic compressible and deformable materials, wherein the multiple different materials are configured to balance contact forces on the vacuum seal element when encountering the object surface that comprises a surface roughness.

13. A vacuum gripper as in claim 1, further comprising a manual air extraction mechanism coupled to the base element and in fluid communication with the cavity, wherein the manual air extraction mechanism is configured to extract gas from the cavity to create a suction force for coupling the object surface to the vacuum gripper, wherein the manual air extraction mechanism is configured to be operated by a person;

a pressure gauge coupled to the base element and in fluid communication with the cavity, wherein the pressure gauge is configured to provide indication of a pressure or vacuum level in the cavity;

an air release mechanism coupled to the base element and in fluid communication with the cavity, wherein the air release mechanism is configured to release gas from the cavity.

14. A vacuum gripper for gripping an object, the vacuum gripper comprising a base element, wherein the base element comprises one or more openings around a periphery of the base element;

a vacuum seal element coupled to the base element, wherein the vacuum seal element is configured to surround a cavity with a bottom side of the cavity being an object surface contacted by the vacuum seal element, wherein the vacuum seal element comprises a first portion disposed on a second portion, wherein the first portion of the vacuum seal element is disposed adjacent to the periphery, with the one or more openings configured to expose one or more sections of the first portion, wherein the first portion of the vacuum seal element extends into inside areas of the periphery, with the inside areas coupled to the base element, wherein the first portion comprises a flexible and stretchable material, wherein the second portion comprises a compressible and deformable material, wherein one of the first portion comprises a higher hardness than that of the second portion, or the first portion is less compressible and less deformable than that of the second portion, wherein the first and second portions are configured to cause the vacuum seal element to reduce a gap size with a step in the object surface after the first portion is pressed through an opening of the one or more openings, wherein layer thickness, layer hardness, layer flexibility, layer stretchability, layer compressibility, or layer deformity is selected to cause the vacuum seal element to be more conformal to irregularities of the object surface;

an air extraction mechanism coupled to the base element and in fluid communication with the cavity, wherein the air extraction mechanism is configured to extract gas from the cavity to create a suction force for coupling the object surface to the vacuum gripper, a pressure alarm, wherein the pressure alarm is configured to provide a first alarm when the pressure level in the cavity is above a determined value;

a manual mechanism configured to maintain an operation of the air extraction mechanism, wherein the manual mechanism is configured to manually extract gas from the cavity by a person;

a battery configured to provide power to the air extraction mechanism, wherein the battery is housed in a handle coupled to the base element;

a battery alarm coupled to the battery, wherein the battery alarm is configured to provide a second alarm when a power level of the battery is below a determined value;

a controller configured to regulate the air extraction mechanism, wherein the controller is configured to turn off the air extraction mechanism when a pressure level in the cavity reaches a predetermined pressure level or when a rate of pressure reduction in the cavity reaches a predetermined level, wherein the controller is configured to turn on the air extraction mechanism when a pressure level in the cavity is below the predetermined pressure level;

a press rod, wherein the press rod is configured to be removably coupled to a body of the vacuum gripper, wherein a size of the press rod is smaller than that of an opening of one or more openings disposed around the periphery of the base element to allow the press rod to push at an angle from the vertical direction toward the step.

15. A vacuum gripper for gripping an object, the vacuum gripper comprising
a base element,
wherein the base element comprises a surface area comprising a central area and a periphery surrounding the central area;
a vacuum seal element coupled to the base element,
wherein the vacuum seal element is configured to surround a cavity with a bottom side of the cavity being an object surface contacted by the vacuum seal element,
wherein the vacuum seal element comprises a first portion disposed on a second portion,
wherein the first portion of the vacuum seal element is disposed adjacent to the periphery,
wherein the first portion comprises a flexible and stretchable material,
wherein the second portion comprises a compressible and deformable material;
a first air extraction mechanism coupled to the base element and in fluid communication with the cavity,
wherein the first air extraction mechanism is coupled to a power source for extracting gas from the cavity to create a suction force for coupling the object surface to the vacuum gripper;
a second air extraction mechanism coupled to the base element and in fluid communication with the cavity,
wherein the second air extraction mechanism is configured to manually extract gas from the cavity by a person.

16. A vacuum gripper as in claim 15, further comprising a controller configured to regulate the first air extraction mechanism,
wherein the controller is configured to turn off the first air extraction mechanism when a pressure level in the cavity reaches a predetermined pressure level or when a rate of pressure reduction in the cavity reaches a predetermined level,
wherein the controller is configured to turn on the first air extraction mechanism when a pressure level in the cavity is below the predetermined pressure level.

17. A vacuum gripper as in claim 15, further comprising a charging mechanism configured to charge the power source,
wherein the charging mechanism is configured to charge the power source from an external power supply or manually from a person.

18. A vacuum gripper as in claim 15, further comprising a battery alarm coupled to a battery configured to provide power to the first air extraction mechanism,
wherein the battery alarm is configured to provide a first alarm when a power level of the battery is below a determined value, or
a pressure alarm,
wherein the pressure alarm is configured to provide a second alarm when the pressure level in the cavity is above or below a determined value.

19. A vacuum gripper as in claim 15, further comprising a bottom layer coupled to the vacuum seal element at an at an external side of the vacuum seal element,
wherein the bottom layer comprises a flexible material more durable or more abrasion-resistant than that of the first or second portion of the vacuum seal element.

20. A vacuum gripper as in claim 15,
wherein the second portion comprises multiple different elastic compressible and deformable materials,
wherein the multiple different materials are arranged in discrete layers or in a composite layer having continuously varying levels of elastic compressible and deformation.

\* \* \* \* \*